US012397580B2

(12) United States Patent
Morinaga et al.

(10) Patent No.: US 12,397,580 B2
(45) Date of Patent: Aug. 26, 2025

(54) ENVELOPE PROCESSING APPARATUS AND IMAGE FORMING SYSTEM

(71) Applicants: Takuya Morinaga, Tokyo (JP); Michitaka Suzuki, Kanagawa (JP); Nobuyoshi Suzuki, Tokyo (JP); Yuusuke Shibasaki, Tokyo (JP); Takahiro Matsuda, Kanagawa (JP); Atsushi Shinoda, Kanagawa (JP); Shingo Yoshizawa, Kanagawa (JP); Takahiro Watanabe, Kanagawa (JP)

(72) Inventors: Takuya Morinaga, Tokyo (JP); Michitaka Suzuki, Kanagawa (JP); Nobuyoshi Suzuki, Tokyo (JP); Yuusuke Shibasaki, Tokyo (JP); Takahiro Matsuda, Kanagawa (JP); Atsushi Shinoda, Kanagawa (JP); Shingo Yoshizawa, Kanagawa (JP); Takahiro Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 18/337,797

(22) Filed: Jun. 20, 2023

(65) Prior Publication Data

US 2023/0406032 A1 Dec. 21, 2023

(30) Foreign Application Priority Data

Jun. 21, 2022 (JP) ................................. 2022-099556

(51) Int. Cl.
*B43M 3/04* (2006.01)
*B43M 5/04* (2006.01)

(52) U.S. Cl.
CPC ............ *B43M 3/045* (2013.01); *B43M 5/042* (2013.01)

(58) Field of Classification Search
CPC .......... B43M 3/00; B43M 3/04; B43M 3/045; B65H 2301/1422; B65H 2701/1916; B65H 2801/66
(Continued)

(56) References Cited

U.S. PATENT DOCUMENTS 6,865,866 B2 * 3/2005 Hsieh ..................... B43M 3/045 53/569
11,897,279 B2 * 2/2024 Yoshizawa ............. B43M 3/045
(Continued)

FOREIGN PATENT DOCUMENTS

JP 2001-301723 10/2001
JP 2011-194651 10/2011
(Continued)

*Primary Examiner* — Leslie A Nicholson, III
(74) *Attorney, Agent, or Firm* — IPUSA, PLLC

(57) ABSTRACT

An envelope processing apparatus includes a flap opener, a first envelope detector, a second envelope detector, and circuitry. The flap opener opens a flap of an envelope during conveyance of the envelope in an envelope conveyance passage in which the envelope is conveyed to an enclosing position. The first envelope detector detects the envelope at a position upstream from the flap opener in a conveyance direction of the envelope. The second envelope detector detects the envelope at a position downstream from the flap opener in the conveyance direction. The circuitry causes the flap opener to execute an opening operation of the flap of the envelope conveyed to the enclosing position and causes the flap opener to execute the opening operation of the flap again when an opening-and-closing state of the flap determined based on detection results of the envelope by the first and second envelope detectors is abnormal.

11 Claims, 38 Drawing Sheets

(58) Field of Classification Search
USPC .................................................... 270/58.06
See application file for complete search history.

(56) References Cited

U.S. PATENT DOCUMENTS

| | | | | |
|---|---|---|---|---|
| 11,919,325 | B2 * | 3/2024 | Kunieda | B43M 3/045 |
| 12,129,145 | B2 * | 10/2024 | Shibasaki | B43M 5/045 |
| 12,151,505 | B2 * | 11/2024 | Matsuda | B43M 5/042 |
| 2004/0250517 | A1 * | 12/2004 | Hsieh | B43M 3/045 53/284.3 |
| 2012/0322641 | A1 | 12/2012 | Matsushita et al. | |
| 2022/0379653 | A1 | 12/2022 | Kunieda et al. | |
| 2022/0380168 | A1 | 12/2022 | Shibasaki et al. | |

FOREIGN PATENT DOCUMENTS

| | | |
|---|---|---|
| JP | 2011-236001 | 11/2011 |
| JP | 2013-035645 | 2/2013 |

* cited by examiner

ENVELOPE PROCESSING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-099556, filed on Jun. 21, 2022, in the Japan Patent Office, the entire disclosure of which is hereby incorporated by reference herein.

BACKGROUND

Technical Field

Embodiments of the present disclosure relate to an envelope processing apparatus and an image forming system.

Related Art

An enclosing device is known that encloses an enclosure in an envelope. An enclosing processing device is also known that encloses an enclosure in an envelope, and further seals the envelope in which the enclosure is enclosed. An image forming system is also known that coordinates an image forming apparatus that forms an image on an enclosure with an enclosing device or an envelope processing apparatus to enclose the enclosure, on which the image has been formed, in an envelope and seal the envelope. A system is also known in which an image forming system is further coordinated with a folding processing device that performs processing (folding processing) to fold a sheet-shaped enclosure, on which an image has been formed, in a specified folding manner.

SUMMARY

In an embodiment of the present disclosure, there is provided an envelope processing apparatus to convey an envelope to an enclosing position and enclose an enclosure into the envelope that includes a flap opener, a first envelope detector, a second envelope detector, and circuitry. The flap opener opens a flap of the envelope during conveyance of the envelope in an envelope conveyance passage in which the envelope is conveyed to the enclosing position. The first envelope detector detects the envelope at a position upstream from the flap opener in a conveyance direction of the envelope. The second envelope detector detects the envelope at a position downstream from the flap opener in the conveyance direction of the envelope. The circuitry causes the flap opener to execute an opening operation of the flap of the envelope conveyed to the enclosing position and causes the flap opener to execute the opening operation of the flap of the envelope again when an opening-and-closing state of the flap of the envelope determined based on detection results of the envelope by the first envelope detector and the second envelope detector is abnormal.

In another embodiment of the present disclosure, there is provided an image forming system that includes an image forming apparatus and the envelope processing apparatus

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
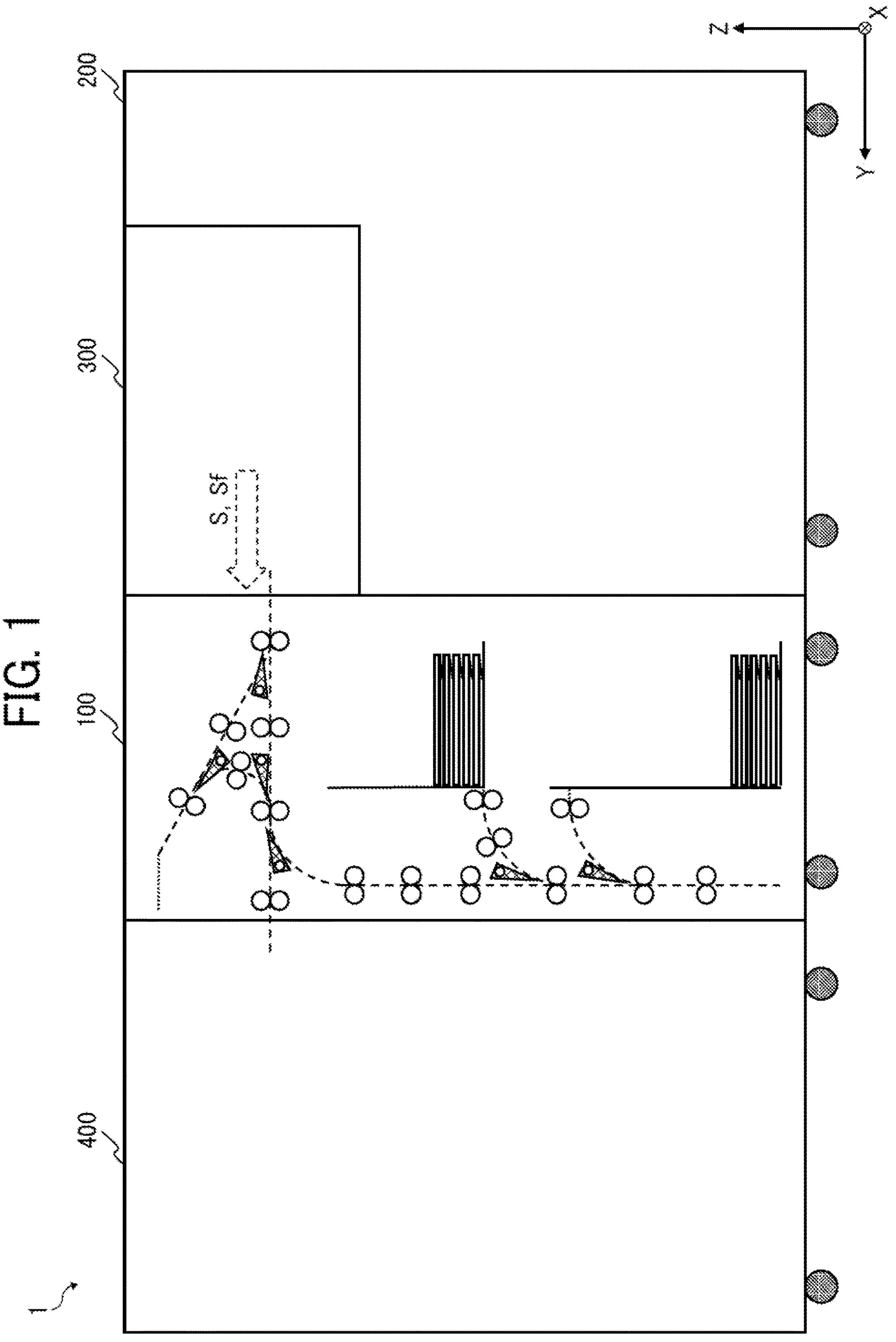
FIG. 1 is an external front view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, a description is given of an image forming system according to an embodiment of the present disclosure. FIG. 1 is a front view of an internal configuration of a printer system 1 as an example of the image forming system. The printer system 1 includes an image forming apparatus 200, a folding apparatus 300 as a sheet processing apparatus, an envelope processing apparatus 100 serving as an enclosing device and a sealing device according to an embodiment of the present disclosure, and a post-processing apparatus 400.

The image forming apparatus 200 is an example of an apparatus that forms an image on a sheet-shaped medium by a specified image forming method and ejects the sheet-shaped medium. The sheet-shaped medium (hereinafter, simply referred to as a "sheet S") as a "folded sheet Sf" on which specified folding processing is performed in the folding apparatus 300 is ejected toward the envelope processing apparatus 100. The sheet S may be ejected to the envelope processing apparatus 100 without being folded in the folding apparatus 300.

An instruction to "fold" or "not fold" the sheet S is an instruction transmitted from a controller (a printer controller 260 to be described below) included in the image forming apparatus 200 based on information that a user of the printer system 1 inputs to the controller. Alternatively, the instruction to "fold" or "not fold" the sheet S is an instruction transmitted from a sheet folding controller 320 included in the folding apparatus 300 based on information that a user of the printer system 1 inputs to the sheet folding controller 320.

The envelope processing apparatus 100 performs enclosing processing that encloses a sheet S or a folded sheet Sf, which is an enclosure ejected from an apparatus (the image forming apparatus 200 or the folding apparatus 300) disposed on an upstream side in a direction (conveyance direction) in which the sheet S is conveyed into the envelope processing apparatus 100, into an envelope E. The envelope processing apparatus 100 also performs sealing processing that seals the envelope E in which the enclosure is enclosed. The envelope processing apparatus 100 may also perform an operation of ejecting the folded sheet S or the sheet S to an apparatus disposed on a downstream side in a conveyance direction without performing the enclosing processing and the sealing processing.

The envelope processing apparatus 100 performs processing for enclosing the folded sheet Sf into the envelope E in an appropriate orientation. The "proper orientation" is an orientation with respect to a transparent window ew that is formed on the envelope E so that information such as address formed on the folded sheet Sf serving as an enclosure is visible from the outside of the envelope E via the transparent window ew. A plurality of kinds (folding types) of folding processing are performed on the folded sheet Sf. The orientation of information such as an address with respect to the conveyance direction is different depending on the folding type.

The envelope processing apparatus 100 determines whether to reverse, according to the folding type, the orientation of the folded sheet Sf with respect to the direction orthogonal to the conveyance direction when the folded sheet Sf is conveyed. The envelope processing apparatus 100 includes a conveying mechanism that, in the case where reverse processing is required, reverses the folded sheet Sf by using a conveyance path on the upstream side of the enclosing position and conveys the folded sheet Sf to the enclosing position. Details of the reverse control and the conveyance control for the folded sheet Sf are described below. The envelope processing apparatus 100 can also enclose the sheet S as an enclosure that has not been subjected to folding processing in the envelope E.

The post-processing apparatus 400 is an apparatus that performs post-processing, such as stapling processing, instructed via a controller on the sheet S or the folded sheet Sf ejected by the upstream apparatus from the post-processing apparatus 400 in the conveyance direction.

A description is given of the "coordinate axes" to be referred to in the description of an embodiment of the present disclosure. As illustrated in FIG. 1, an axis parallel to a placement surface of the printer system 1 and along an arrangement direction of the apparatuses constituting the printer system 1 is defined as a Y axis. A direction of an arrow indicating the Y axis is referred to as a "+Y direction" and an opposite direction to the +Y direction is referred to as a "−Y direction". The sheet S on which an image is formed in the image forming apparatus 200 is conveyed in the +Y direction, and then conveyed to each apparatus disposed downstream in the +Y direction from the image forming apparatus 200.

Similarly, an X axis defines an axis that is parallel to the placement surface on which the printer system 1 is placed and is extended in a front-rear direction of the printer system 1. A direction of an arrow indicating an X axis is referred to as an "+X direction" and an opposite direction to the +X direction is referred to as an "−X direction".

A Z axis defines an axis that is perpendicular to the X axis and the Y axis and extends in a height direction of the printer system 1. A direction of an arrow indicating the Z axis is referred to as a "+Z direction" and an opposite direction to the +Z direction is referred to as a "−Z direction".

When the same coordinate axes as those described above are appended to the drawings used in the following description, the definitions of the directions used in the description are the same as those described above.

The sheet S on which an image is formed in the image forming apparatus 200 is conveyed in the +Y direction, and then conveyed to the apparatuses disposed downstream from the image forming apparatus 200. Accordingly, the +Y direction is substantially synonymous with the conveyance direction. In the envelope processing apparatus 100, the conveying-in direction of the sheet S is the +Y direction. However, the conveyance direction of the sheet S and the folded sheet Sf in the enclosing and sealing operation is the +Z direction.

In other words, in the envelope processing apparatus 100 of the printer system 1, the conveyance direction of the envelope E is the "Z direction", the conveyance direction of the envelope E to the enclosing position is the +Z direction, and the conveyance from the enclosing position to the sealing position is the −Z direction.

Figure 2:
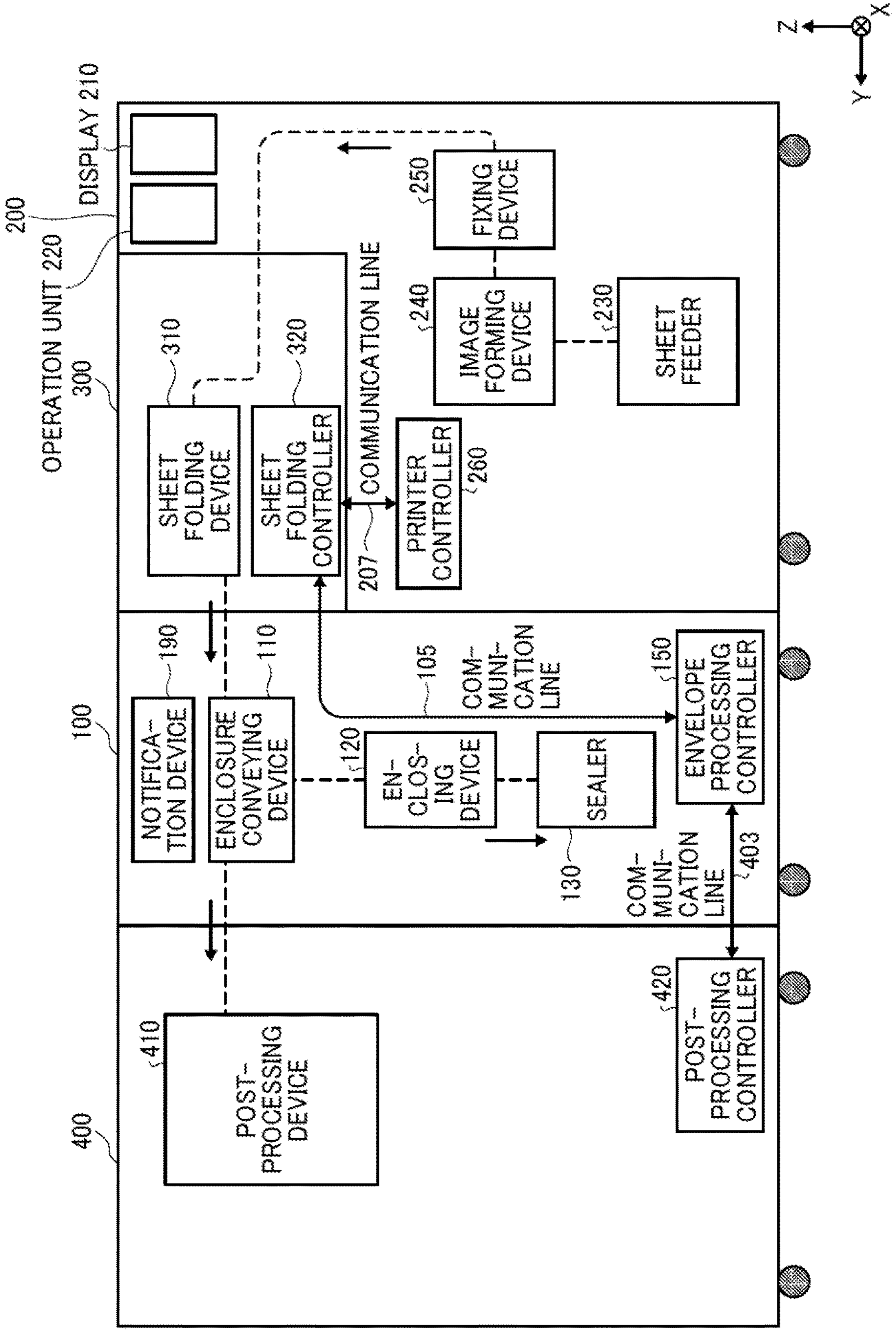
FIG. 2 is a block diagram of a control configuration of the image forming system of FIG. 1.

With reference to FIG. 2, a description is given of overall functional blocks of the printer system 1. In the following descriptions, an enclosure as a medium that is conveyed and enclosed in the envelope E is a folded sheet Sf on which an image is formed in the image forming apparatus 200 and on which specified folding processing is performed in the folding apparatus 300. In FIG. 2, a movement path (conveyance path) of the folded sheet Sf is indicated by a broken line. A communication line used for sending and receiving of signals between the functional blocks is indicated by a solid line. A movement path (conveyance path) of the sheet S is also indicated by a broken line.

The image forming apparatus 200 is, for example, an apparatus that forms an image on a sheet S by a known electrophotographic process. The image forming apparatus 200 includes a display 210, an operation unit 220, a sheet feeder 230, an image forming device 240, a fixing device 250, and a printer controller 260.

The display 210 displays screens for notifying a user of states of various functions and operation contents. The operation unit 220 corresponds to an operation interface with which the user performs setting a processing operation mode or the number of prints to be processed, and setting operation of a setting that requires reverse processing when an enclosing processing is performed in the envelope processing apparatus 100. The sheet feeder 230 includes a sheet feeding mechanism that stores sheets S, and separates and feeds the sheets S one by one. The image forming device 240 forms a latent image on a photoconductor and transfers an image onto the sheet S. The fixing device 250 fixes the image transferred onto the sheet S. The printer controller 260 controls operations of the above-described functional blocks.

A description is given of an embodiment of a sheet folding device 310 as a folding processing device that perform different folding types is described with reference to FIGS. 27A to 27E, 28A to 28F, and 29A to 29D. In the following description, the sheet folding device 310 illustrated in FIGS. 27A to 27E is referred to as "type A". The sheet folding device 310 illustrated in FIGS. 28A to 28F and FIGS. 29A to 29D is referred to as "type B". In FIGS. 27A to 27E, 28A to 28F, and 29A to 29D the sheet S is attached with symbols Δ. The symbol Δ represents a printing surface of the sheet S on which an image is formed (hereinafter, also referred to as an "image forming surface Ps"). In other words, in the following description, it is assumed that image forming processing is performed on one surface of the sheet S.

In FIGS. 27A to 27E, 28A to 28F, and 29A to 29D, the components of the sheet folding device 310 may be denoted by different reference signs even if the components have the same functions, operations, and effects. In the respective ranges of the A type and the B type, the reference signs are consistently given, but may be different from the reference signs in the other drawings.

As illustrated in FIGS. 27A to 27E, a lower surface of the sheet S in the conveyance direction of the sheet S conveyed from the image forming apparatus 200 to the sheet folding device 310 corresponds to the image forming surface Ps.

Figure 27A:
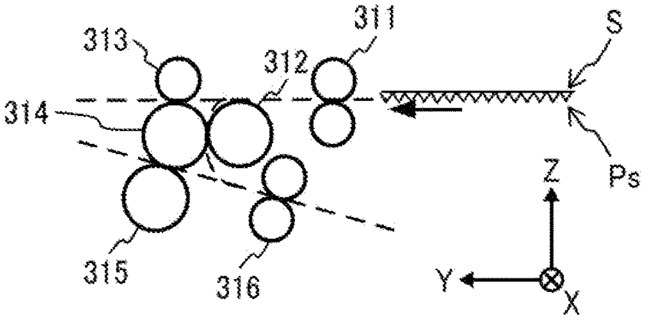
FIGS. 27A to 27E are diagrams illustrating an internal configuration of a folding processing section applicable to the image forming system of FIG. 1, according to an embodiment of the present disclosure.

First, as illustrated in FIG. 27A, the sheet S is conveyed from the image forming apparatus 200 toward a conveying roller pair 311.

Figure 27B:
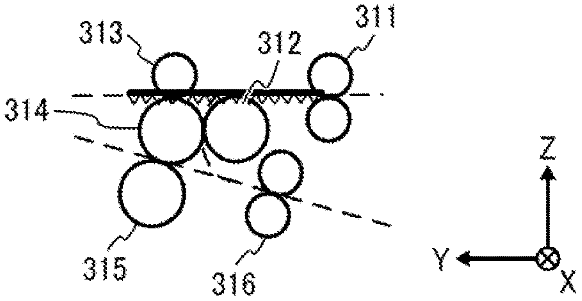

As illustrated in FIG. 27B, the sheet S conveyed downstream by the conveying roller pair 311 is conveyed to a specified position by a first folding roller 312, a first folding conveying roller 313, and a second folding roller 314.

Figure 27C:
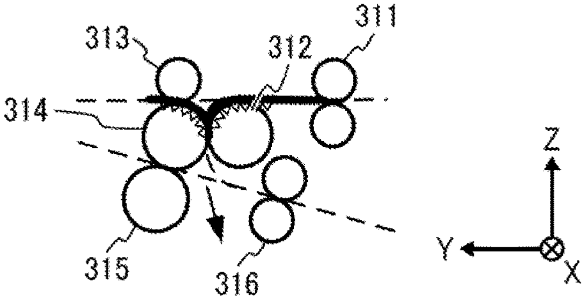

Thereafter, as illustrated in FIG. 27C, the first folding conveying roller 313 and the second folding roller 314 are rotated in reverse to form a first crease on the sheet S.

Figure 27D:
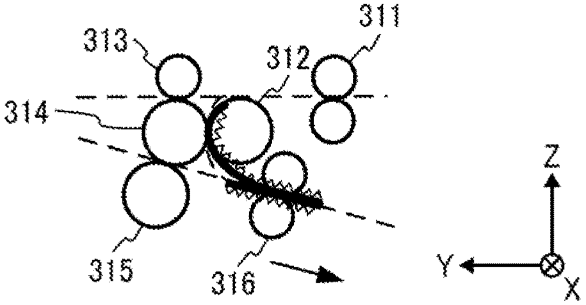

As illustrated in FIG. 27D, the sheet S on which the first crease is formed is conveyed by the first folding roller 312, the second folding roller 314, and a second folding conveying roller pair 316 to a path different from a path through which the sheet S enters, and is stopped at a specified position.

Figure 27E:
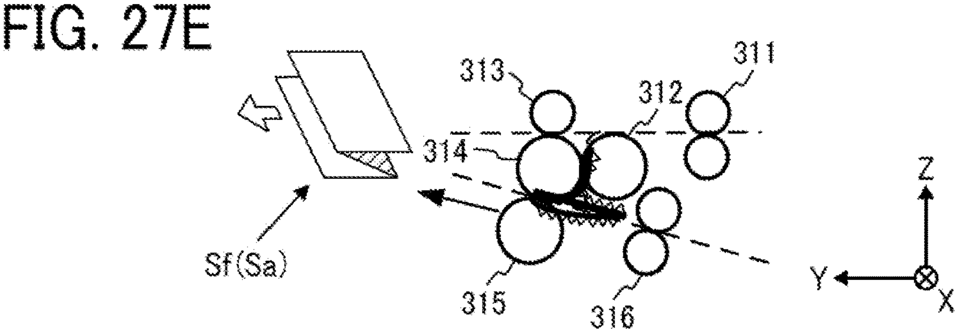

Thereafter, as illustrated in FIG. 27E, the second folding conveying roller pair 316 is rotated in reverse, and a third folding roller 315 is also rotated to convey the sheet S in a downstream direction. By this operation, a second crease is formed. Thus, the folded sheet Sf of outer three-folding or 6-page accordion is completed. In this case, the image forming surface Ps of the folded sheet Sf is positioned on a lower surface of the folded sheet Sf in the conveyance direction.

Figure 28A:
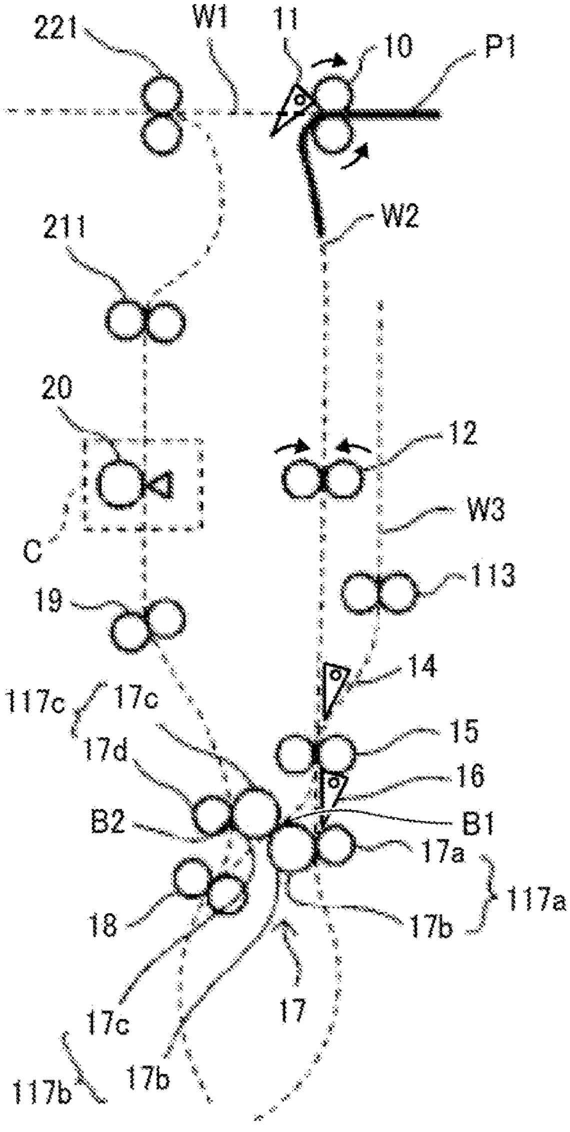
FIGS. 28A to 28F are diagrams illustrating an internal configuration of a folding processing section applicable to the image forming system of FIG. 1, according to another embodiment of the present disclosure.

Next, a description is given of the sheet folding device 310 of type B. FIGS. 28A to 28F are diagrams illustrating a sheet overlay operation performed by an overlay section of the sheet folding device 310. As illustrated in FIG. 28A, a first preceding sheet P1 is conveyed to a folding processing conveyance path W2. A leading end of the preceding sheet P1 conveyed to the folding processing conveyance path W2 contacts a registration roller pair 15, so that a skew of the preceding sheet P1 is corrected. This skew correction may not be performed.

Subsequently, the registration roller pair 15 and a first conveying roller pair 117a serving as a first conveyor including a first pressing roller 17a and a first folding roller 17b convey the first preceding sheet P1 forward (i.e., conveyance in a specified direction). When a trailing end of the preceding sheet P1 has passed a branching portion between the folding processing conveyance path W2 and a switchback conveyance path W3, the conveyance of the preceding sheet P1 is stopped. Then, a second branching member 14 is rotated in a clockwise direction in FIG. 28A, and the posture of the second branching member 14 is switched to guide the first preceding sheet P1 to the switchback conveyance path W3.

Figure 28B:
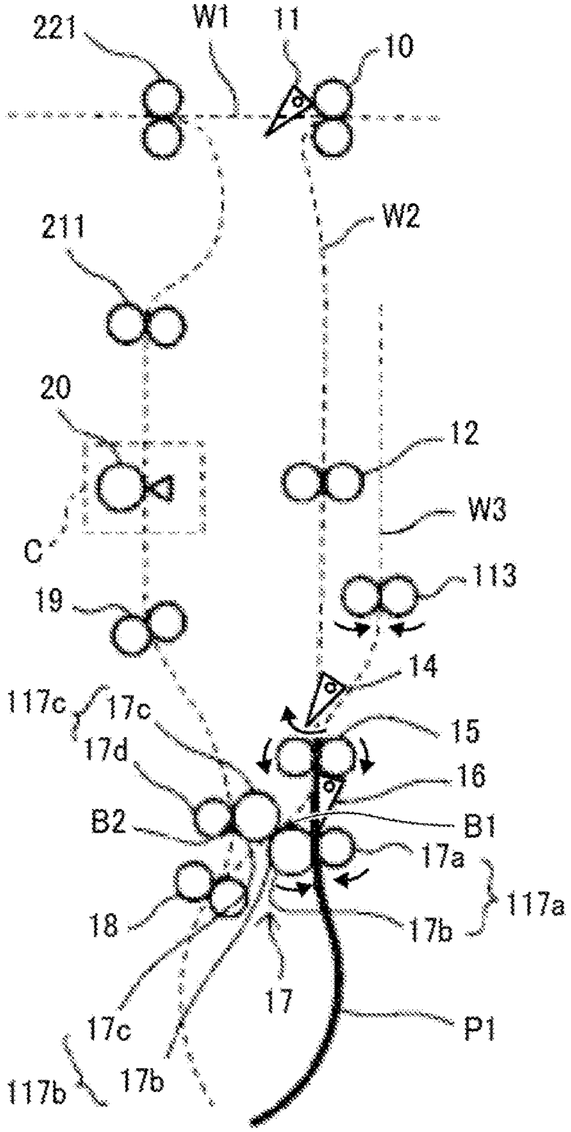

Further, as illustrated in FIG. 28B, the registration roller pair 15, the first conveying roller pair 117a, and a switchback conveying roller pair 113 are rotated in reverse. As a result, the first preceding sheet P1 is conveyed in reverse (conveyed in a direction opposite to a specified direction), and the preceding sheet P1 is conveyed to the switchback conveyance path W3. When the leading end of the preceding sheet P1 during forward conveyance (i.e., conveyance in the specified direction) is conveyed to the switchback conveyance path W3, the sheet conveyance of the switchback conveying roller pair 113 is stopped.

Figure 28C:
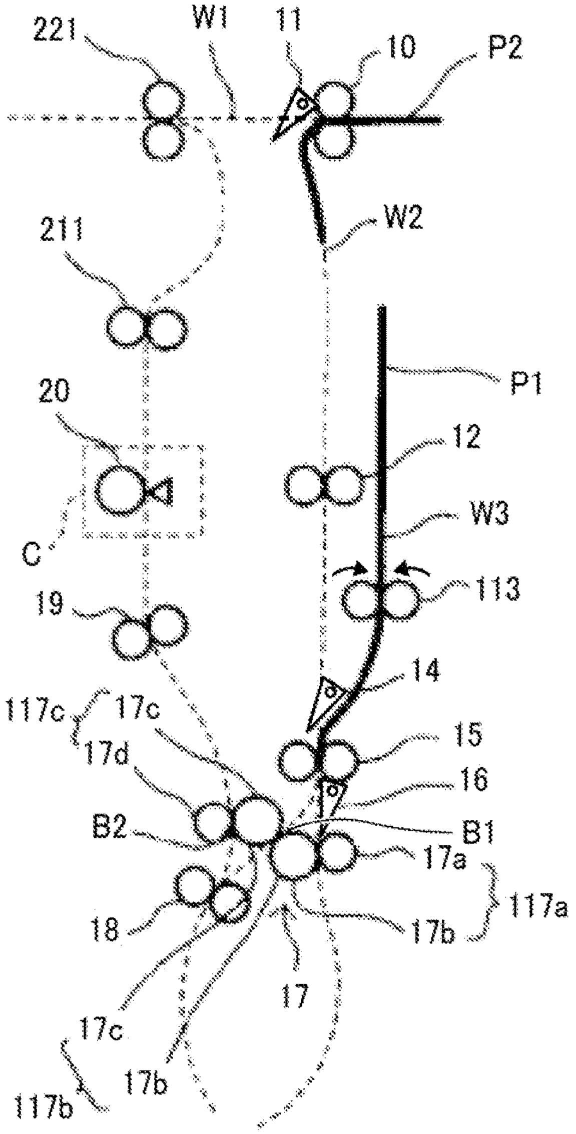

After the conveyance of the first sheet P1 has stopped, as illustrated in FIG. 28C, the switchback conveying roller pair 113 conveys the first preceding sheet P1 forward (conveys the first preceding sheet P1 in the specified direction), contacts the leading end of the sheet P1 against the registration roller pair 15, and causes the sheet P1 to be on standby with skew corrected.

In this way, the preceding sheet P1 is conveyed to the switchback conveyance path W3 to evacuate from the folding processing conveyance path W2. The preceding sheet P1 does not obstruct the conveyance of a subsequent sheet P2, thereby enabling smooth conveyances of the subsequent sheet P2.

Figure 28D:
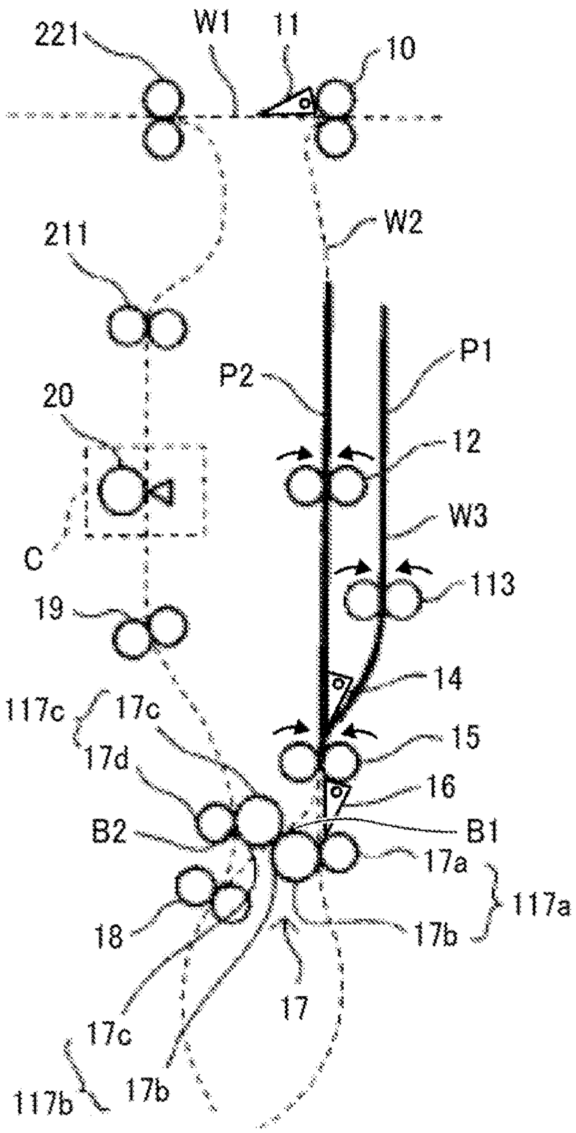

Subsequently, a leading end of the second subsequent sheet P2 contacts the registration roller pair 15. As illustrated in FIG. 28D, after the leading end of the subsequent sheet P2 contacts the registration roller pair 15, a conveying roller pair 12 continues to convey the subsequent sheet P2 to bend the subsequent sheet P2 and perform skew correction.

Figure 28E:
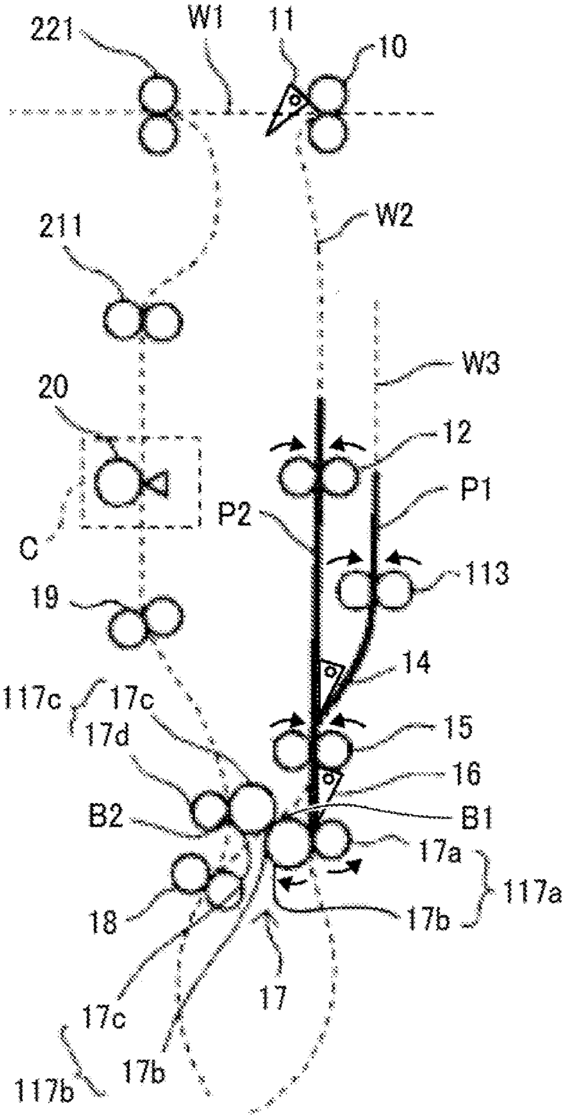
Figure 28F:
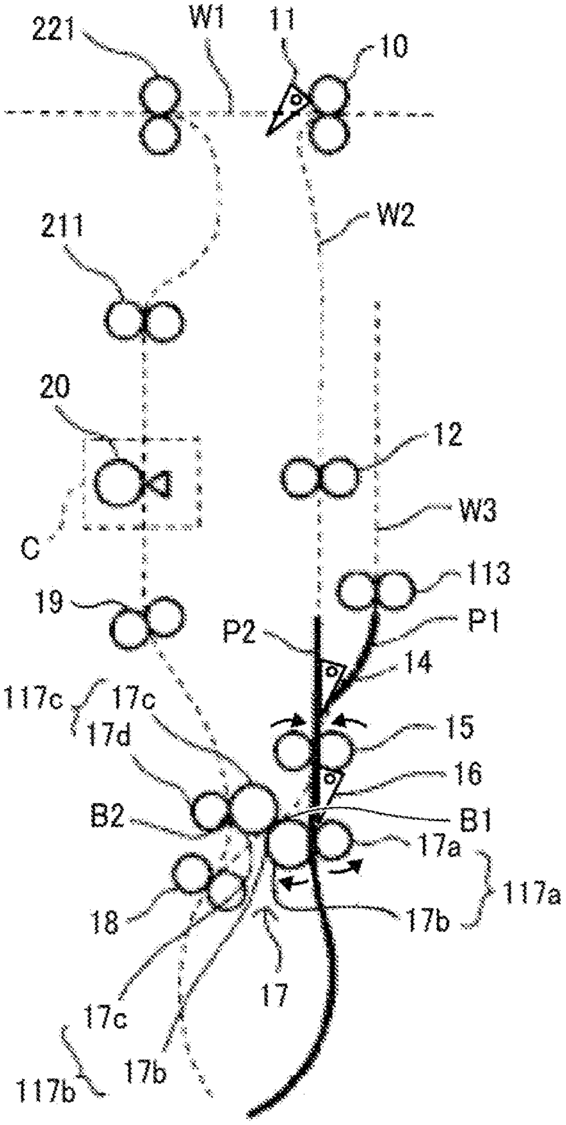

After a specified time in which the subsequent sheet P2 is bent by a specified deflection amount has passed, as illustrated in FIG. 28E, the registration roller pair 15, the switchback conveying roller pair 113, and the first conveying roller pair 117a rotate. The registration roller pair 15 conveys the preceding sheet P1 and the subsequent sheet P2 in an overlaid manner.

When the number of overlaid sheets reaches the number set by a user, a folding processing section B starts to perform multi-folding processing. On the other hand, when the number of overlaid sheets does not reach the number set by the user, the overlaid sheets are conveyed in reverse (conveyed in a reverse direction of the specified direction), when the trailing end of the overlaid sheets has passed the second branching member 14, and are evacuated to the switchback conveyance path W3. The sheets are overlaid by repeating the above-described operation according to the number of sheets to be overlaid.

In the present embodiment, as described above, the skew of the subsequent sheet P2 is corrected without stopping the rotation of the conveying roller pair 12, and the registration roller pair 15 starts to rotate when the bending amount of the subsequent sheet P2 has reached a specified amount. Thus, the preceding sheet P1 and the subsequent sheet P2 can be overlaid without reducing productivity.

While the number of the overlaid sheets does not reach the number set by the user, overlay processing without the skew correction by the registration roller pair 15 may be performed. When the number of the overlaid sheets reaches the number set by the user, overlay processing with the skew correction by the registration roller pair 15 may be performed. In the overlay processing with the skew correction, the switchback conveying roller pair 113 strikes the leading edge of the preceding sheet P1 or a preceding sheet bundle against the registration roller pair 15 to correct the skew and puts the sheet P1 or the preceding sheet bundle on standby. After the conveying roller pair 12 strikes the leading edge of the following sheet P2 against the registration roller pair 15 to correct the skew, the registration roller pair 15 conveys the overlaid sheets. On the other hand, in the overlay processing without the skew correction, the leading end of the preceding sheet P1 (the sheet bundle) is evacuated in the switchback conveyance path W3 and is on standby with skew corrected. Then, the switchback conveying roller pair 113 starts to convey the preceding sheet P1 or the preceding sheet bundle so that the preceding sheet P1 or the preceding sheet bundle placed on the switchback conveyance path W3 reaches the registration roller pair 15 when the subsequent sheet P2 reaches the registration roller pair 15, and the sheets are overlaid. The registration roller pair 15 conveys the overlaid sheets.

FIGS. 29A to 29D are diagrams illustrating a typical operation when the folding processing section of the sheet folding device 310 of type B performs Z folding processing against the sheet S. The leading end of a sheet bundle Pt conveyed by the registration roller pair 15 after the overlay processing enters the first conveying roller pair 117a including the first folding roller 17b and the first pressing roller 17a. Then, when the sheet bundle Pt is conveyed by a predetermined conveyance amount (a first conveyance amount), a drive motor to drive a folding mechanism 17 rotates in reverse. The protrusion amount is appropriately determined depending on the length of the sheet bundle Pt in the sheet conveyance direction and the content of the folding processing such as folding manner.

Figure 29A:
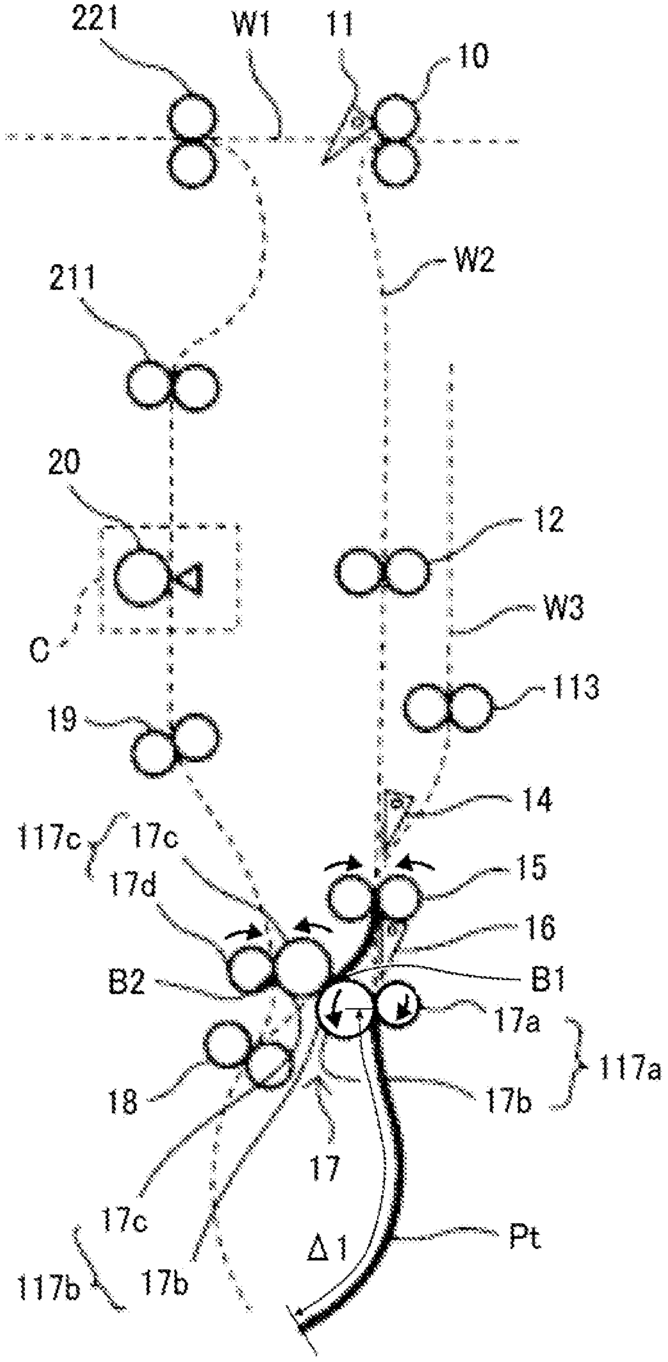
FIGS. 29A to 29D are diagrams illustrating an internal configuration of a folding processing section applicable to the image forming system of FIG. 1, according to still another embodiment of the present disclosure.

The drive motor to drive the folding mechanism 17 is rotated in reverse to convey the sheet bundle Pt nipped by the first conveying roller pair 117a in reverse (convey the sheet bundle Pt in a direction opposite to a specified direction). This operation forms a bend in the sheet bundle portion between the registration roller pair 15 and the first conveying roller pair 117a as illustrated in FIG. 29A. This bend portion, which is also called a folded-back portion, enters a nip of a first folding roller pair 117b including the first folding roller 17b and a second folding roller 17c to form a first folded portion in the folded-back portion. The first folded portion that has passed a nip of the first folding roller 17b is conveyed toward a second conveying roller pair 18 serving as a second conveyor.

The first folded portion of the sheet bundle Pt enters the nip of the second conveying roller pair 18. When the second conveying roller pair 18 conveys the sheet bundle Pt by a predetermined conveyance amount (a second conveyance amount), the second conveying roller pair 18 rotates in reverse and conveys the sheet bundle Pt nipped by the second conveying roller pair 18 in reverse (conveys in the direction opposite to the specified direction). The second conveyance amount in this case is appropriately determined depending on the length of the sheet bundle Pt in the sheet conveyance direction and the content of the folding processing such as folding manner.

The reverse conveyance (conveyance in the direction opposite to the specified direction) of the sheet bundle Pt nipped by the second conveying roller pair 18 in reverse forms a bend in the sheet portion between the first folding roller pair 117*b* and the second conveying roller pair 18.

Figure 29B:
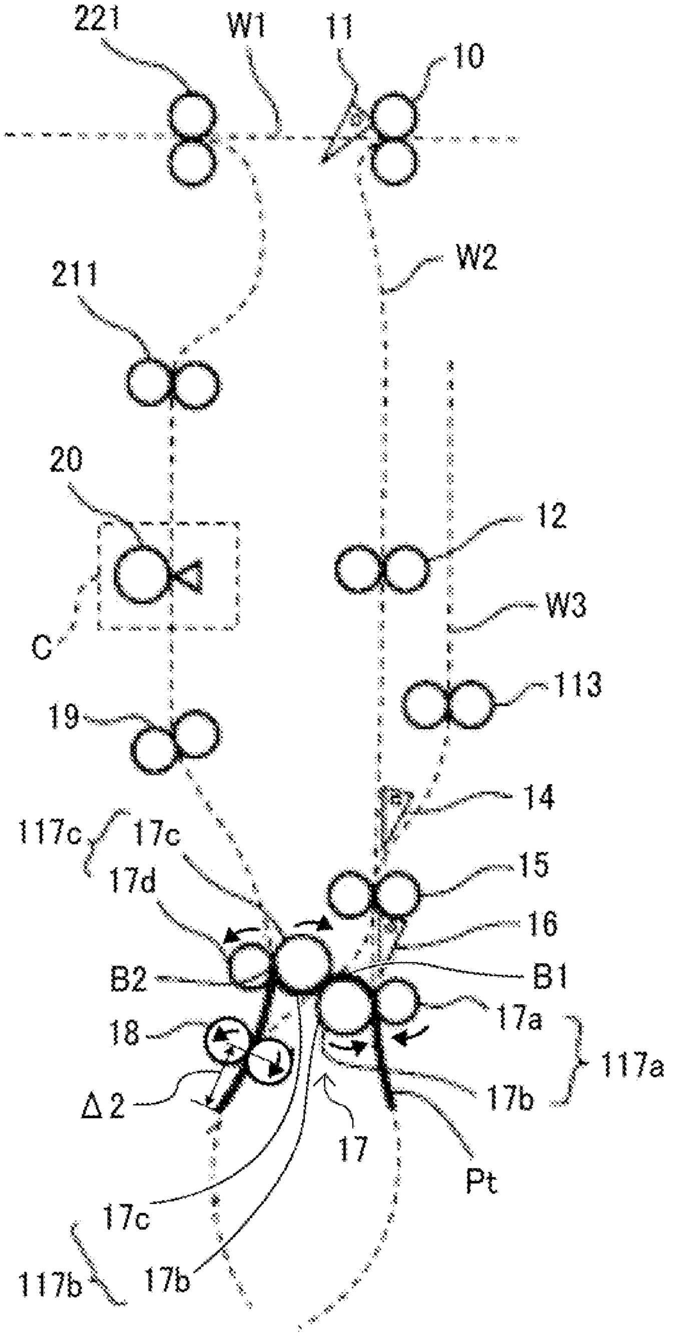

As illustrated in FIG. 29B, this bent portion (a folded-back portion) enters a nip between a second folding roller pair 117*c* serving as a second folding unit including the second folding roller 17*c* and a second pressing roller 17*d* to form a second folded portion in the folded-back portion.

Figure 29C:
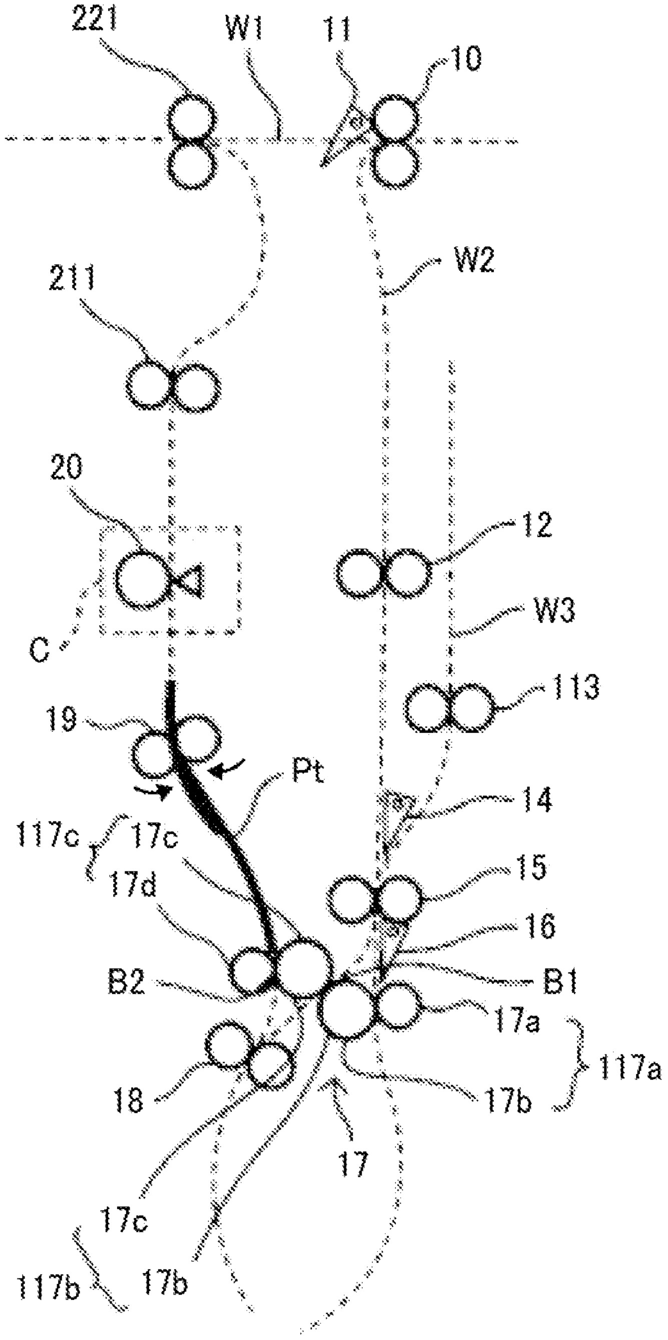

As illustrated in FIG. 29C, an intermediate conveying roller pair 19 conveys the sheet bundle Pt, which has passed the nip of the second folding roller pair 117*c* and has the two folded portions formed as described above, toward an additional folding roller 20.

Figure 29D:
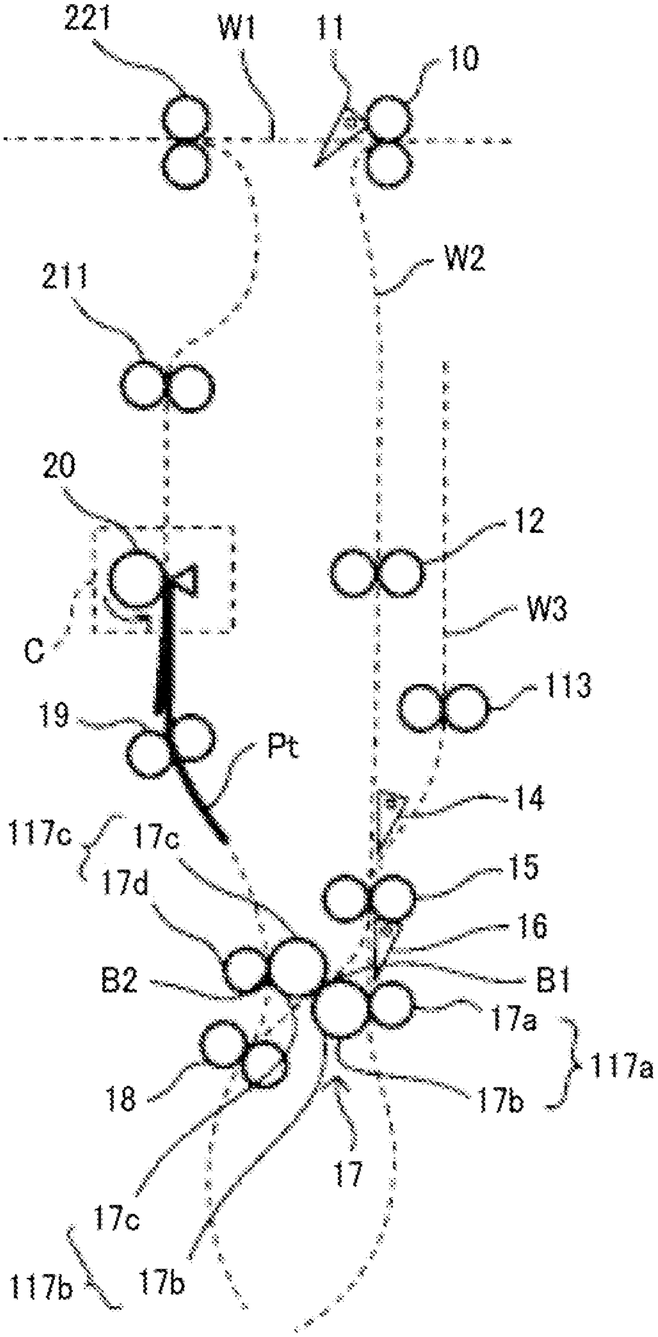

As illustrated in FIG. 29D, when the second folded portion has reached the position opposite the additional folding roller 20, the conveyance of the sheet bundle Pt is stopped. Subsequently, the additional folding roller 20 is rotated to put a sharp crease at the second folded portion, and then, the conveyance of the sheet bundle Pt is resumed. When the first folded portion has reached the position opposite the additional folding roller 20, the conveyance of the sheet bundle Pt is stopped. The additional folding roller 20 is rotated to put a sharp crease at the first folded portion, and then, the conveyance of the sheet bundle Pt is resumed. Two conveying roller pairs 211 and 221 convey the sheet bundle Pt to eject the sheet bundle Pt to the post-processing apparatus 400.

The above description is about the case where the sheet bundle Pt having been subjected to the overlay processing is folded. The folding processing operation of folding one sheet is also performed in a similar manner. In the above description, Z-folding processing is described. The same operation as the Z-folding processing is performed while properly changing the first conveyance amount and the second conveyance amount, thus enabling inner three-folding and outer three-folding to be performed. In two-folding processing, a third branching member 16 is rotated in a clockwise direction in FIGS. 29A to 29D to adopt a posture for guiding the sheet to the first folding roller pair 117*b*. Thereafter, the sheet conveyed from the registration roller pair 15 is conveyed to the first folding roller pair 117*b*. The same operation as the above-described operation to form the second folded portion forms the folded portion at the center of the sheet in the sheet conveyance direction, which enables the two-folding to be performed.

In other words, the folding apparatus 300 according to the present embodiment includes a folding position adjustor that can adjust a position at which a crease is formed in a plurality of different folding processes.

Returning to FIG. 2, a description is given below. The envelope processing apparatus 100 includes an enclosure conveying device 110, an enclosing device 120, a sealer 130, a notification device 190, and an envelope processing controller 150.

The enclosure conveying device 110 performs sheet conveyance processing for conveying the folded sheet Sf, which is conveyed from the sheet folding device 310 to the sealing position, depending on the orientation of the image forming surface Ps of the folded sheet Sf. In the present embodiment, the "sheet conveyance processing" is conveyance processing corresponding to a control mode (including the type of folding, the position of a printed surface) transmitted from the sheet folding controller 320 to the envelope processing controller 150 through a communication line 105. The enclosure conveying device 110 performs, for example, the conveyance processing for conveying the folded sheet Sf downstream in the conveyance direction or the reverse conveyance processing for replacing ends of the folded sheet Sf in the conveyance direction. The folded sheet Sf is conveyed to the enclosing device 120 or the post-processing apparatus 400 by the conveyance processing or the reverse conveyance processing.

The enclosing device 120 includes a mechanism that moves the envelope E to a position where the folded sheet Sf conveyed from the enclosure conveying device 110 can be enclosed, causes the envelope E to be on standby at a specified position, and encloses an enclosure into the envelope E which is on standby. The enclosing device 120 includes a mechanism that performs flap opening processing of opening a flap ef so that the opening of the envelope E is opened before the envelope E reaches a specified position. The enclosing device 120 also includes a mechanism that calculates the length of the envelope E (the dimension in the direction in which the enclosure is enclosed) and the length of the flap ef before the envelope E has reached a specified position. With these mechanisms, the enclosing processing of the folded sheet Sf is performed on the envelope E that is held at a specified position with an opening of the envelope E open. This enclosing processing can be properly performed on envelopes E of various types and sizes.

The sealer 130 performs processing of ejecting the sealed envelope E to an envelope ejection tray 134 after the flap ef of the envelope E in which the folded sheet Sf is enclosed is closed. The ejection operation of the envelope E to the envelope ejection tray 134 is also used to stop the enclosing of the enclosure in the envelope E when the enclosing operation is abnormal and eject the envelope E. The envelope ejection tray 134 corresponds to an ejection position different from the enclosing position.

The notification device 190 as a notifier has a function of notifying a user of the printer system 1 and the envelope processing apparatus 100 of the occurrence of an abnormality when the abnormality occurs in the enclosure conveyance processing, the enclosing processing, and the sealing processing controlled by the envelope processing controller 150.

The envelope processing controller 150 controls operations of a plurality of conveying roller pairs and a plurality of switching members constituting the enclosure conveying device 110, the enclosing device 120 as an enclosing device, and the sealer 130. When the envelope processing controller 150 has detected an abnormality in the control of the above-described configuration, the envelope processing controller 150 notifies a user of the abnormal state via the notification device 190.

The envelope processing controller 150 is a controller that performs conveyance control including reversing control and enclosing control of the folded sheet Sf. The envelope processing controller 150 receives "enclosing target information" as information related to the folded sheet Sf from the printer controller 260 and the sheet folding controller 320. The conveyance control is performed based on the content indicated by each piece of information included in the received enclosing target information.

The "enclosing target information" is information about the sheet S and the sheet Sf as an enclosure. More specifically, the "enclosing target information" includes information for controlling an end (a leading end in a conveyance direction) that is a top of the sheet S or the folded sheet Sf when the sheet S or the folded sheet Sf is enclosed in the envelope E to be an end on a desired side. Examples of the enclosing target information include "folding type information" that defines the type of folding processing performed on the folded sheet Sf. Examples of operation instruction information from the image forming apparatus 200 that is one of upstream side apparatuses include "reversal necessity information" which defines necessity of the reversal conveyance processing described below. Examples of the operation instruction information also include print surface information indicating an image forming surface on which an image is formed on the folded sheet Sf. In the case where the sheet folding device 310 that performs the folding processing includes a configuration that can perform different types of folding processing, examples of the operation instruction information further include "processing apparatus information" indicating the used type (e.g., type A or type B).

The post-processing apparatus 400 includes a post-processing device 410 and a post-processing controller 420. The post-processing device 410 executes specified post-processing on the sheet S conveyed from the upstream side under the control of the post-processing controller 420. The post-processing controller 420 controls the post-processing operation in the post-processing controller 420 depending on the operation mode transmitted from the printer controller 260, the sheet folding controller 320, and the envelope processing controller 150 through a communication line 403.

The printer controller 260, the sheet folding controller 320, the envelope processing controller 150, and the post-processing controller 420 are connected to each other, and exchange information necessary for control through communication lines 207, 105, and 403. Accordingly, the controllers 260, 320, 150, and 420 cooperate with each other to share the sheet size and information about the processing mode requested by a user to be performed on the sheet S and the folded sheet Sf. As a result, the entirety of the printer system 1 shares control information that allows each of the mechanisms described above to perform specified processing with specified timing and a specified process.

The envelope processing controller 150 that performs a central control operation in the present embodiment includes a central processing unit (CPU) as an arithmetic processing unit, and a read only memory (ROM) and a random access memory (RAM) as storage devices. The envelope processing controller 150 includes an interface that outputs control signals to conveying roller pairs and inputs signals from the conveying roller pairs, and an interface that receives output signals from sensors. The operation of the envelope processing apparatus 100 is controlled by control programs that can execute control processing using the above-described hardware resources. Details of functional blocks of the envelope processing controller 150 are given below.

Similarly to the envelope processing controller 150, the printer controller 260, the sheet folding controller 320, and the post-processing controller 420 also control the operations of hardware mechanisms by control programs that perform respective functions using hardware resources including, for example, the CPU, the ROM, and the RAM.

In FIGS. 1 and 2, the example in which the post-processing apparatus 400 is coupled to the downstream side of the envelope processing apparatus 100 is illustrated as an example of the configuration of the printer system 1. Typical examples of the post-processing apparatus 400 include a finisher that performs stapling processing, a stacker, and a bookbinding machine. The system configuration of the printer system 1 may be such a configuration in which the envelope processing apparatus 100 is placed on the most downstream side.

A description is given below of a control operation of the printer system 1 according to an embodiment of the present disclosure. In the present embodiment, the control operation includes control processing based on the envelope length of an envelope E and the flap length of a flap of calculated by the enclosing device 120 to be described below and processing for determining that the flap ef is normally open by the time when the envelope E is conveyed to the enclosing position. When the flap ef is not normally opened, the envelope processing controller 150 executes processing for opening the flap ef (flap opening processing) again and includes retry processing in which the envelope E is conveyed to the enclosing position after the flap ef is open.

The envelope processing controller 150 executes processing that calculates a length of the envelope E (envelope length) and a length of the flap ef (flap length) included in the envelope E with a control processing program by the time when the envelope E is conveyed to the enclosing position. The envelope processing controller 150 also executes processing that notifies the sheet folding controller 320, the post-processing controller 420, and the printer controller 260 via the sheet folding controller 320 of the calculated envelope length and the flap length.

In the present embodiment, the envelope length corresponds to a length from a front end (leading end) of the envelope E to a rear end (trailing end) of the envelope E in the conveyance direction when the envelope E is conveyed to an enclosing position. As described below, the conveyance (switchback conveyance) in which the front end and the rear end of the envelope E in the conveyance direction are switched is performed by the time when the envelope E is conveyed from the stacked position to the enclosing position. Thus, the leading end and the trailing end of the envelope E are switched during the conveyance. Since the flap ef of the envelope E is open during conveyance, both ends of the envelope E with the flap ef not opened are ends of a body of the envelope E. With the flap ef open, one end of the envelope E is an end of the flap ef.

In the following description, the leading end and the trailing end of the envelope E are described according to the conveyance state of the envelope E. The length from the leading end to the trailing end of the envelope E with the flap ef closed is referred to as "first envelope length". In addition, the length from the leading end to the trailing end of the envelope E with the flap ef open is referred to as "second envelope length".

Accordingly, the first envelope length corresponds to a so-called top and bottom dimension of the envelope E, and corresponds to a length from a bottom of the envelope E to a position at which the flap ef is folded. In the following description, the length described above is referred to as "envelope body length". The second envelope length corresponds to a length from the bottom of the envelope E to the leading end of the flap ef with the flap ef open. In other words, the second envelope length corresponds to a length obtained by adding a length of the flap ef to a length of the body of the envelope E. Accordingly, a value obtained by subtracting the first envelope length from the second envelope length corresponds to a length of the flap ef in the conveyance direction of the envelope E. In the following description, this length may be referred to as "flap length".

The envelope processing controller 150 controls the conveyance amount of the envelope E based on the body length and the flap length of the envelope E to perform envelope conveyance control that conveys the envelope E to the enclosing position.

In addition, the envelope processing controller 150 can determine whether the flap ef is in a normally open state, based on the calculation result of the flap length. When the envelope processing controller 150 determines that the flap ef is in a normally open state, the envelope processing controller 150 conveys the envelope E to the enclosing position. When the envelope processing controller 150 determines whether the flap ef is not in a normally open state, the envelope processing controller 150 executes control for recovery conveyance processing in which an operation for opening the flap ef is repeatedly performed.

Figure 3:
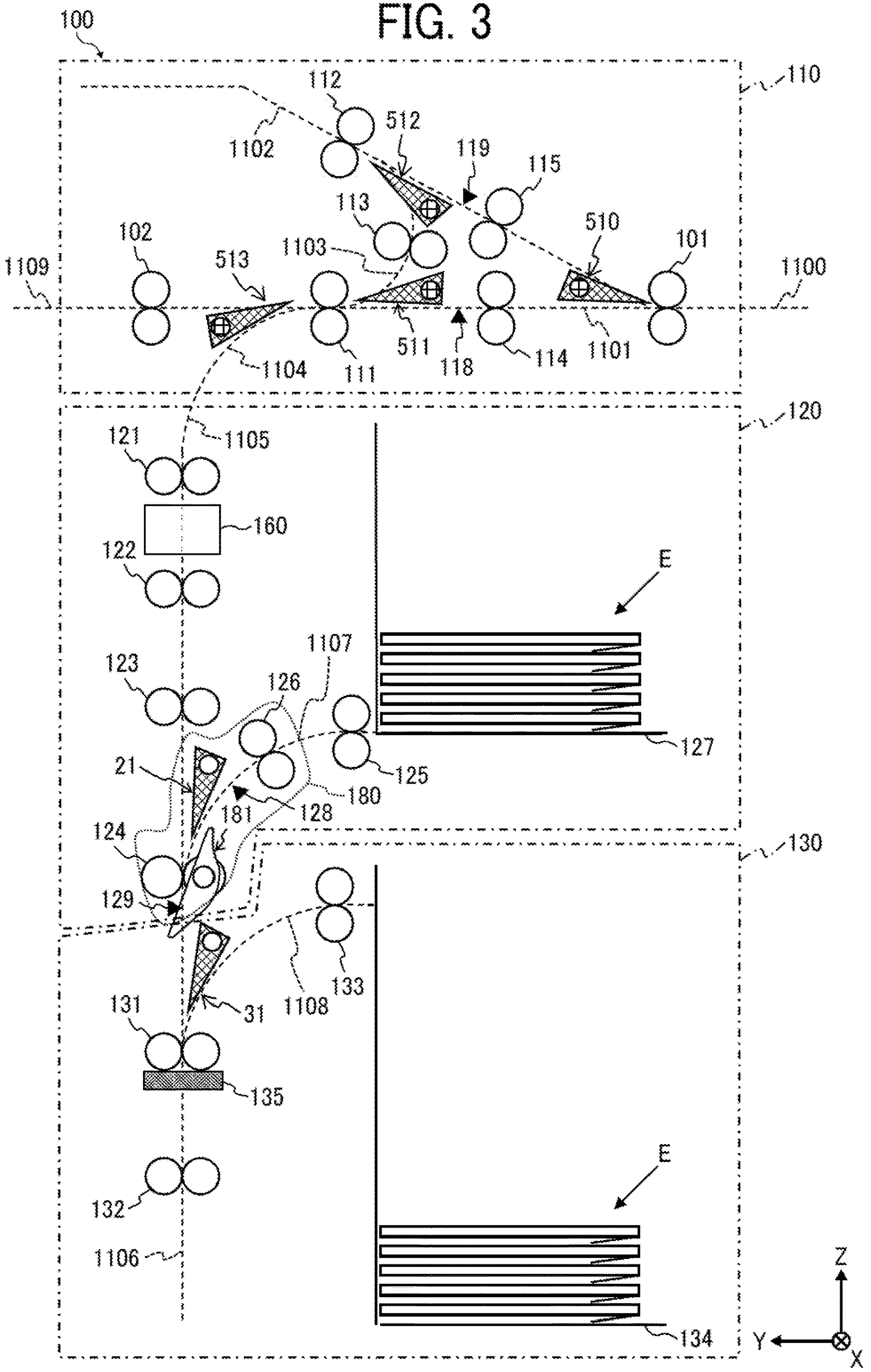
FIG. 3 is a diagram illustrating an internal configuration of an envelope processing apparatus according to an embodiment of the present disclosure.

Next, with reference to FIG. 3, a description is given of conveying roller pairs of the enclosure conveying device 110, the enclosing device 120, and the sealer 130 disposed in the envelope processing apparatus 100, and a mechanism for switching a conveyance path and a conveyance direction of a conveyed object.

As illustrated in FIG. 3, the enclosure conveying device 110 includes a plurality of conveyance paths distinguished as an entry passage 1100, a first conveyance passage 1101, a second conveyance passage 1102, a switchback conveyance passage 1103, an enclosing conveyance passage 1104 as a fourth conveyance passage, and a sheet exit passage 1109.

The enclosure conveying device 110 performs processing that turns the conveyed object into a proper direction when the conveyed object is enclosed in the envelope E. When the enclosure conveying device 110 does not perform enclosing processing to be described below on the folded sheet Sf conveyed from the folding apparatus 300, the enclosure conveying device 110 causes the folded sheet Sf, which has been conveyed by an entrance roller pair 101, to pass from the entry passage 1100 toward the first conveyance passage 1101. The folded sheet Sf is ejected to the apparatus on the downstream side via the sheet exit passage 1109.

When the enclosure conveying device 110 performs enclosing processing to be described below on the folded sheet Sf conveyed from the folding apparatus 300, the enclosure conveying device 110 conveys the folded sheet Sf to the enclosing conveyance passage 1104 as the fourth conveyance passage that branches from the first conveyance passage 1101 and communicates with an enclosing roller pair 121 holding the envelope E. As described below, the enclosing conveyance passage 1104 communicates with an envelope enclosing conveyance passage 1105.

As illustrated in FIG. 3, the enclosing device 120 includes the envelope enclosing conveyance passage 1105 connected to the enclosing conveyance passage 1104 that receives the sheet S or the folded sheet Sf as an enclosure from the enclosure conveying device 110 and encloses the sheet S or the folded sheet Sf into the envelope E.

A first vertical conveying roller pair 122 and a second vertical conveying roller pair 123 for conveying the envelope E to a position where the folded sheet Sf is received are disposed in the envelope enclosing conveyance passage 1105. In the envelope enclosing conveyance passage 1105, the envelope E conveyed to a position to receive the folded sheet Sf is held by the enclosing roller pair 121.

An enclosing support 160 is disposed between the enclosing roller pair 121 and the first vertical conveying roller pair 122 and on the lateral side of the envelope enclosing conveyance passage 1105.

The enclosing support 160 corresponds to an enclosing unit that evacuates the flap ef, which may be an obstacle for the enclosure conveyed toward the enclosing position to enter the envelope E, from the envelope enclosing conveyance passage 1105 and assists the enclosure to be smoothly enclosed at the enclosing position. The enclosing support 160 holds the flap ef at an evacuation position away from the envelope enclosing conveyance passage 1105. As a result, the state in which the flap ef does not obstruct the entry (enclosing) of the enclosure into the envelope E is formed. The enclosing support 160 expands the frontage of the envelope E while maintaining the flap ef at the evacuation position, and performs an operation of supporting the enclosing operation so that the enclosing of the enclosure is smoothly performed.

The envelope enclosing conveyance passage 1105 is connected to a sealing conveyance passage 1106 for performing sealing processing on the envelope E in which the enclosure is enclosed. The envelope enclosing conveyance passage 1105, the enclosing conveyance passage 1104, and the sealing conveyance passage 1106 are coupled together to form an envelope conveyance path.

A flap opening roller pair 124 is disposed at a junction position of the conveyance passage extending from the envelope enclosing conveyance passage 1105 to the sealing conveyance passage 1106. The flap opening roller pair 124 is provided with a flap opening member 181 as a claw-shaped member for opening the flap ef. When the envelope E is taken out from an envelope load tray 127, passes an envelope entry passage 1107, and joins the envelope enclosing conveyance passage 1105, the flap opening member 181 acts to open the flap ef of the envelope E.

As a series of mechanisms for performing an operation of opening the flap ef by using the flap opening member 181, a flap opening mechanism 180 that performs processing of opening the flap ef while conveying the envelope E and recovery processing when the flap ef is not opened is disposed adjacent to a joining position of the envelope entry passage 1107 and the envelope enclosing conveyance passage 1105.

The flap opening mechanism 180 includes a sensor disposed upstream from the flap opening roller pair 124 in the conveyance direction. This sensor is a sensor for detecting the envelope E with the flap ef closed and is a separation sensor 128 serving as a first envelope detector for detecting an end of the envelope E and calculating the first envelope length. The flap opening mechanism 180 includes a sensor disposed downstream from the flap opening roller pair 124 in the conveyance direction. This sensor is a sensor for detecting the envelope E with the flap ef to be opened by the flap opening member 181 and includes a flap opening sensor 129 as a second envelope detector for detecting an end of the envelope E and calculating the second envelope length.

In other words, the envelope processing controller 150 calculates the first envelope length and the second envelope length based on detection results of a plurality of sensors included in the flap opening mechanism 180 and determines whether the flap ef of the envelope E is normally open based on the plurality of calculation results of the plurality of sensors.

An envelope switchback switching member 21 for switching the conveyance direction of the envelope E is disposed at a junction where the envelope enclosing conveyance passage 1105 and the envelope entry passage 1107 join each other. The envelope switchback switching member 21 is also included in the flap opening mechanism 180.

A separation roller pair 125, an envelope conveying roller pair 126, and the separation sensor 128 serving as a first envelope length detector are disposed in the envelope entry passage 1107 for supplying the envelope E to the envelope enclosing conveyance passage 1105. The envelope load tray 127 is disposed at an end of the envelope entry passage 1107. Together with the envelope enclosing conveyance passage 1105, the envelope entry passage 1107 also constitutes the envelope conveyance path.

Multiple envelopes E are stacked on the envelope load tray 127. The envelope E placed on the envelope load tray 127 is in a state where the bottom which is an opposite end of the flap ef faces the separation roller pair 125. When the envelope E is ejected from the envelope load tray 127, the leading end of the envelope E in the conveyance direction corresponds to the bottom of the envelope E. Accordingly, the end of the portion where the flap ef is provided is the trailing end of the envelope E.

One envelope E is picked up from multiple envelopes E placed on the envelope load tray 127 by the separation roller pair 125 and passes the envelope entry passage 1107 by the separation roller pair 125 and the envelope conveying roller pair 126 and is conveyed to a position beyond the envelope switchback switching member 21. When the trailing end of the envelope E in the conveying direction has reached a position beyond a tip (a rotating end) of the envelope switchback switching member 21 together with the conveyance by the flap opening roller pair 124, the envelope switchback switching member 21 rotates and switches to a state in which the envelope E can be conveyed in a switchback manner.

In other words, the envelope switchback switching member 21 rotates between a first position where the envelope E taken out from the envelope load tray 127 passes the envelope enclosing conveyance passage 1105 and is temporarily conveyed to the sealing conveyance passage 1106 and a second position at which the envelope E is conveyed toward the enclosure conveying device 110 in the envelope enclosing conveyance passage 1105. When the envelope switchback switching member 21 is placed at the first position, the tip of the envelope switchback switching member 21 is placed at a position where the envelope switchback switching member 21 does not straddle the envelope entry passage 1107, and forms a state in which the envelope E can move to the envelope enclosing conveyance passage 1105. When the envelope switchback switching member 21 is placed at the second position, the tip of the envelope switchback switching member 21 is placed at a position at which the envelope switchback switching member 21 straddles the envelope entry passage 1107. Thus, the envelope switchback switching member 21 forms a state in which the envelope E is conveyed in the switchback manner and can move from the sealing conveyance passage 1106 to the envelope enclosing conveyance passage 1105. The envelope switchback switching member 21 switches the conveyance direction of the envelope E in the envelope enclosing conveyance passage 1105.

The first vertical conveying roller pair 122 and the second vertical conveying roller pair 123 convey and hold the envelope E to an enclosing position as a specified position in the envelope enclosing conveyance passage 1105. As described below, the enclosing position is a position where the position of the opening of the envelope E (the position of the flap ef) is lower than the enclosing roller pair 121 and higher than the first vertical conveying roller pair 122.

The enclosing roller pair 121 is a type of conveying roller pair that rotates in a direction in which the folded sheet Sf conveyed from the enclosure conveying device 110 is enclosed into the envelope E.

As illustrated in FIG. 3, the sealer 130 includes a third vertical conveying roller pair 131 and a fourth vertical conveying roller pair 132 in the sealing conveyance passage 1106. A sealing device 135 as a sealer is disposed between the third vertical conveying roller pair 131 and the fourth vertical conveying roller pair 132. The sealing device 135 closes the flap ef of the envelope E in which the enclosure is enclosed.

The third vertical conveying roller pair 131 and the fourth vertical conveying roller pair 132 convey and hold the envelope E to and at a specified position in the sealing conveyance passage 1106.

An envelope ejection switching member 31 is disposed at the branching position at which an envelope ejection passage 1108 branches from the sealing conveyance passage 1106. An envelope ejection roller pair 133 is disposed at an end of the envelope ejection passage 1108. The envelope ejection roller pair 133 is a roller pair that ejects the envelope E toward the envelope ejection tray 134. The envelope ejection tray 134 is a tray on which the ejected envelope E is placed.

The envelope ejection switching member 31, which is a member that switches the conveyance direction of the envelope E, rotates between a position at which the envelope E is conveyed from the flap opening roller pair 124 to the third vertical conveying roller pair 131 in the enclosing conveyance passage 1104 and a position at which the envelope E is conveyed from the enclosing conveyance passage 1104 to the envelope ejection passage 1108.

As described above, the conveyance paths that convey the folded sheet Sf from the enclosure conveying device 110 to the enclosing device 120 and the sealer 130 are disposed in connection with each other in the vertical direction (Z direction) in the envelope processing apparatus 100. This connected conveyance path, which serves as both a conveyance path for the folded sheet Sf and a conveyance path for the envelope E, corresponds to a vertical conveyance path in which the envelope enclosing conveyance passage 1105 of the enclosing device 120 and the sealing conveyance passage 1106 of the sealer 130 are connected in the vertical direction (Z direction).

Next, an example of a series of processes of the enclosing operation and the sealing operation in the envelope processing apparatus 100 is described with reference to FIGS. 4 to 16. In FIGS. 4 to 16, reference signs are mainly assigned to elements used in the description of each of operation steps.

Figure 4:
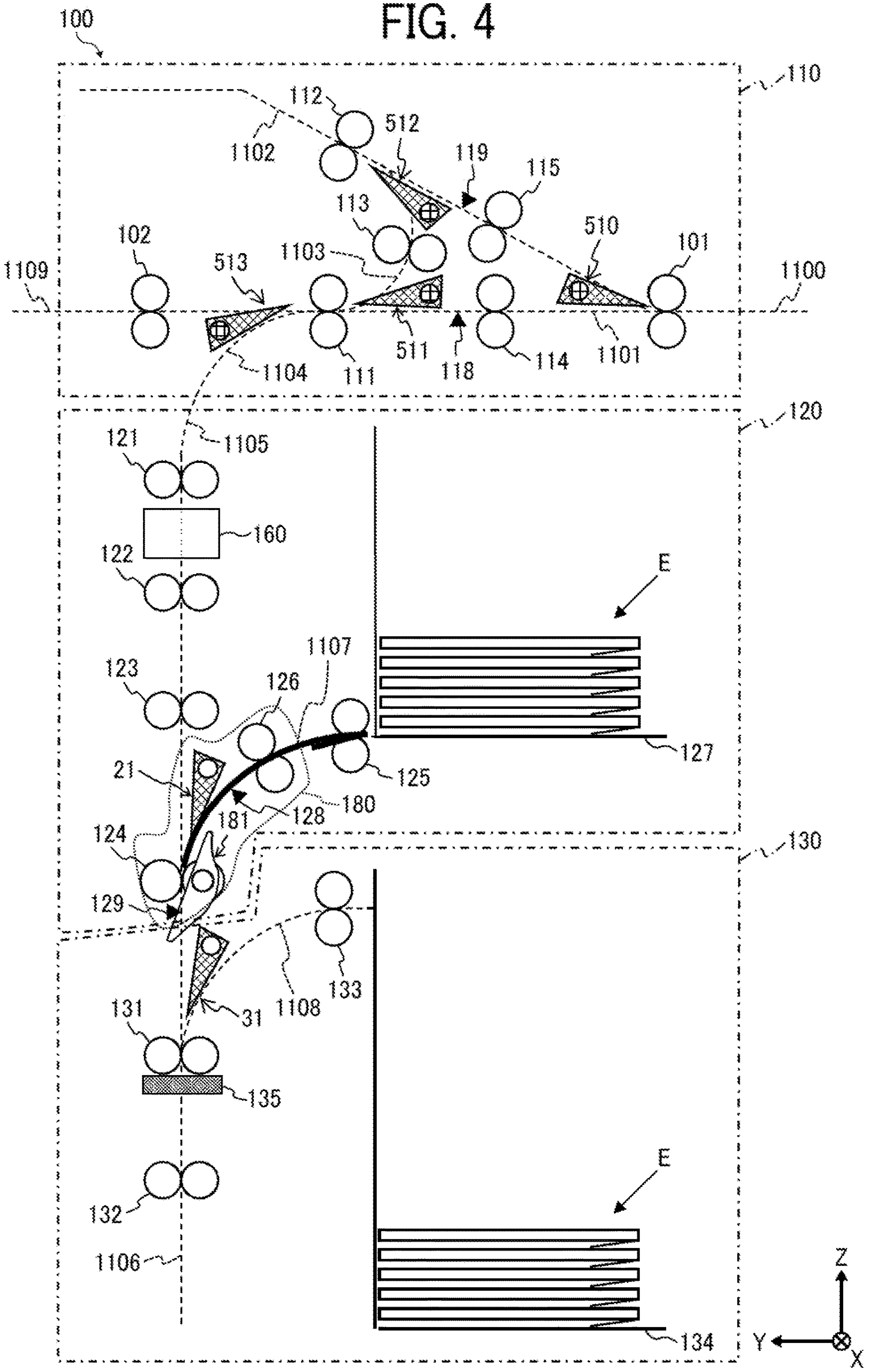
FIG. 4 is a cross-sectional view of the envelope processing apparatus, illustrating one step of an enclosing operation performed by the envelope processing apparatus according to an embodiment of the present disclosure.

First, as illustrated in FIG. 4, envelopes E are separated one by one by the rotation of the separation roller pair 125 from the envelope load tray 127 on which the multiple envelopes E are stacked, and are conveyed to the envelope conveying roller pair 1107. The separated envelope E is conveyed to the flap opening roller pair 124 by the envelope conveying roller pair 126 disposed in the envelope entry passage 1107.

At this time, a leading end and a trailing end of the envelope E in the conveyance direction are detected by the separation sensor 128. The first envelope length is calculated based on the detection result of the separation sensor 128 as described below.

When the envelope E is conveyed through the envelope entry passage 1107, as illustrated in FIG. 4, the envelope switchback switching member 21 is directed such that the envelope E can be conveyed from the envelope entry passage 1107 to the envelope enclosing conveyance passage 1105. As illustrated in FIG. 4, the envelope ejection switching member 31 is oriented in a direction in which the envelope E can enter the sealing conveyance passage 1106 from the envelope enclosing conveyance passage 1105.

The flap opening roller pair 124, the third vertical conveying roller pair 131, and the fourth vertical conveying roller pair 132 rotate in a direction in which the envelope E is conveyed in the −Z direction. As a result, the envelope E is conveyed from the envelope entry passage 1107 to the envelope enclosing conveyance passage 1105.

Figure 5:
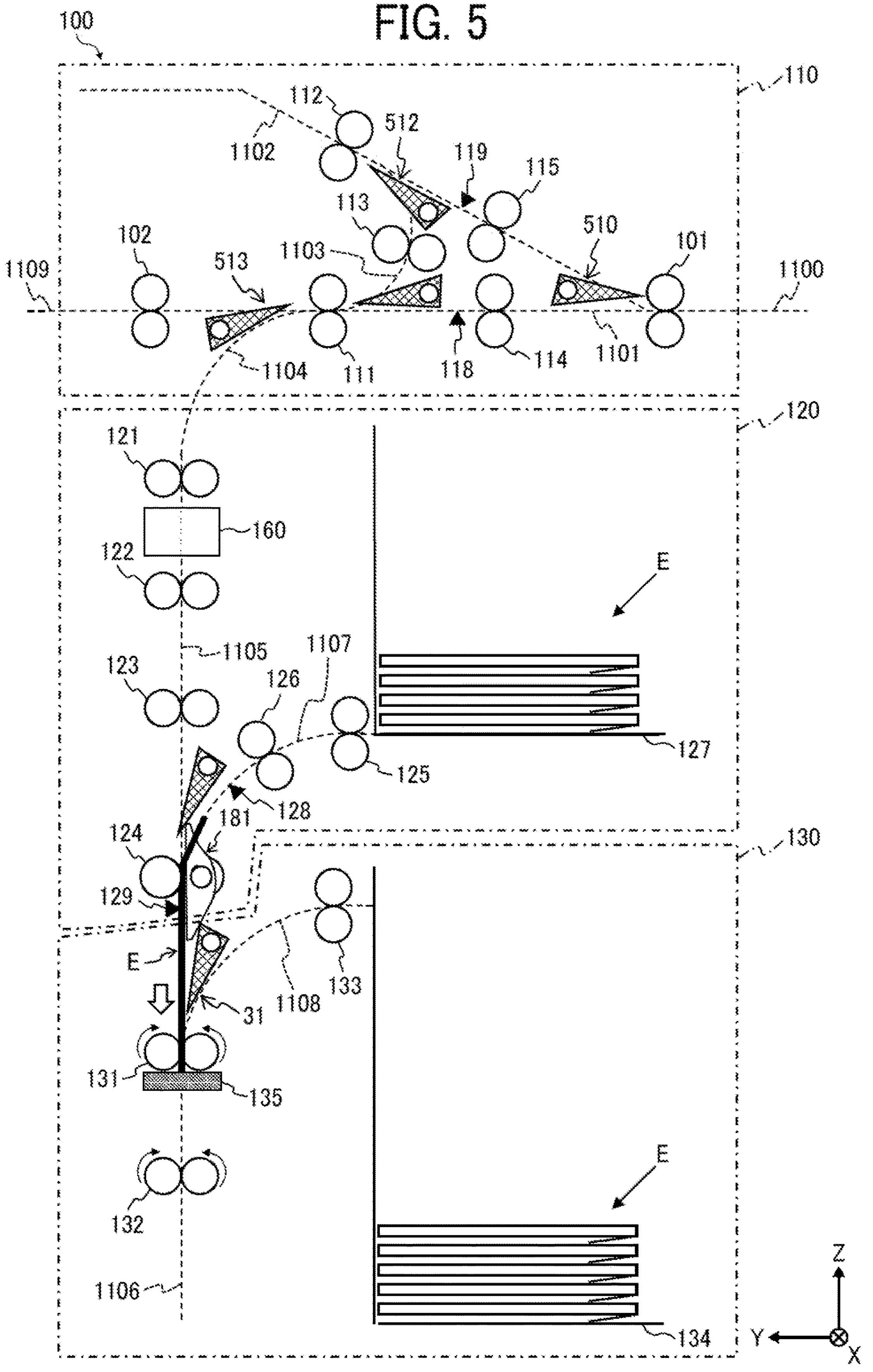
FIG. 5 is a cross-sectional view of the envelope processing apparatus, illustrating one step of an enclosing operation performed by the envelope processing apparatus, subsequent to FIG. 4.

Subsequently, as illustrated in FIG. 5, when the envelope E completely passes the flap opening roller pair 124, the flap ef is being opened by the flap opening member 181. The flap opening roller pair 124, the third vertical conveying roller pair 131, and the fourth vertical conveying roller pair 132 continue to rotate.

Figure 6:
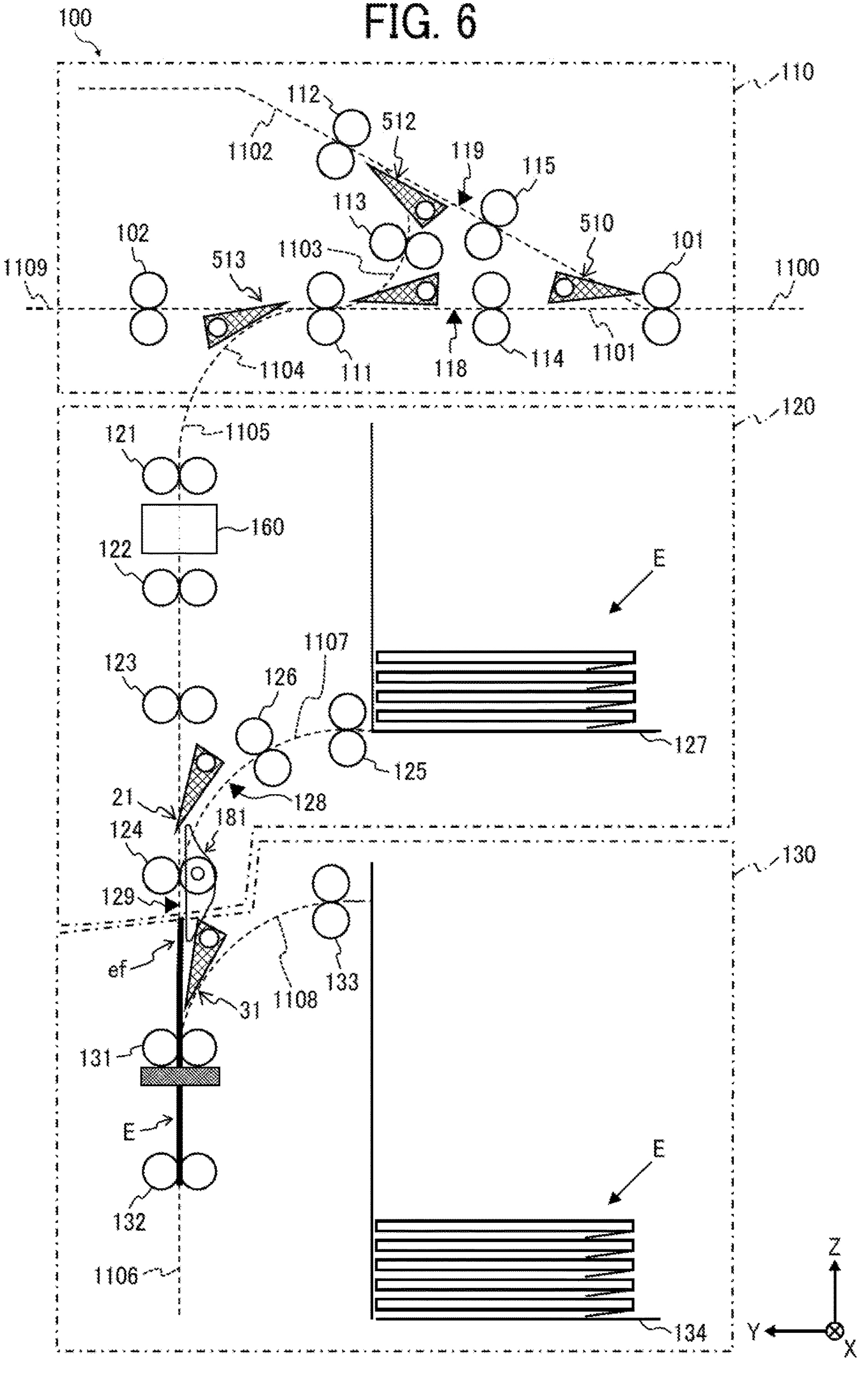
FIG. 6 is a cross-sectional view of the envelope processing apparatus, illustrating one step of an enclosing operation performed by the envelope processing apparatus, subsequent to FIG. 5.

Thereafter, as illustrated in FIG. 6, when the end of the flap ef opened has passed the flap opening sensor 129, the rotation of the flap opening roller pair 124, the third vertical conveying roller pair 131, and the fourth vertical conveying roller pair 132 is temporarily stopped. Thus, the envelope E is switched back and conveyed in the envelope enclosing conveyance passage 1105.

A description is given of the outline of the operation of the flap opening mechanism 180 and the calculation processing of the envelope length in the conveyance operation of the envelope E with reference to FIGS. 4, 5, and 6. First, as illustrated in FIG. 4, the leading end of the envelope E in the conveyance direction conveyed toward the flap opening roller pair 124 is detected by the separation sensor 128 on the way to the nip of the flap opening roller pair 124.

The trailing end in the conveying direction of the envelope E whose flap ef is closed is also detected by the separation sensor 128 before the flap opening roller pair 124 conveys the envelope E to the position illustrated in FIG. 5. In other words, in the process from FIG. 4 to FIG. 5, the envelope processing controller 150 calculates the first envelope length as an envelope length of the envelope with the flap ef closed, based on, for example, the time from when the leading end of the envelope E in the conveyance direction is detected by the separation sensor 128 to when the trailing end of the envelope E in the conveyance direction is detected by the separation sensor 128 (i.e., the difference between the detection times of the ends in the conveyance direction), the conveyance speed of the envelope E, or the number of rotations per unit time of the envelope conveying roller pair 126.

As illustrated in FIG. 5, when the leading end (bottom) of the envelope E in the conveyance direction faces the flap opening roller pair 124, passes the nip of the flap opening roller pair 124, and moves in the −Z direction, the leading end of the envelope E in the conveyance direction contacts the flap opening member 181. A tip portion of the flap opening member 181 at this time is placed at a stationary position so as to block the envelope enclosing conveyance passage 1105. Accordingly, the flap opening member 181 is pressed by the conveyed envelope E to rotate, and the envelope E is in a state where the envelope E can travel in the envelope enclosing conveyance passage 1105. As a result, the envelope E is conveyed to the envelope enclosing conveyance passage 1105.

As illustrated in FIG. 6, when the envelope E is conveyed by the flap opening roller pair 124, the flap opening member 181 rotates to turn the flap ef to an open state. Further, the envelope E is conveyed in the conveyance direction.

Figure 7:
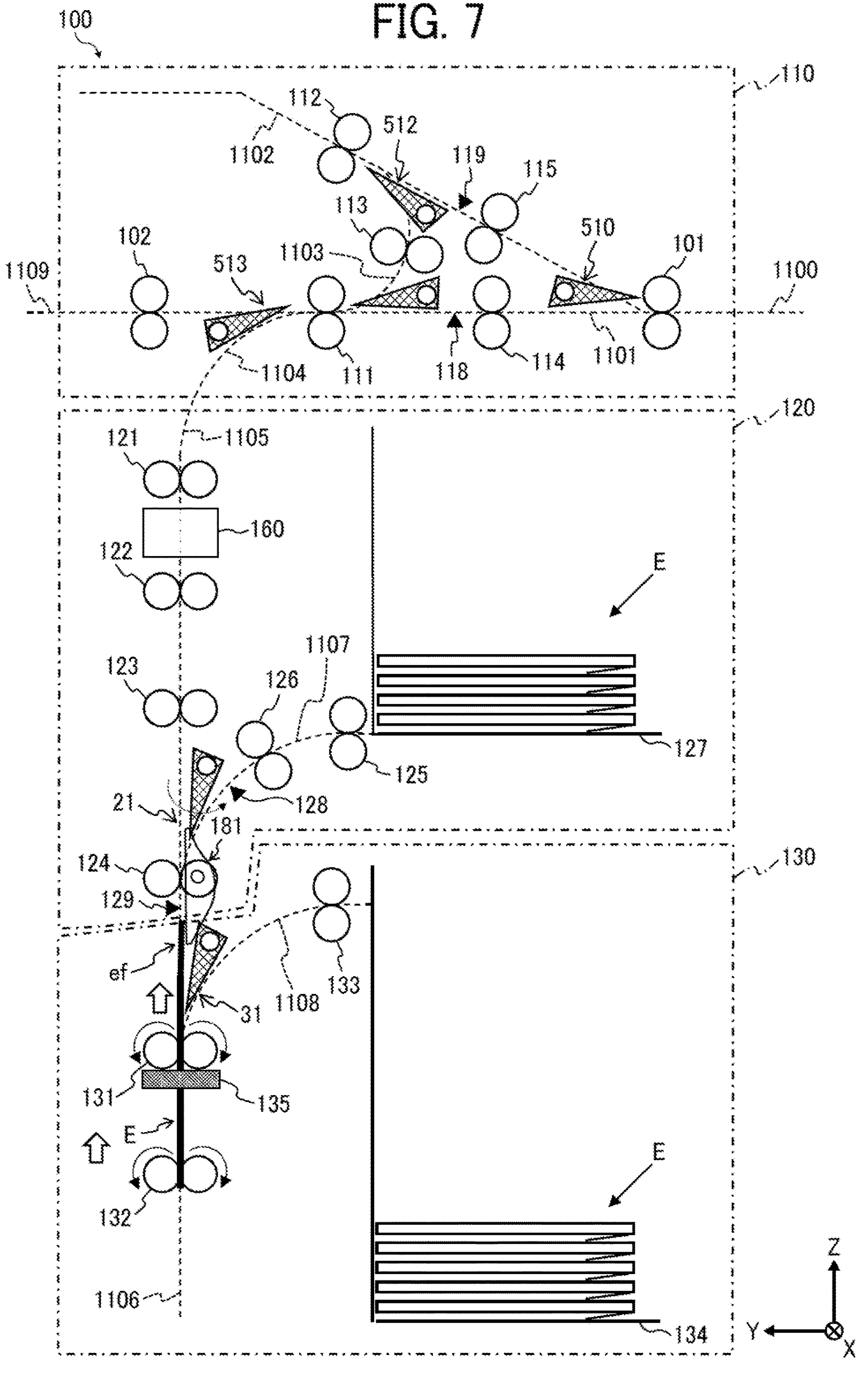
FIG. 7 is a cross-sectional view of the envelope processing apparatus, illustrating one step of an enclosing operation performed by the envelope processing apparatus, subsequent to FIG. 6.

Subsequent to FIG. 6, as illustrated in FIG. 7, after the flap ef of the envelope E is being opened and reaches a position where the flap ef has passed the flap opening roller pair 124, the third vertical conveying roller pair 131 and the fourth vertical conveying roller pair 132 are rotated in reverse. As a result, the envelope E is conveyed in the +Z direction in the sealing conveyance passage 1106 and the envelope enclosing conveyance passage 1105 by the above-described reverse rotation.

This conveyance is referred to as "switchback conveyance". The envelope switchback switching member 21 rotates in a direction indicated by a broken arrow in FIG. 7 and moves from a position where the tip of the envelope switchback switching member 21 straddles the envelope enclosing conveyance passage 1105, before switchback conveyance of the envelope E starts or simultaneously with switchback conveyance. As a result, the envelope E turns into the state in which the envelope E can be conveyed upward in the envelope enclosing conveyance passage 1105. As a result, the envelope E is conveyed to an enclosing position of the enclosing device 120 by switchback conveyance.

Accordingly, the end (the trailing end in the conveyance direction) of the flap ef is detected by the flap opening sensor 129. Then, the bottom (the leading end in the conveyance direction) of the envelope E is detected by the flap opening sensor 129. When the envelope E is conveyed in the switchback manner, the end of the flap ef is the top in the conveyance direction. However, in the following descriptions, the end of the flap ef is referred to as "the trailing end in the conveyance direction" regardless of the actual movement direction (conveyance direction) of the envelope E in order to unify the expression. The bottom side of the envelope E is referred to as the "leading end in the conveyance direction".

Accordingly, both of the end (the trailing end in the conveyance direction) of the flap ef and the bottom (the leading end in the conveyance direction) of the envelope E are detected by the flap opening sensor 129 by the time when the flap ef reaches the first vertical conveying roller pair 122. In other words, the leading end and the trailing end in the conveyance direction of the envelope E whose flap ef is open are detected by the flap opening sensor 129. The time from when the trailing end in the conveyance direction (the end of the flap ef) is detected by the flap opening sensor 129 to when the leading end in the conveyance direction (the bottom of the envelope E) can be calculated based on the detection result of the flap opening sensor 129. The envelope length (second envelope length) when the flap ef is open can also be calculated by the conveyance speed of the envelope E or by the number of rotations per unit time of the third vertical conveying roller pair 131 and the fourth vertical conveying roller pair 132.

The length of the flap ef (flap length) can be calculated by subtracting the envelope length when the flap ef is closed (first envelope length) from the envelope length when the flap ef is open (second envelope length).

Figure 8:
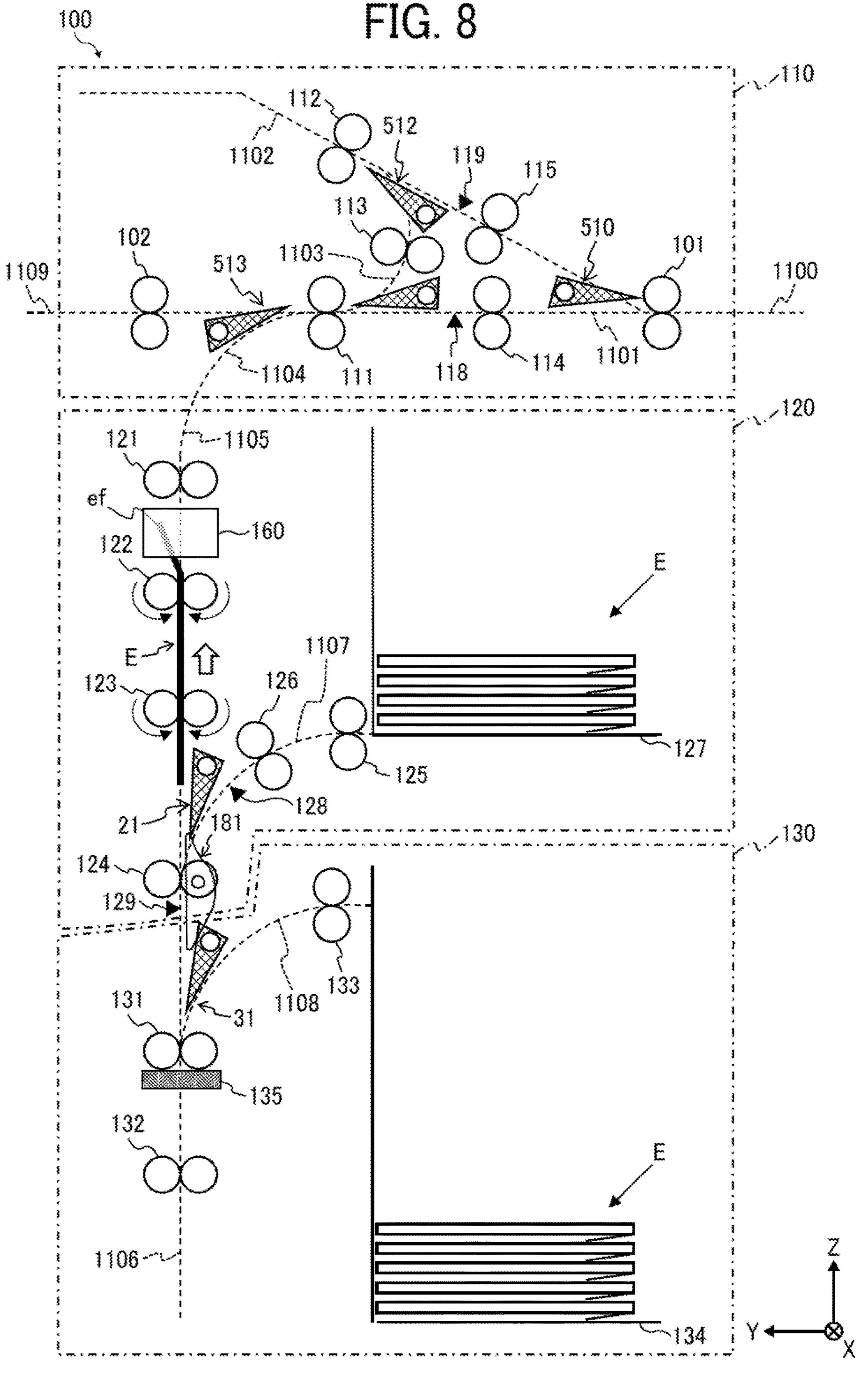
FIG. 8 is a cross-sectional view of the envelope processing apparatus, illustrating one step of an enclosing operation performed by the envelope processing apparatus, subsequent to FIG. 7.

Subsequently, as illustrated in FIG. 8, the envelope E is conveyed by the second vertical conveying roller pair 123 and the first vertical conveying roller pair 122 until the envelope E reaches the enclosing position corresponding to the flap length. When the flap ef has reached a position, corresponding to the flap length, where the flap ef passes the first vertical conveying roller pair 122, the rotations of the second vertical conveying roller pair 123 and the first vertical conveying roller pair 122 are stopped, and then, the enclosing standby operation is started.

In the control that conveys the envelope E to the position for entering the enclosure standby operation, the envelope processing controller 150 may calculate the conveyance amount of the envelope E from the rotation amount of each conveying roller pair after the separation roller pair 125 takes out the envelope E, and may determine the position of the envelope E in the envelope enclosing conveyance passage 1105 based on the conveyance amount and the length of the conveyance path.

Figure 9:
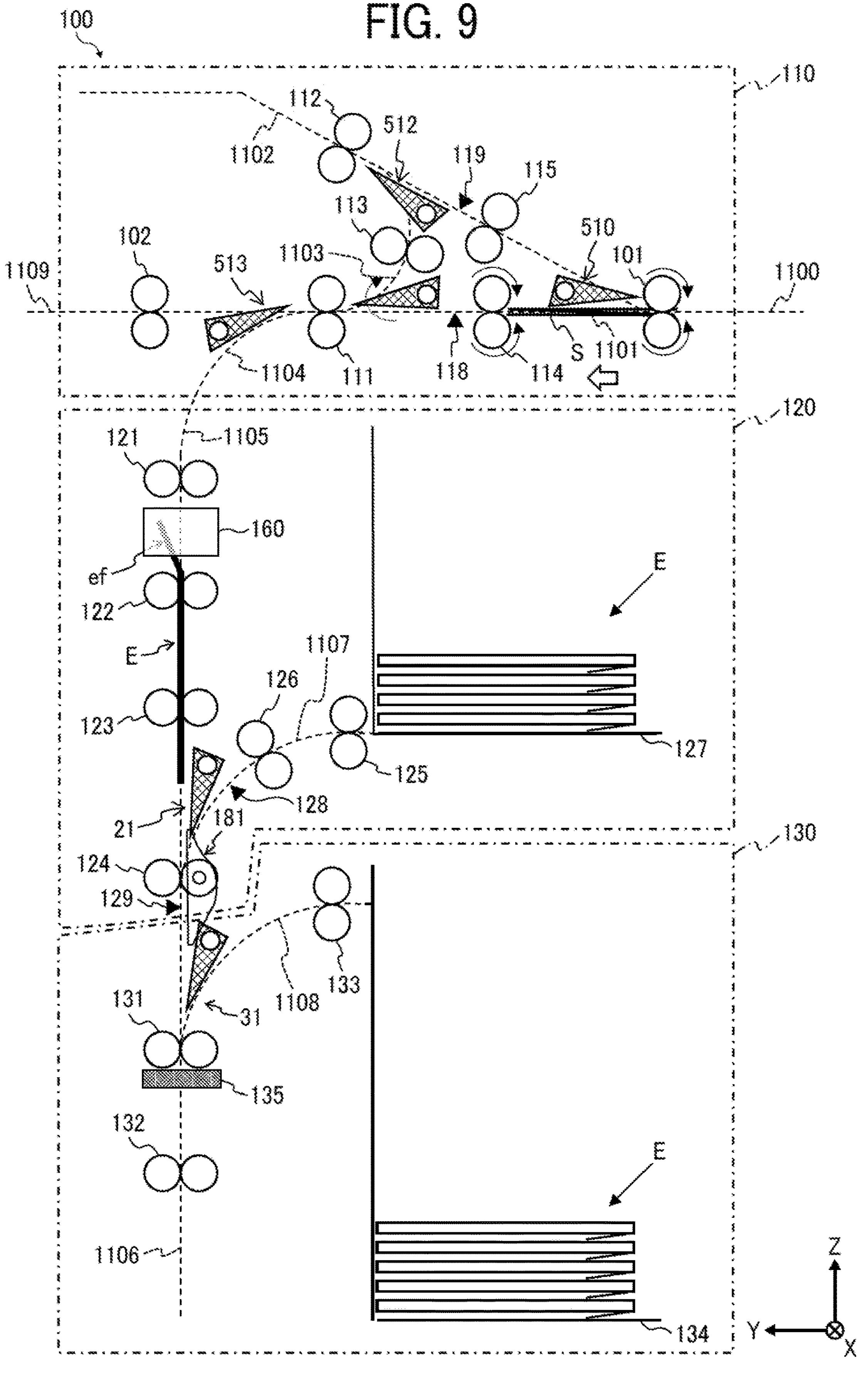
FIG. 9 is a cross-sectional view of the envelope processing apparatus, illustrating one step of an enclosing operation performed by the envelope processing apparatus, subsequent to FIG. 8.

Subsequently, as illustrated in FIG. 9, in a state where the envelope E is on standby at the enclosing position, the envelope processing apparatus 100 receives the folded sheet Sf from the upstream apparatus (the folding apparatus 300) by the entrance roller pair 101 and conveys the folded sheet Sf to the first conveyance passage 1101.

Figure 10:
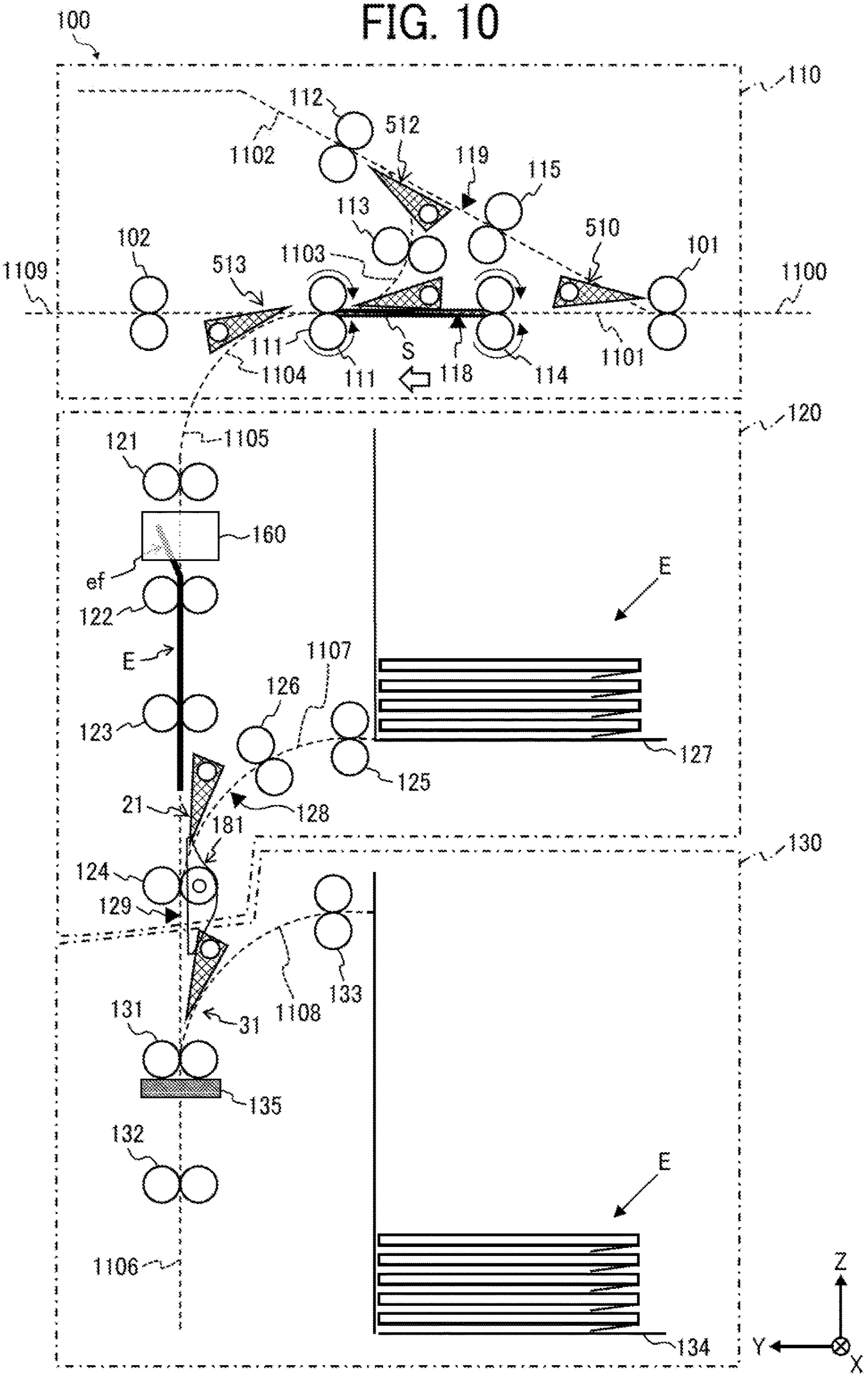
FIG. 10 is a cross-sectional view of the envelope processing apparatus, illustrating one step of an enclosing operation performed by the envelope processing apparatus, subsequent to FIG. 9.
Figure 11:
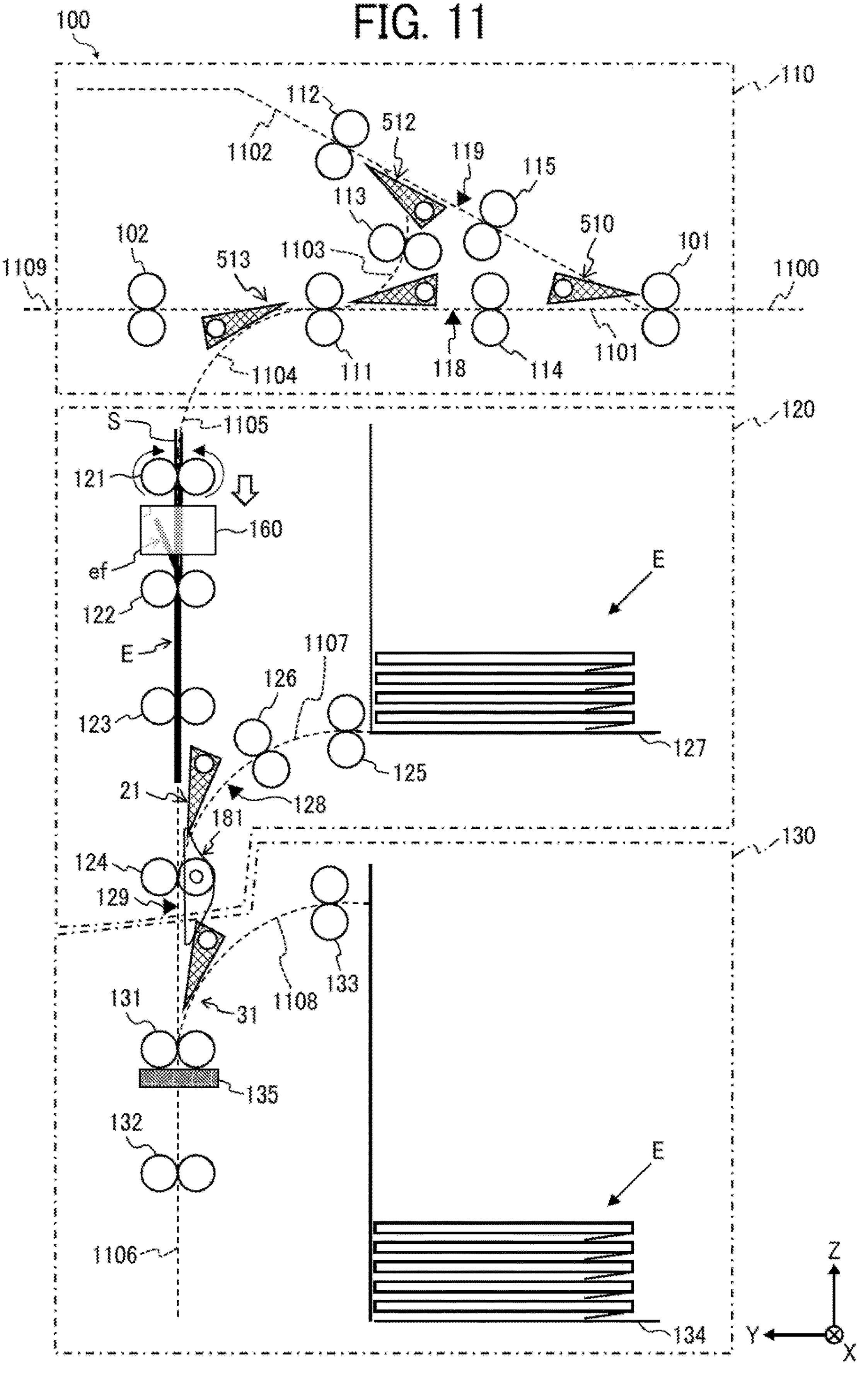
FIG. 11 is a cross-sectional view of the envelope processing apparatus, illustrating one step of an enclosing operation performed by the envelope processing apparatus, subsequent to FIG. 10.

Subsequently, as illustrated in FIG. 10, a first intermediate conveying roller pair 114 and a first conveying roller pair 111 convey the folded sheet Sf downstream in the conveyance direction. At this time, a first switching member 511 and a third switching member 513 are positioned as illustrated in FIG. 11. The folded sheet Sf is conveyed from the first conveyance passage 1101 to the enclosing conveyance passage 1104.

Thereafter, as illustrated in FIG. 11, the enclosing roller pair 121 conveys the folded sheet Sf, which is conveyed from the enclosing conveyance passage 1104 to the envelope enclosing conveyance passage 1105, further in the −Z direction. As a result, the first vertical conveying roller pair 122 holds the folded sheet Sf at a specified enclosing position in the envelope enclosing conveyance passage 1105. The folded sheet Sf is enclosed into the envelope E in the enclosing standby state.

Figure 12:
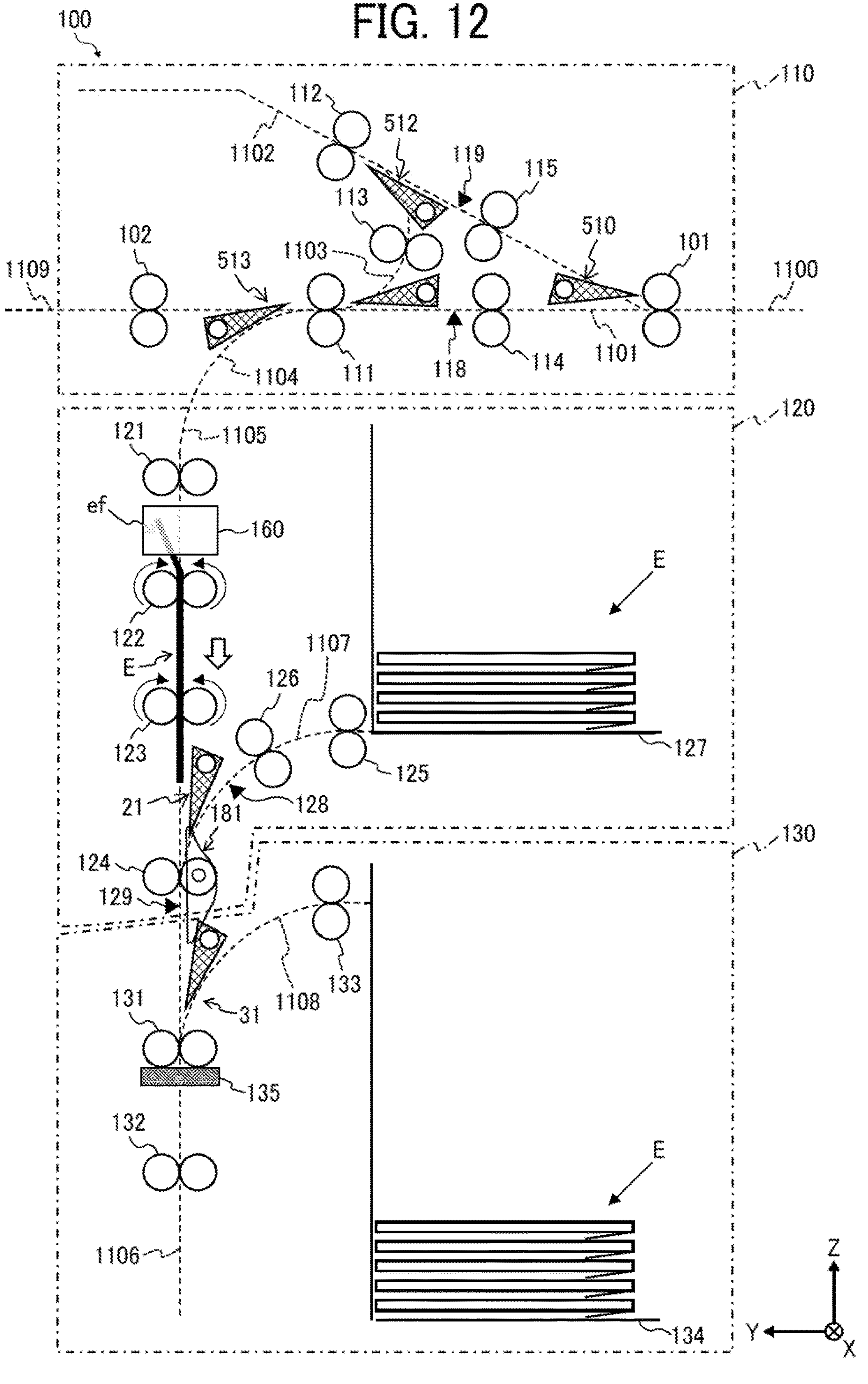
FIG. 12 is a cross-sectional view of the envelope processing apparatus, illustrating one step of an enclosing operation performed by the envelope processing apparatus, subsequent to FIG. 11.
Figure 13:
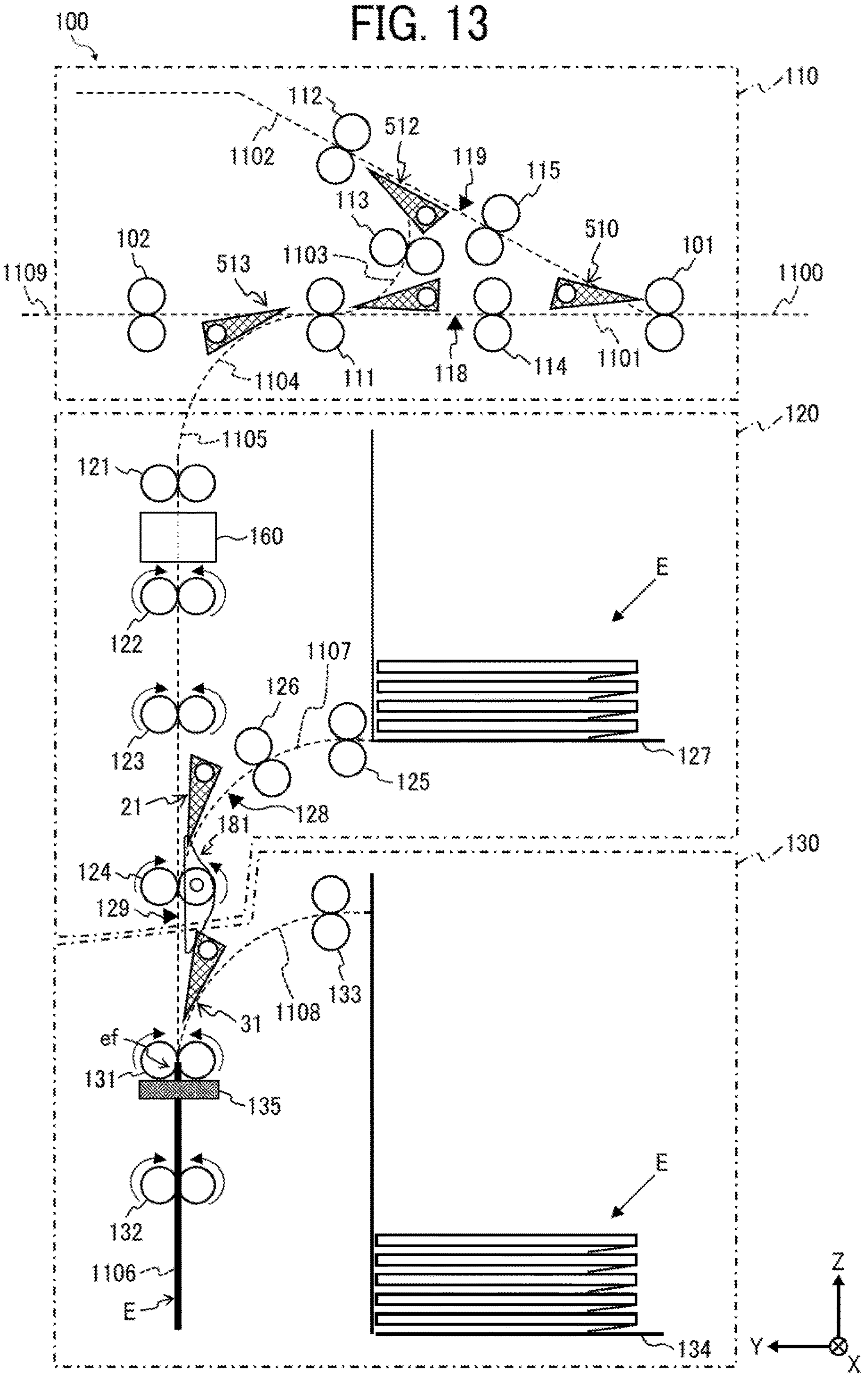
FIG. 13 is a cross-sectional view of the envelope processing apparatus, illustrating one step of an enclosing operation performed by the envelope processing apparatus, subsequent to FIG. 12.

Subsequently, as illustrated in FIG. 12, the first vertical conveying roller pair 122 and the second vertical conveying roller pair 123 rotate to convey the envelope E downward to the fourth vertical conveying roller pair 132 as illustrated in FIG. 13. The envelope E with the folded sheet Sf enclosed is conveyed to a past position where the flap ef is past the envelope ejection switching member 31.

Figure 14:
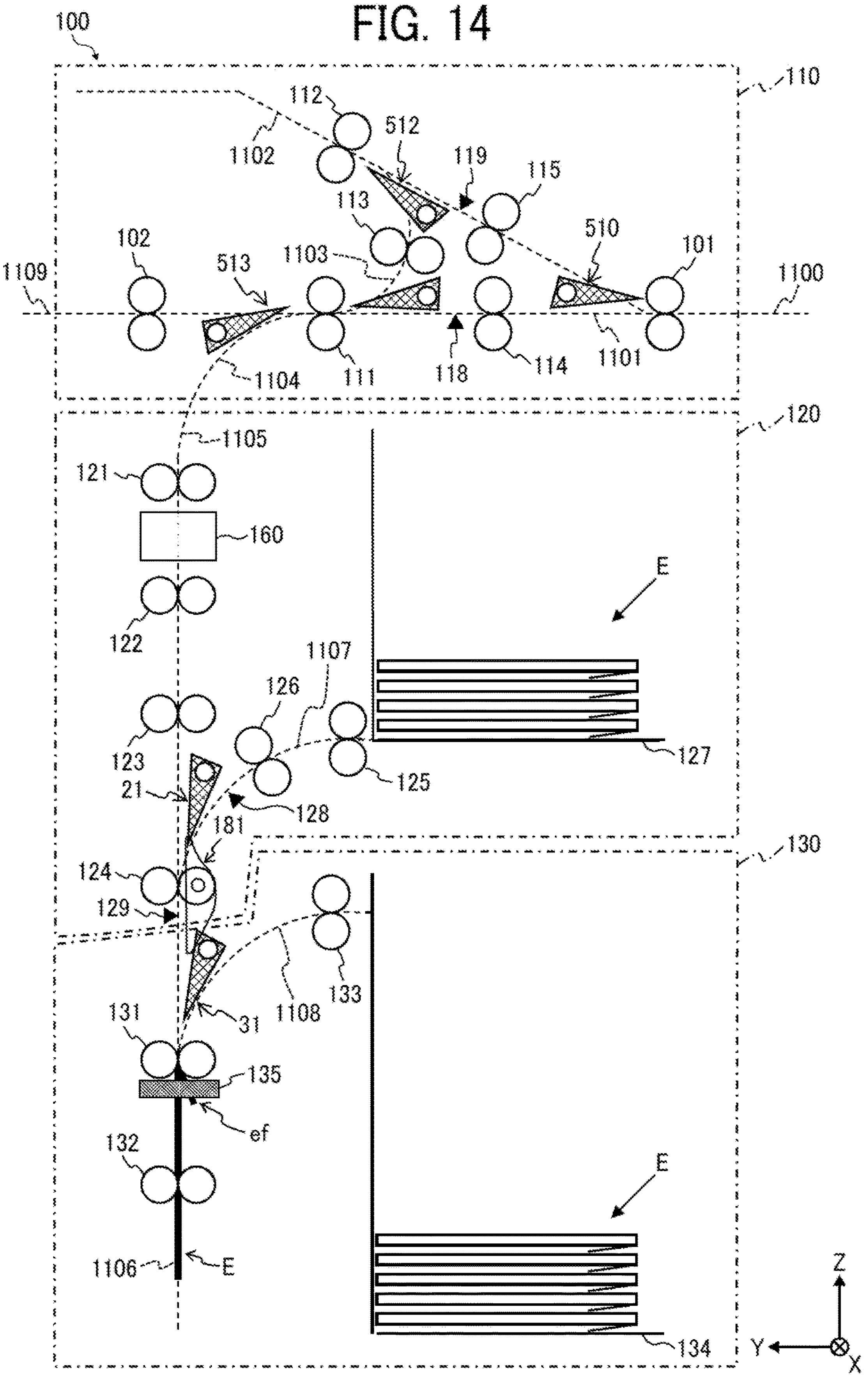
FIG. 14 is a cross-sectional view of the envelope processing apparatus, illustrating one step of an enclosing operation performed by the envelope processing apparatus, subsequent to FIG. 13.

Then, as illustrated in FIG. 14, the flap ef is closed by the sealing device 135 between the third vertical conveying roller pair 131 and the fourth vertical conveying roller pair 132 to seal the envelope E.

Figure 15:
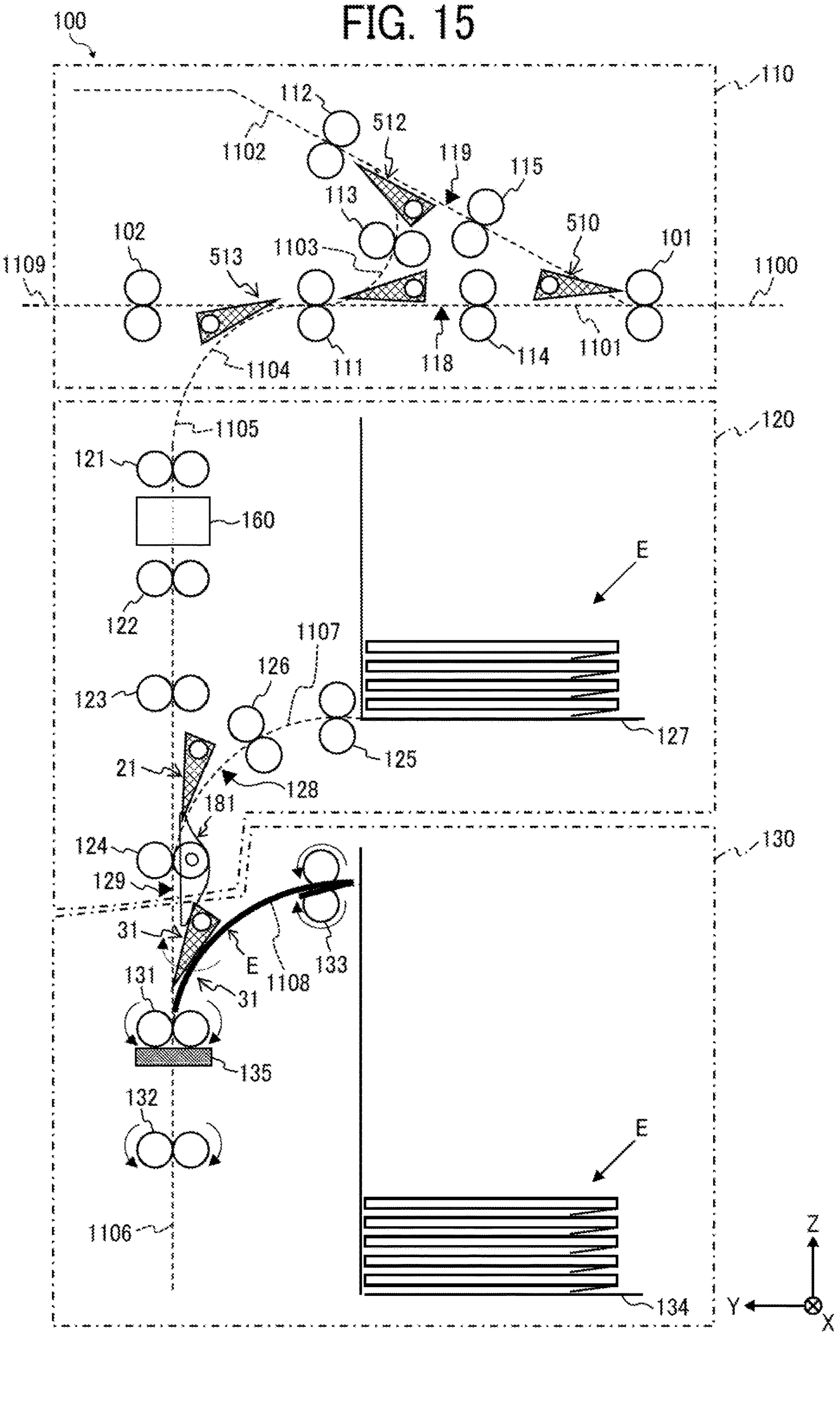
FIG. 15 is a cross-sectional view of the envelope processing apparatus, illustrating one step of an enclosing operation performed by the envelope processing apparatus, subsequent to FIG. 14.

Thereafter, as illustrated in FIG. 15, the third vertical conveying roller pair 131 and the fourth vertical conveying roller pair 132 rotate in reverse to convey the sealed envelope E with switchback manner. Before the third vertical conveying roller pair 131 and the fourth vertical conveying roller pair 132 rotate in reverse, the envelope ejecting switching member 31 is rotated into the state illustrated in FIG. 15. Accordingly, the enclosed envelope E is conveyed from the enclosing conveyance passage 1104 to the envelope ejection passage 1108.

Figure 16:
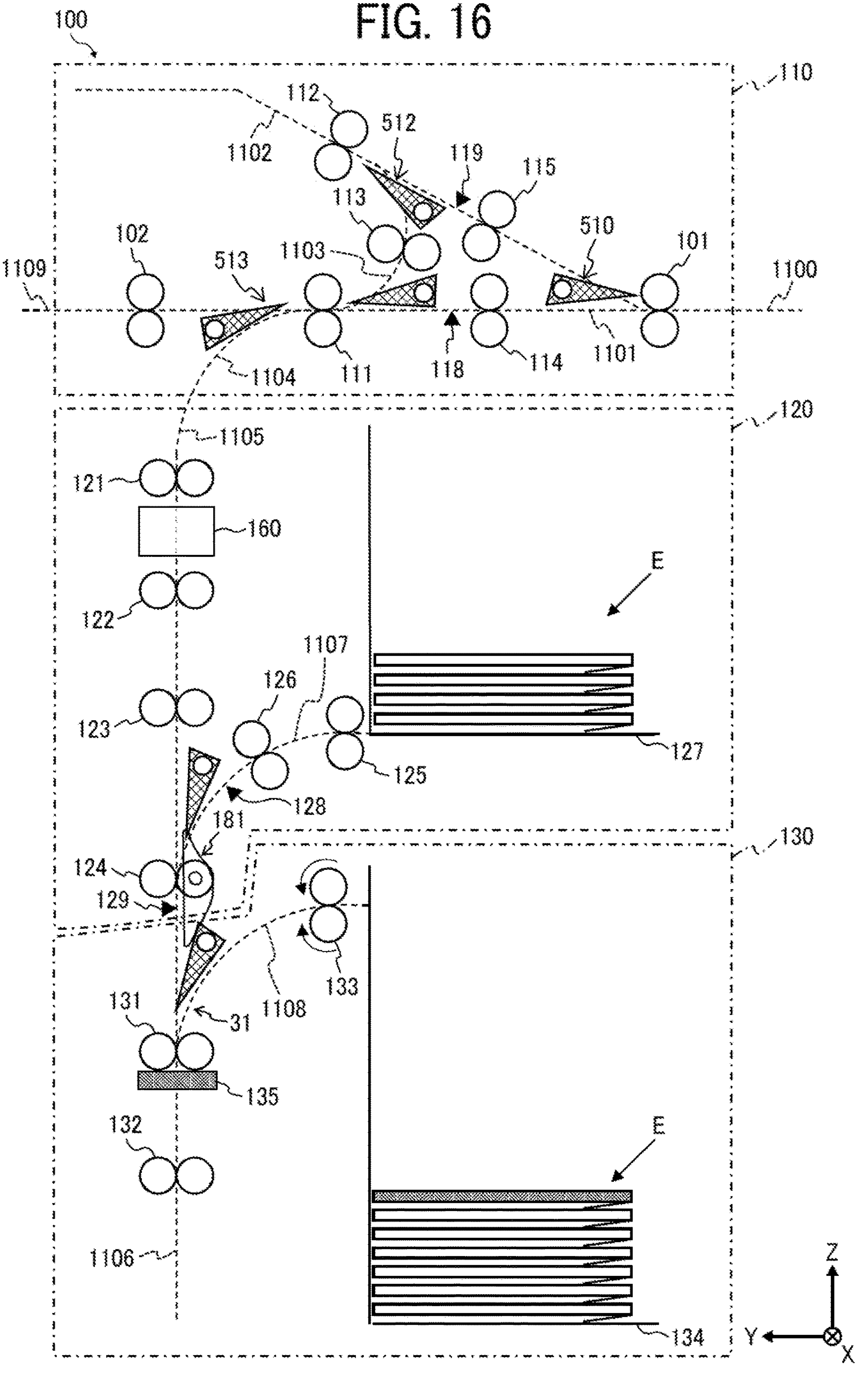
FIG. 16 is a cross-sectional view of the envelope processing apparatus, illustrating one step of an enclosing operation performed by the envelope processing apparatus, subsequent to FIG. 15.

As a result, as illustrated in FIG. 16, the envelope ejection roller pair 133 ejects the sealed envelope E onto the envelope ejection tray 134.

Figure 17A:
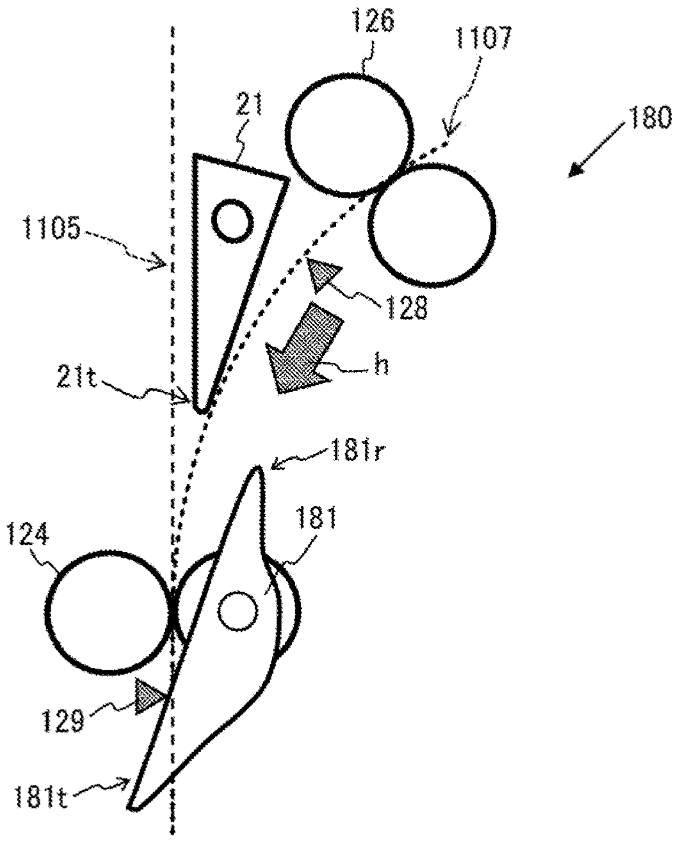
FIGS. 17A and 17B are diagrams illustrating a configuration of a flap opening mechanism included in the envelope processing apparatus, according to an embodiment of the present disclosure.
Figure 17B:
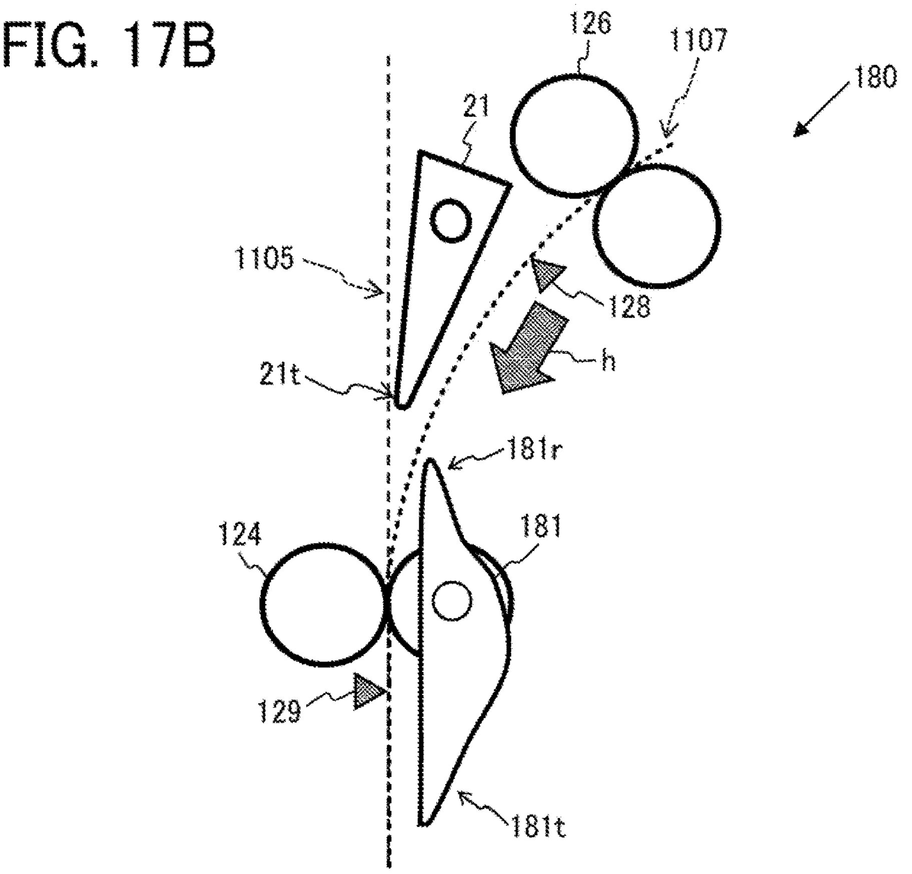

Next, a description is given below of the flap opening mechanism 180 including the flap opening member 181 serving as a flap opener with reference to FIGS. 17A and 17B. The direction indicated by a black thick arrow h illustrated in FIGS. 17A and 17B is a conveyance direction of the envelope E in the flap opening mechanism 180. In the flap opening mechanism 180, the envelope conveying roller pair 126, the separation sensor 128, and the envelope switchback switching member 21 are disposed in this order when viewed from the upstream side in the conveyance direction in the envelope entry passage 1107. The flap opening roller pair 124 and the flap opening sensor 129 are disposed in the envelope enclosing conveyance passage 1105 joined with the envelope entry passage 1107.

The flap opening member 181 is rotatably attached to the rotation shaft of one of the roller pairs included in the flap opening roller pair 124.

The flap opening mechanism 180 illustrated in FIG. 17A is held such that a flap opening leading end 181*t* as one end corresponding to the leading end of the flap opening member 181 in the conveyance direction is positioned to straddle the envelope enclosing conveyance passage 1105 as a conveyance path.

In the flap opening mechanism 180 illustrated in FIG. 17A, a switching leading end 21*t* which is the leading end of the envelope switchback switching member 21 is held at a position close to the envelope entry passage 1107.

In the flap opening mechanism 180 illustrated in FIG. 17B, a flap opening trailing end 181*r* as the other end of the flap opening member 181, which corresponds to the trailing end of the flap opening member 181 in the conveyance direction of the envelope E, is held at a position close to the envelope entry passage 1107 as a conveyance path. The flap opening leading end 181*t* is held at a position away from the envelope enclosing conveyance passage 1105, rather than at a position straddling the envelope enclosing conveyance passage 1105 as a conveyance path.

In the flap opening mechanism 180 illustrated in FIG. 17B, the switching leading end 21*t* of the envelope switchback switching member 21 is held at a position along the tangent direction of the arc-shaped envelope entry passage 1107 and a position slightly away from the envelope entry passage 1107.

In the flap opening mechanism 180 according to the present embodiment, any of the state illustrated in FIG. 17A and the state illustrated in FIG. 17B can be adopted as a steady state before the flap opening operation for opening the flap ef of the envelope E is executed.

Figure 18A:
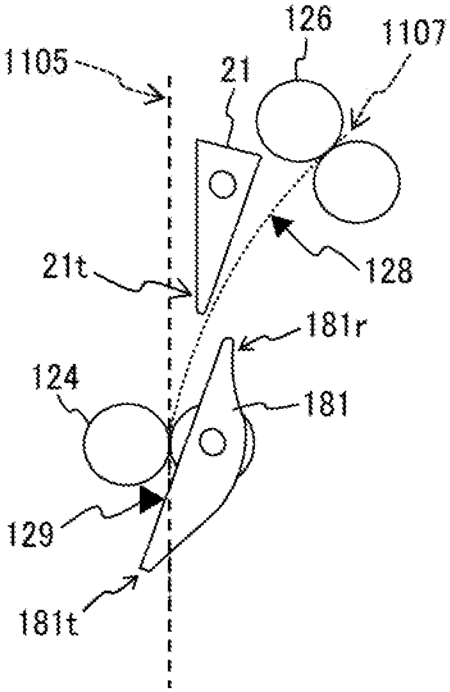
FIGS. 18A to 18F are diagrams illustrating an example of a flap opening operation of the flap opening mechanism.

Next, a description is given of a first example of a process of an operation of the flap opening mechanism 180 with reference to FIGS. 18A to 18F. The state illustrated in FIG. 18A is substantially the same as the state illustrated in FIG. 17A described above, and is an initial state before the envelope E is conveyed.

Figure 18B:
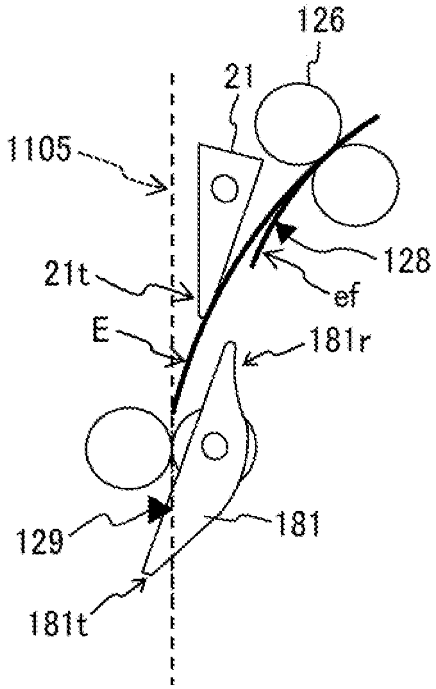

Subsequently, as illustrated in FIG. 18B, the envelope E is conveyed from the upstream side to the downstream side in the conveyance direction in the envelope entry passage 1107. When the bottom (leading end in the conveyance direction) of the envelope E passes the switching leading end 21*t* and is further conveyed, the envelope E turns into the state illustrated in FIG. 18C.

Figure 18C:
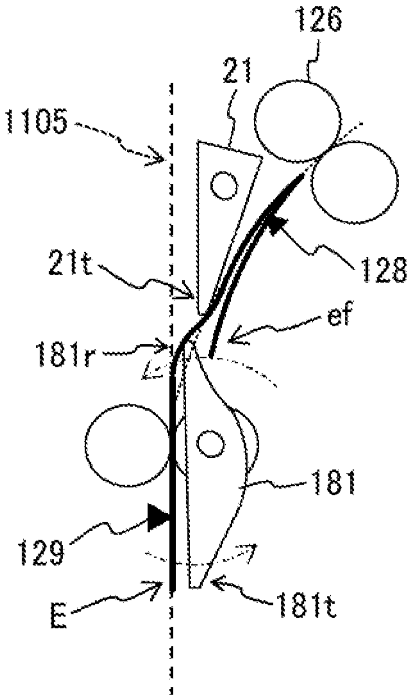

As illustrated in FIG. 18C, when the flap opening roller pair 124 nips the envelope E and further conveys the envelope E in the conveyance direction, the flap ef of the envelope E moves along the outer side of the flap opening trailing end 181*r* in the conveyance direction. This is because the envelope entry passage 1107 is formed in an arc shape, and the switching leading end 21*t* is placed at a position close to the envelope entry passage 1107. Thus, the leading end of the envelope E in the conveyance direction is urged toward the flap opening roller pair 124 without jumping out from the envelope entry passage 1107. As a result, the envelope E is curved along the arc-shaped envelope entry passage 1107, and the flap ef is placed on the center side of the arc-shaped portion, so that the flap ef is likely to be separated from the body of the envelope E.

When the leading end of the envelope E in the conveyance direction contacts a face of the flap opening member 181 facing the envelope enclosing conveyance passage 1105 and is further conveyed, the envelope E rotates the flap opening member 181 as illustrated in FIG. 18C. By this rotation, the flap opening trailing end 181*r* of the flap opening member 181 moves in a direction approaching the envelope entry passage 1107. Thus, the flap opening trailing end 181*r* reaches a position where the flap opening trailing end 181*r* overlaps the switching leading end 21*t* in the envelope entry passage 1107. Accordingly, the middle portion of the envelope E is pushed out in the direction along the Z direction from the arc-shaped route of the envelope entry passage 1107. As a result, the flap ef is away from the body of the envelope E, and the flap ef is triggered to open.

Figure 18D:
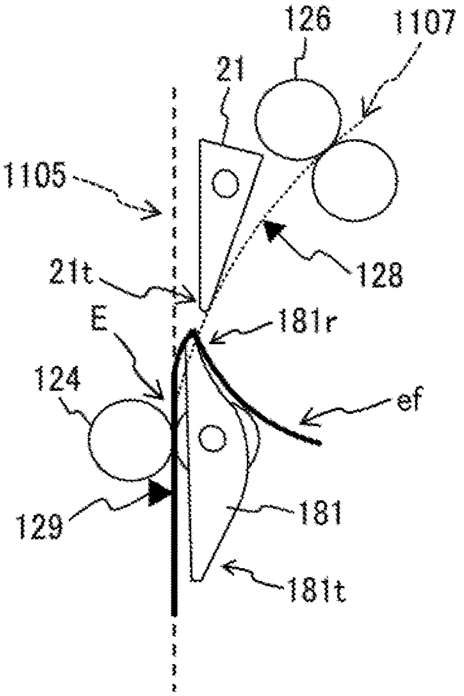
Figure 18E:
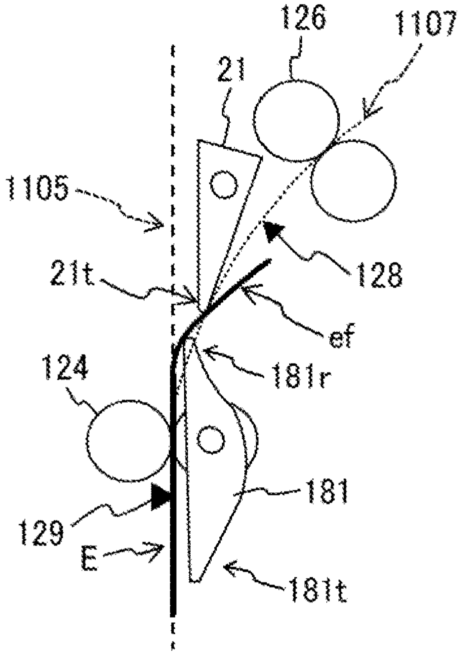

Subsequently, when the envelope E is conveyed, as illustrated in FIG. 18D, the flap opening trailing end 181*r* contacts the boundary portion between the body of the envelope E and the flap ef. When the envelope E is further conveyed, as illustrated in FIG. 18E, the flap ef moves to trace the flap opening trailing end 181*r*.

Figure 18F:
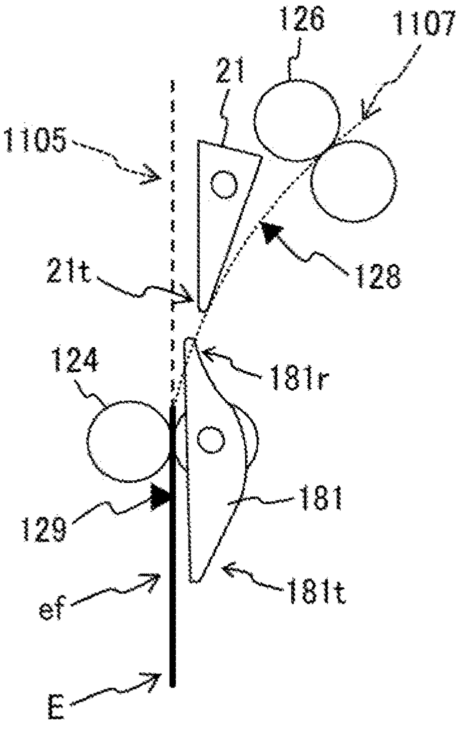

Then, as illustrated in FIG. 18F, the envelope E with the flap ef opened is conveyed on the envelope enclosing conveyance passage 1105, and the flap ef is opened.

In this state, when the envelope E is conveyed in the switchback manner along the envelope entry path, the end of the flap ef and the bottom of the envelope E are detected by the flap opening sensor 129, the second envelope length is calculated, and then, the flap length is calculated.

Figure 19A:
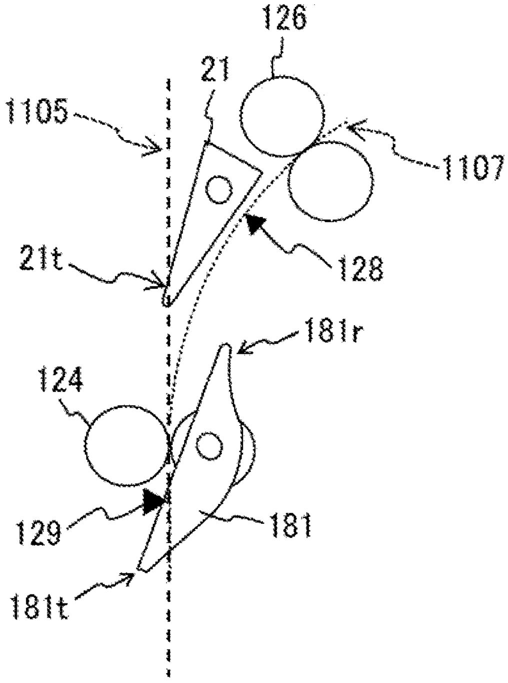
FIGS. 19A to 19F are diagrams illustrating another example of a flap opening operation of the flap opening mechanism.

Next, a description is given of a second example of a process of an operation of the flap opening mechanism 180 with reference to FIGS. 19A to 19F. The state illustrated in FIG. 19A is substantially the same as the state illustrated in FIG. 17A described above, and is an initial state before the envelope E is conveyed.

Figure 19B:
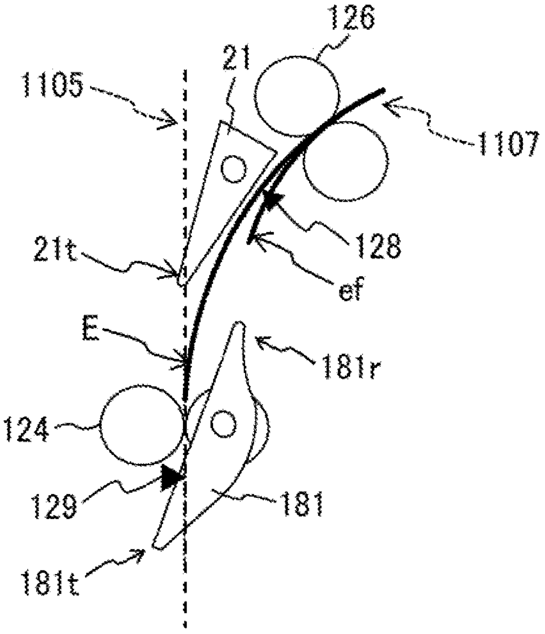

Subsequently, as illustrated in FIG. 19B, the envelope E is conveyed from the upstream side to the downstream side in the conveyance direction in the envelope entry passage 1107. When the bottom (leading end in the conveyance direction) of the envelope E passes the switching leading end 21*t* and is further conveyed, the envelope E turns into the state illustrated in FIG. 19C.

Figure 19C:
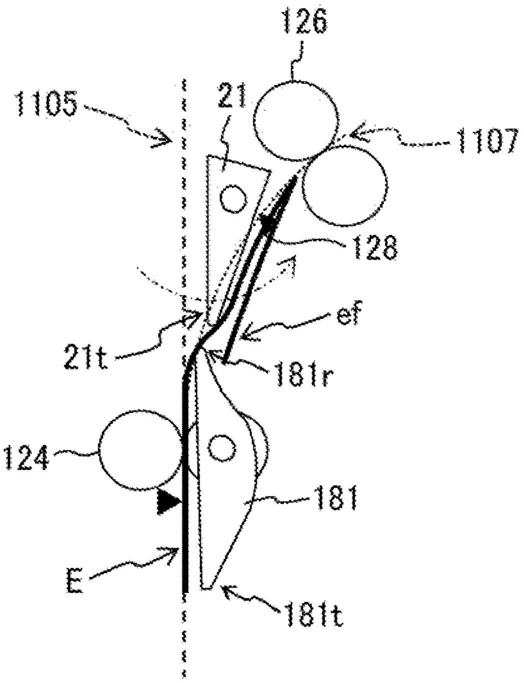

As illustrated in FIG. 19C, when the bottom of the envelope E passes the flap opening trailing end 181*r* and reaches a certain position, the switching leading end 21*t* rotates to a position where the switching leading end 21*t* straddles the envelope entry passage 1107. As a result, the flap ef of the envelope E moves along the outer side of the flap opening trailing end 181*r* in the conveyance direction. This is because the body of the envelope E is moved to the inside of the envelope entry passage 1107 by the envelope entry passage 1107 being formed in an arc shape and the switching leading end 21*t* straddling the envelope entry passage 1107.

As a result, the flap ef is away from the body of the envelope E, and the flap ef is triggered to open.

Figure 19D:
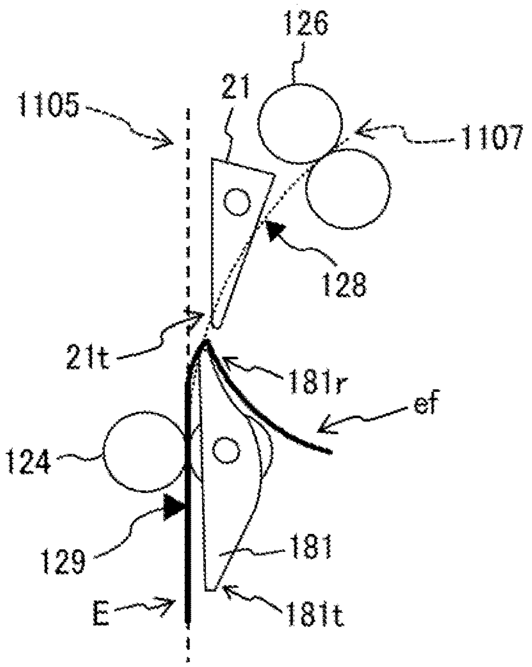
Figure 19E:
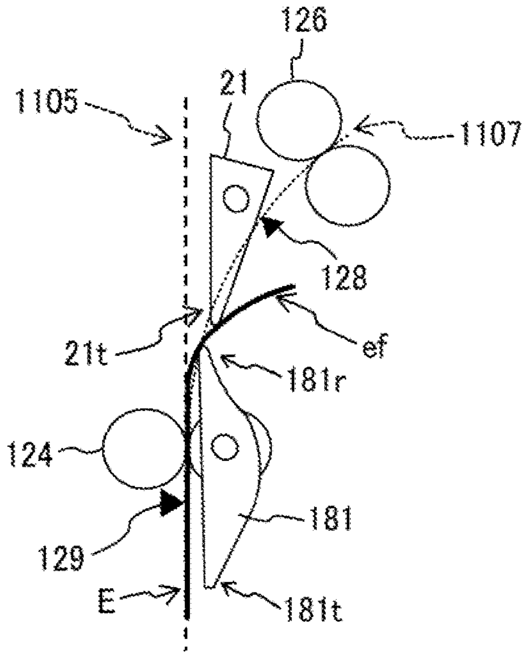

Subsequently, when the envelope E is conveyed, as illustrated in FIG. 19D, the boundary portion between the body of the envelope E and the flap ef comes into contact with the flap opening trailing end 181*r*. When the envelope E is further conveyed, as illustrated in FIG. 19E, the flap ef moves to trace the flap opening trailing end 181*r* in accordance with the conveyance of the envelope E.

Figure 19F:
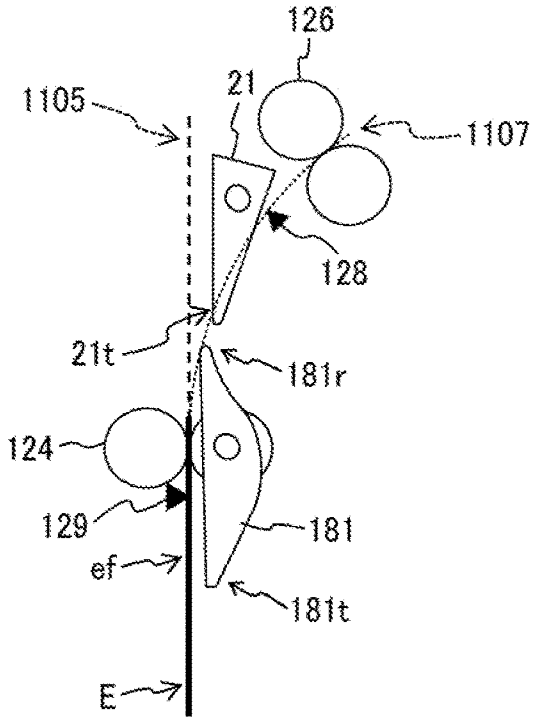

Then, as illustrated in FIG. 19F, the envelope E with the flap ef opened is conveyed on the envelope enclosing conveyance passage 1105, and the flap ef is opened.

In this state, when the envelope E is conveyed in the switchback manner along the envelope entry path, the end of the flap ef and the bottom of the envelope E are detected by the flap opening sensor 129, the second envelope length is calculated, and then, the flap length is calculated.

Figure 20:
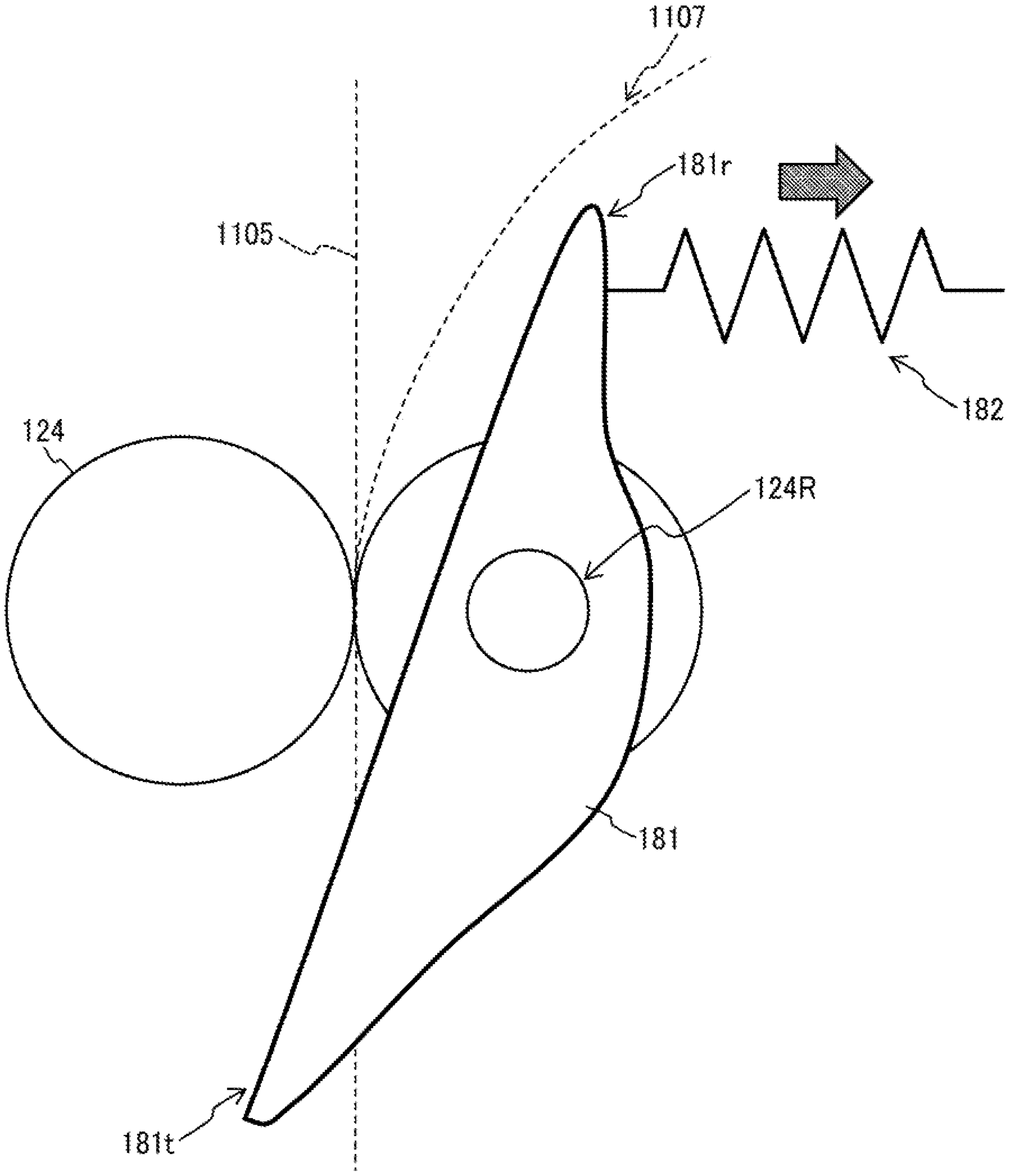
FIG. 20 is a diagram illustrating a configuration of a flap opening mechanism included in the envelope processing apparatus, according to an embodiment of the present disclosure.

Next, a description is given of a configuration of the flap opening member 181 with reference to FIG. 20. FIG. 20 illustrates the detailed structure of a first example of the flap opening member 181 as already described above. The flap opening member 181 is supported to rotate around a drive shaft 124R of the flap opening roller pair 124. The flap opening member 181 is biased by a flap opening spring 182 as an elastic member in a direction in which the flap opening trailing end 181*r* moves away from the envelope entry passage 1107.

A surface connecting the flap opening trailing end 181*r* that is an upstream end of the flap opening member 181 in the conveyance direction and the flap opening leading end 181*t* that is a downstream end of the flap opening member 181 in the conveyance direction, in other words, a surface of the flap opening member 181 facing the envelope enclosing conveyance passage 1105 is a substantially flat surface. The envelope E being conveyed contacts the substantially flat surface near the flap opening leading end 181*t* and presses the flap opening member 181 by the biasing of the conveyance of the envelope E. This pressing force causes the flap opening member 181 to rotate in the direction against the biasing of the flap opening spring 182.

When a virtual plane along the envelope enclosing conveyance passage 1105 and passing the flap opening roller pair 124 is assumed, the state where the flap opening leading end 181*t* is disposed at a position facing the drive shaft 124R is normal based on the virtual plane. When the envelope E is conveyed and pushes the flat surface portion placed at the position straddling the envelope enclosing conveyance passage 1105, the flap opening leading end 181*t* moves to a position on the side of the drive shaft 124R with the drive shaft 124R as the center of rotation. As a result, the flap opening trailing end 181*r* moves to a position where the flap opening trailing end 181*r* straddles the envelope entry passage 1107, enters a clearance between the flap ef and the envelope E to displace the flap ef in a direction in which the flap ef is opened.

Without providing the flap opening spring 182, the position of the rotation axis of the flap opening member 181 may be shifted from the center of gravity so that the state illustrated in FIG. 20 is maintained in the normal state. In this case, when the conveyed envelope E is further conveyed with the bottom in contact with the flap opening member 181, the flat surface of the flap opening member 181 is pressed by the envelope E. Then, the flap opening member 181 rotates by its own weight to open the flap ef.

It is preferable that the flap opening trailing end 181*r* of the flap opening-and-scooping member 181 has thickness in the direction of the envelope entry passage 1107 and has a curved shape in order to reduce the load when the flap ef is opened.

Figure 21:
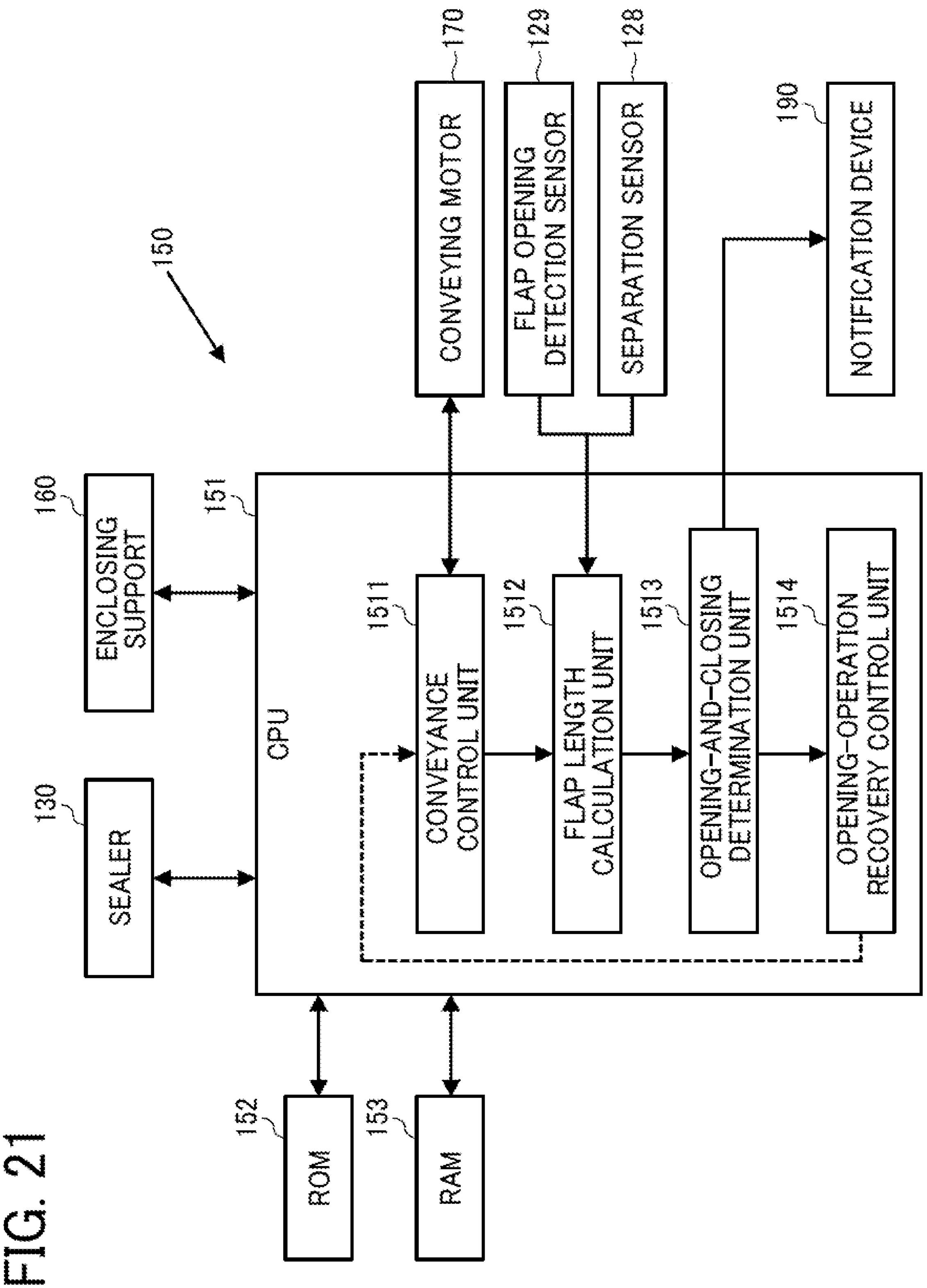
FIG. 21 is a functional block diagram of a controller included in the envelope processing apparatus.

Details of functional blocks of the envelope processing controller 150 for controlling the enclosing operation is given below. As illustrated in FIG. 21, the functional blocks of the envelope processing controller 150 include a central processing unit (CPU) 151 as an arithmetic processing unit, a read-only memory (ROM) 152 for storing a control program executed in the CPU 151, and a random-access memory (RAM) 153 corresponding to a work area when the CPU 151 executes the control program to implement specified control processing.

When the control program is executed in the CPU 151, a conveyance processing function including a conveyance control unit 1511, a flap length calculation unit 1512, an opening-and-closing determination unit 1513, and an opening-operation recovery control unit 1514 is implemented.

The conveyance control unit 1511 controls rotation of conveying motors 170 serving as drive sources of multiple conveying roller pairs for conveying the envelope E. The conveying motors 170 are appropriately disposed in the envelope processing apparatus 100 as drive sources for rotation of the multiple conveying roller pairs described above.

The conveyance control unit 1511 controls the rotation speed and the rotation amount of the conveying motor 170 and notifies the flap length calculation unit 1512 of the information.

The flap length calculation unit 1512 receives signals that the separation sensor 128 and the flap opening sensor 129 have detected the leading end and the trailing end, respectively, of the envelope E in the conveyance direction. The flap length calculation unit 1512 calculates the first envelope length and the second envelope length, based on the signals from the separation sensor 128 and the flap opening sensor 129 and the notification from the conveyance control unit 1511. Thus, the flap length calculation unit 1512 further calculates the flap length of the envelope E and notifies the opening-and-closing determination unit 1513 of the flap length.

The opening-and-closing determination unit 1513 determines the opening and closing states of the envelope E based on the notified flap length. When the opening-and-closing determination unit 1513 determines that the flap ef of the envelope E is in an abnormal state in which the flap ef is not normally open, the opening-and-closing determination unit 1513 displays information indicating that the flap ef is in the abnormal state, on a display 191 corresponding to an example of the configuration of the notification device 190.

When the opening-and-closing determination unit 1513 detects that the flap ef is in the abnormal state in which the flap ef is not normally open, the opening-operation recovery control unit 1514 notifies the conveyance control unit 1511 of the conveyance control for the recovery operation to execute the flap opening operation of the envelope E again. Details of the recovery operation are described below.

Figure 22A:
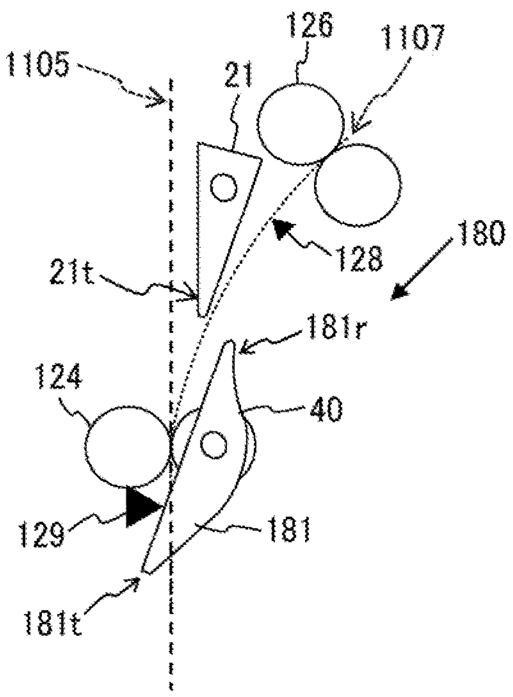
FIGS. 22A to 22F are diagrams illustrating an example of abnormality of a flap opening operation of the flap opening mechanism.

A description is given of an example in which the flap ef cannot be normally opened in the flap opening operation. FIGS. 22A to 22F are diagrams illustrating a case where the flap ef is not normally opened in a first example of the process of the operation of the flap opening mechanism 180 described with reference to FIGS. 18A to 18F. The state illustrated in FIG. 22A is substantially the same as the state illustrated in FIG. 17A and FIG. 18A described above, and is an initial state before the envelope E is conveyed.

Figure 22B:
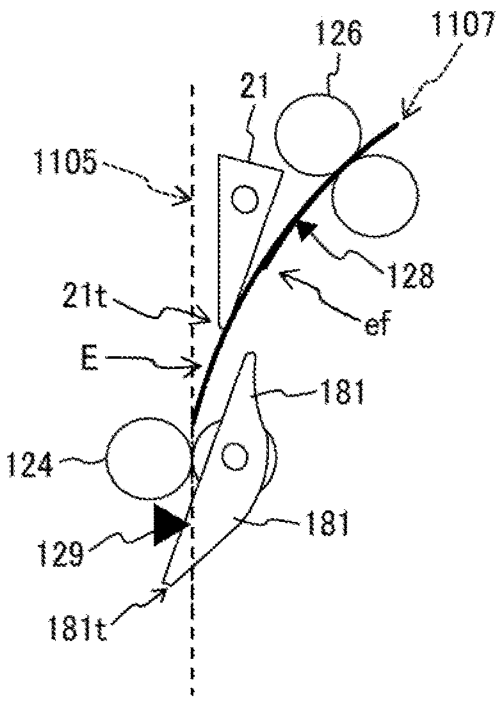

Subsequently, as illustrated in FIG. 22B, the envelope E is conveyed from the upstream side to the downstream side in the conveyance direction in the envelope entry passage 1107. The bottom (leading end in the conveyance direction) of the envelope E passes the switching leading end 21*t* and is further conveyed. At this time, in a case where the flap ef is in close contact with the envelope E, no clearance is formed between the flap ef and the envelope E even if the switching leading end 21*t* is rotated to straddle the envelope entry passage 1107. In other words, even if the envelope entry passage 1107 is formed in an arc shape, the flap ef does not displace to the outer side of the flap opening trailing end 181*r*. Then, the conveyance of the envelope E continues in a state where the flap ef stays at the inner side of the flap opening trailing end 181*r*. In other words, the envelope E is conveyed in a state where no clearance into which the flap opening trailing end 181*r* enters is formed between the flap ef and the envelope E.

Figure 22C:
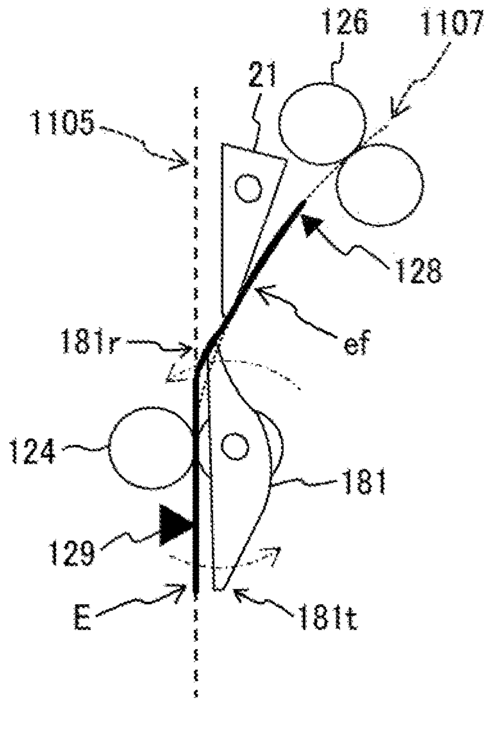
Figure 22D:
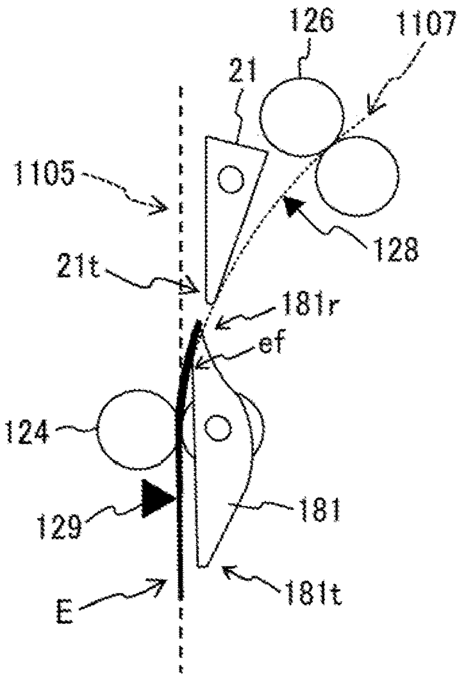
Figure 22E:
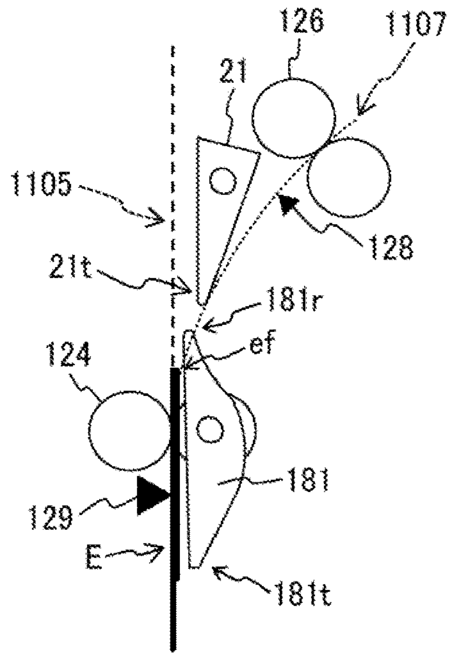
Figure 22F:
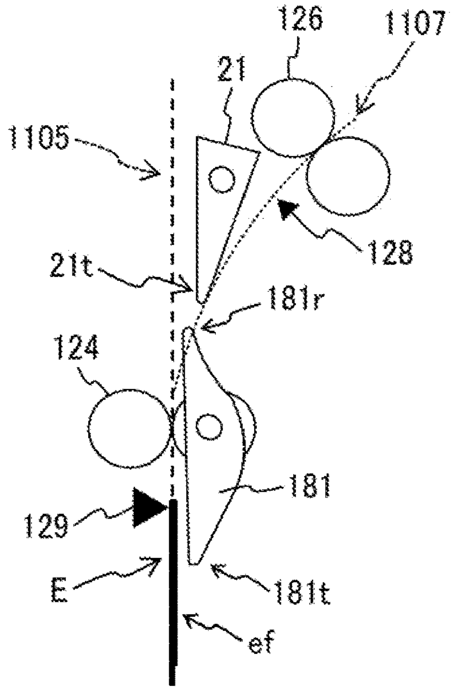

As a result, as illustrated in FIG. 22C, the envelope E is further conveyed in a state where the flap ef is in close contact with the envelope E. As illustrated in FIG. 22D, the envelope E passes the flap opening trailing end 181*r* in a state where the body of the envelope E and the flap ef are in close contact with each other. When the envelope E is further conveyed, as illustrated in FIG. 22E, the envelope E is conveyed in a state where the envelope E and the flap ef are in close contact with each other, in other words, is conveyed in a state where the flap ef is not opened. Subsequently, as illustrated in FIGS. 6 to 8, the leading end and the trailing end of the envelope E whose flap ef is not open are detected by the flap opening sensor 129 by the switchback conveyance.

In this case, the first envelope length and the second envelope length have the same value. Thus, the flap length is zero. In other words, the opening-and-closing determination unit 1513 can determine whether the flap ef is normally opened, by a detection result of whether the flap length is zero.

In consideration of variation in detection by the separation sensor 128 and the flap opening sensor 129 and a calculation error due to a control program, a determination criterion for determining that “the flap ef is not normally open” may not be exactly whether the “flap length is zero” but whether the “flap length is zero” may be determined with a margin of several millimeters.

First Embodiment

Next, a description is given of retry processing of the flap opening operation in the flap opening mechanism 180 according to a first embodiment with reference to FIGS. 23A to 23F, 24A, and 24B. The present embodiment is a first example of retry processing for re-executing flap opening processing performed in a case where the flap ef cannot be normally opened in the flap opening operation.

The flap opening mechanism 180 according to the present embodiment includes a switching spring 183 that biases the envelope switchback switching member 21 such that the switching leading end 21*t* of the envelope switchback switching member 21 is maintained in a state of straddling the envelope entry passage 1107. In addition, the flap opening mechanism 180 according to the present embodiment includes a conveyance passage protruding portion 184 in which a part of the envelope enclosing conveyance passage 1105 protrudes such that the envelope E conveyed in a switchback manner through the envelope enclosing conveyance passage 1105 is inclined toward the envelope switchback switching member 21.

The conveyance passage protruding portion 184 is a convex portion formed in a part of a guide included in the envelope enclosing conveyance passage 1105. The conveyance passage protruding portion 184 is formed on the guide on the side facing the envelope switchback switching member 21 included in a part of the flap opener and protrudes in a direction in which the conveyance gap that is a gap of the guide is narrowed.

The conveyance passage protruding portion 184 is disposed adjacent to the flap opening trailing end 181*r* (the end inserted into the clearance between the flap ef and the body of the envelope E) of the flap opening member 181. When the flap ef cannot be opened, the conveyance passage protruding portion 184 repeats the switchback conveyance of the envelope E. A conveyance section of the switchback conveyance is set between a position where the tip of the flap ef exceeds the flap opening trailing end 181*r* and a position where the envelope E exceeds the flap opening sensor 129.

Figure 23A:
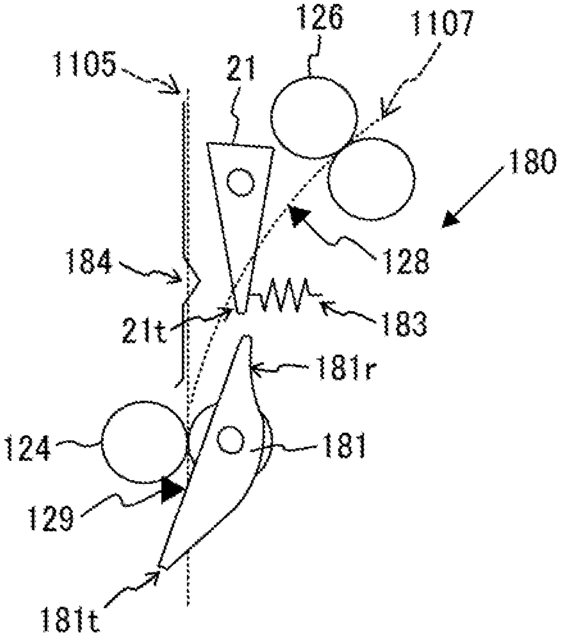
FIGS. 23A to 23F are diagrams illustrating a configuration of a flap opening mechanism included in the envelope processing apparatus, according to a first embodiment of the present disclosure.
Figure 23B:
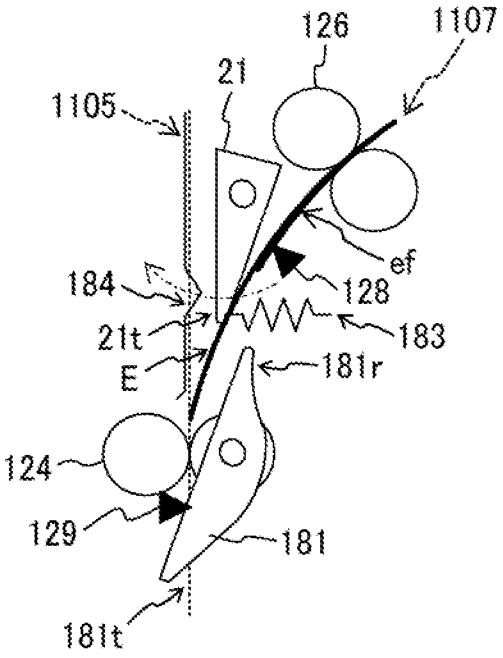

As illustrated in FIG. 23B, when the envelope E is conveyed through the envelope entry passage 1107, the leading end (bottom) in the conveyance direction of the envelope E is in a state of pushing the envelope switchback switching member 21. As a result, the envelope switchback switching member 21 rotates in a direction against the biasing of the switching spring 183. Thus, the envelope E further moves along the envelope entry passage 1107.

Figure 23C:
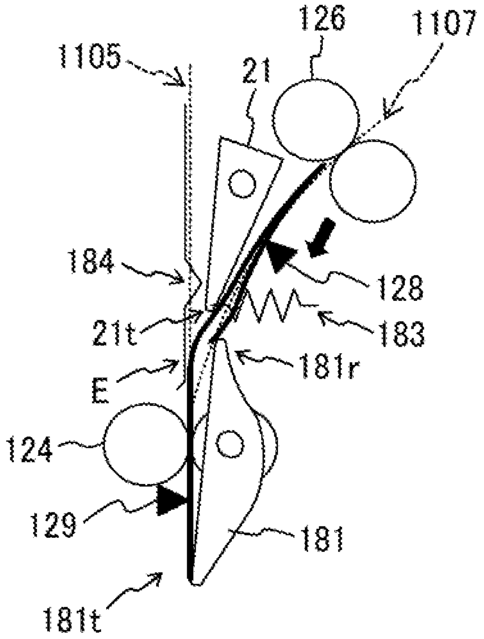
Figure 23D:
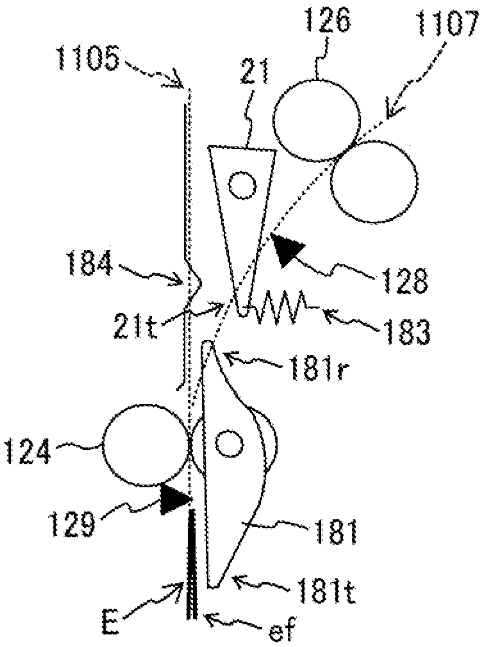

As illustrated in FIG. 23C, in a case where the flap ef is conveyed without being caught by the flap opening trailing end 181*r*, the envelope E reaches the envelope enclosing conveyance passage 1105 in a state where the flap ef is not opened. As illustrated in FIG. 23D, the envelope E whose flap ef is not opened is conveyed in the switchback manner. Thus, the envelope E passes the flap opening sensor 129 in a state where the flap ef is not opened. In other words, since the envelope E passes the flap opening sensor 129 in substantially the same state as when the envelope E passes the separation sensor 128, the envelope length to be calculated turns to be a value similar to the first envelope length, and then, the flap length turns to be substantially zero.

Figure 23E:
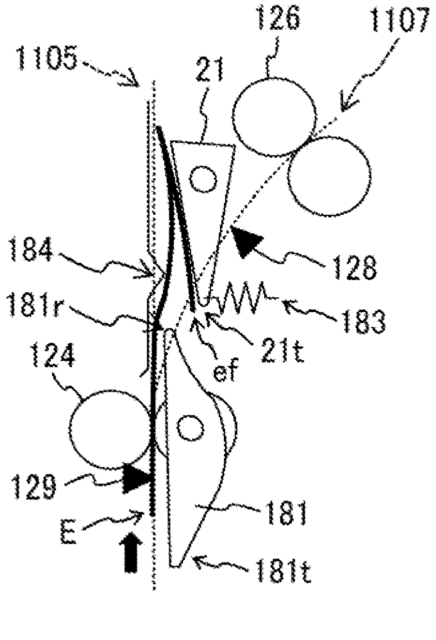

In this case, when the envelope is conveyed in the switchback manner, as illustrated in FIG. 23E, the envelope E is conveyed to a position where the leading end of the flap ef exceeds the switching leading end 21*t* of the envelope switchback switching member 21. This conveyance control controls the rotation amount of the flap opening roller pair 124 after the leading end (the joint portion between the flap ef and the body of the envelope E) of the envelope E has passed the flap opening sensor 129. With this conveyance control, the envelope E can be conveyed to a specified position even if the position of the leading end of the flap ef is not determined. For example, the envelope E is conveyed to a position of about 10 mm upstream from the position where the trailing end of the envelope E in the conveyance direction (in this case, the bottom of the envelope E) passes the flap opening roller pair 124.

With this conveyance, the envelope E is bent by the time when the leading end of the envelope E (the joint portion between the flap ef and the body of the envelope E) reaches a position where the leading end of the envelope E exceeds the conveyance passage protruding portion 184. The leading end of the flap ef is displaced in a direction in which the leading end of the flap ef exceeds the flap opening trailing end 181*r* of the flap opening member 181.

Figure 23F:
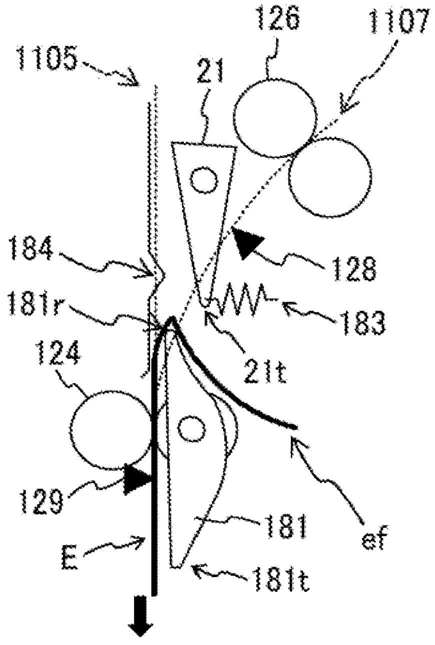

Subsequently, as illustrated in FIG. 23F, the envelope E is conveyed in the switchback manner again. In this case, the re-switchback conveyance corresponds to the conveyance in a direction in which the envelope E moves away from the enclosing position in the envelope enclosing conveyance passage 1105. With this re-switchback conveyance, the envelope E is conveyed in a direction in which the envelope E passes the flap opening sensor 129 in a state where the flap opening trailing end 181*r* enters the clearance between the body and the flap ef of the envelope E and the flap ef is caught by the flap opening trailing end 181*r*.

As illustrated in FIG. 24, re-switchback conveyance is performed on the envelope E in a state where the flap ef is caught by the flap opening trailing end 181*r*. The envelope E passes the flap opening sensor 129 in a state where the flap ef is open.

Figure 24A:
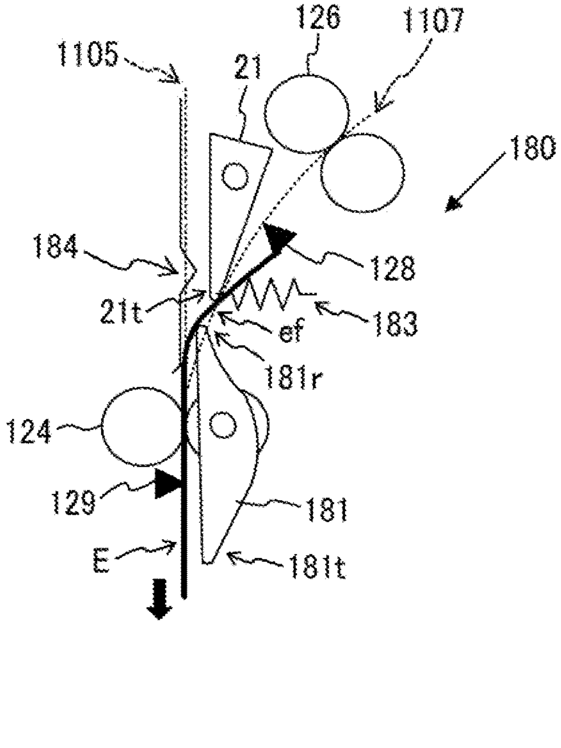
FIGS. 24A and 24B are diagrams illustrating a configuration of a flap opening mechanism included in the envelope processing apparatus, according to a first embodiment of the present disclosure.
Figure 24B:
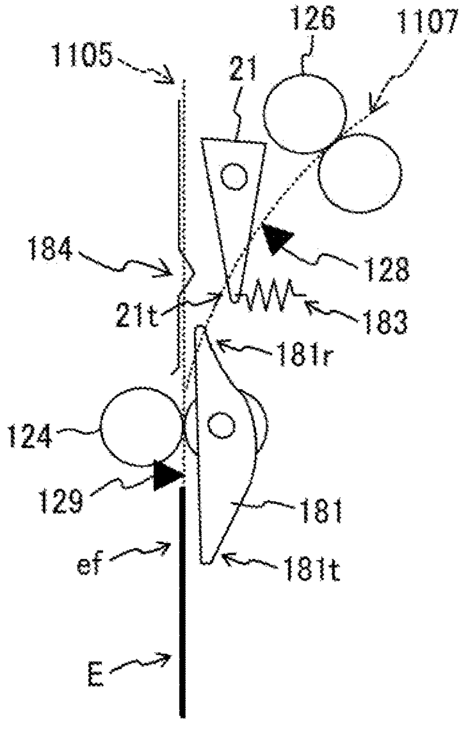

Subsequently, as illustrated in FIG. 24B, when the envelope E passes the flap opening sensor 129 in order for switchback conveyance to the enclosing position again, the calculated second envelope length turns to be longer than the first envelope length. Then, the opening-and-closing determination unit 1513 determines that the flap ef is normally opened. After the opening-and-closing determination unit 1513 determines that the flap ef is normally opened, the envelope E is conveyed to the enclosing position and is performed with enclosing processing.

As described above, when the processing for opening the flap ef turns to be abnormal, the switchback conveyance of the envelope E is repeatedly performed at a position adjacent to the joining position of the envelope enclosing conveyance passage 1105 and the envelope entry passage 1107, so that the flap ef can be normally opened.

Second Embodiment

Next, a description is given of retry processing of the flap opening operation of the flap opening mechanism 180 according to a second embodiment with reference to FIGS. 25A to 25F. The present embodiment is a second example of retry processing for re-executing flap opening processing performed in a case where the flap ef cannot be normally opened in the flap opening operation.

The flap opening mechanism 180 according to the present embodiment includes a drive mechanism that drives the envelope switchback switching member 21. Similar to the example of FIGS. 18A to 18F described above, the envelope switchback switching member 21 is in a state in which the switching leading end 21*t* is close to the envelope entry passage 1107 in a steady state.

Figure 25A:
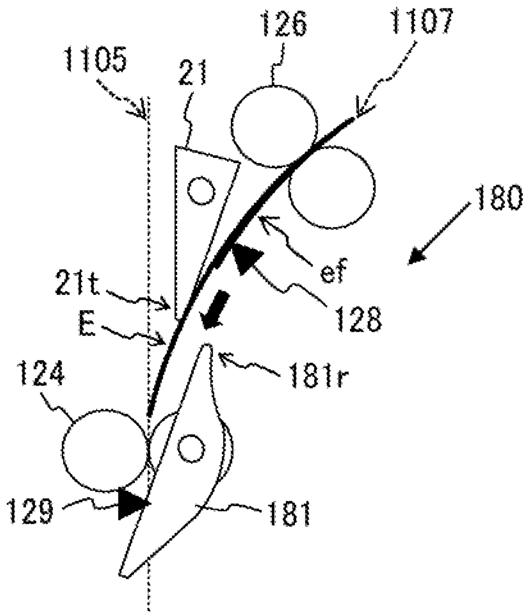
FIGS. 25A to 25F are diagrams illustrating a configuration of a flap opening mechanism included in the envelope processing apparatus, according to a second embodiment of the present disclosure.
Figure 25B:
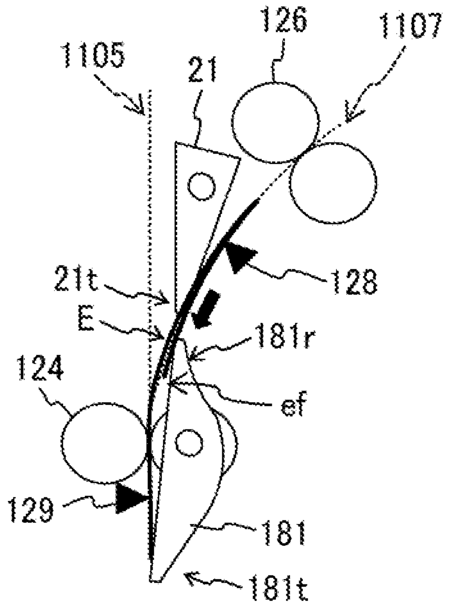

Similar to the example of FIG. 23B, FIG. 25A illustrates a state where the envelope E has been conveyed through the envelope entry passage 1107. As illustrated in FIG. 25B, in a case where the envelope E is conveyed in a state where the flap ef is not caught by the flap opening trailing end 181*r*, the envelope E reaches the envelope enclosing conveyance passage 1105 in a state where the flap ef is not opened.

Figure 25C:
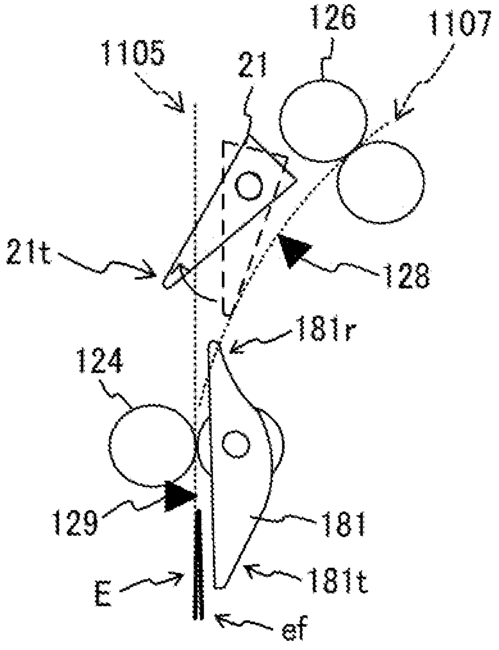
Figure 25D:
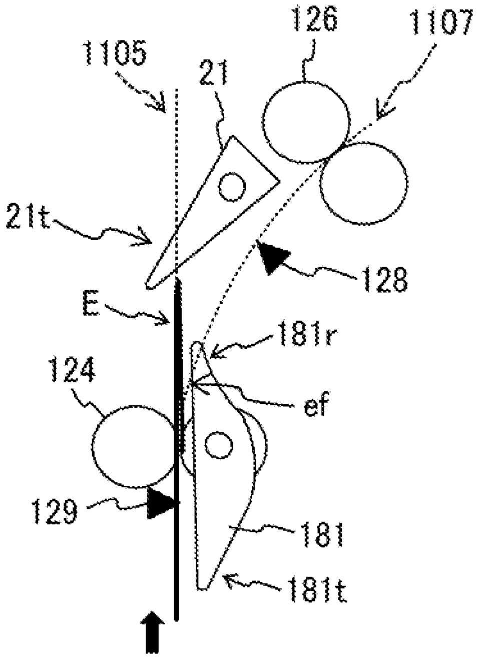

As illustrated in FIG. 25C, switchback conveyance is performed on the envelope E whose flap ef is not open, and thus, the envelope E passes the flap opening sensor 129 in a state where the flap ef is not opened. In other words, since the envelope E passes the flap opening sensor 129 in a state similar to the state when the envelope E passes the separation sensor 128, the calculated second envelope length turns to be a value similar to the value of the first envelope length. Thus, the difference between the first envelope length and the second envelope length turns to be substantially zero. As a result, the opening-and-closing determination unit 1513 determines that the flap ef is not normally opened. The switching leading end 21*t* of the envelope switchback switching member 21 is rotated to reach a position where the switching leading end 21*t* of the envelope switchback switching member 21 straddles the envelope enclosing conveyance passage 1105.

When the envelope E is conveyed in the switchback manner, the leading end of the envelope E (joining portion between the flap ef and the body of the envelope E) in the conveyance direction contacts the envelope switchback switching member 21 and bends toward the envelope entry passage 1107.

Figure 25E:
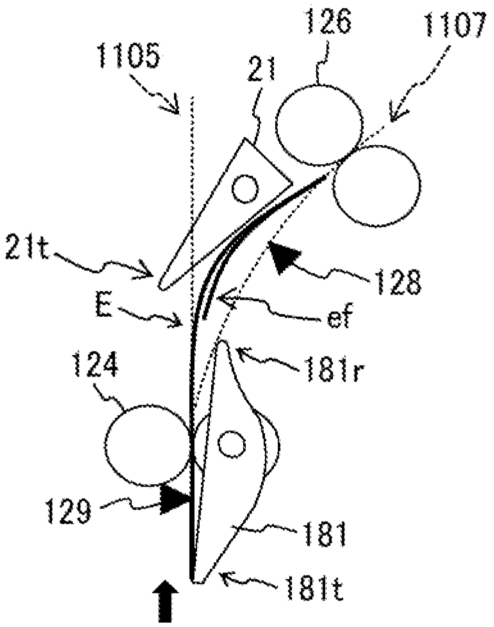

As illustrated in FIG. 25E, the envelope E is conveyed such that the leading end of the flap ef reaches a position adjacent to the flap opening trailing end 181*r*. This conveyance control controls the rotation amount of the flap opening roller pair 124 after the leading end (the joint portion between the flap ef and the body of the envelope E) of the envelope E has passed the flap opening sensor 129. With this conveyance control, the envelope E can be conveyed to a specified position even if the position of the leading end of the flap ef is not determined. For example, the envelope E is conveyed to a position of about 10 mm upstream from the position where the trailing end of the envelope E in the conveyance direction (in this case, the bottom of the envelope E) passes the flap opening roller pair 124.

Figure 25F:
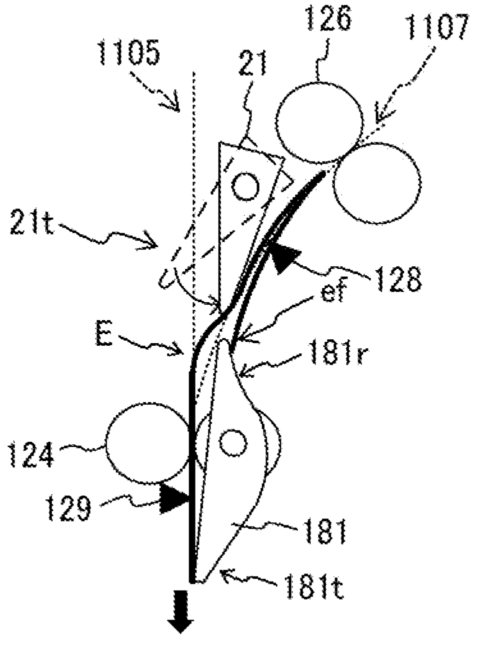

As illustrated in FIG. 25F, the envelope E is conveyed in the switchback manner again. At this time, the envelope switchback switching member 21 is rotated such that the switching leading end 21*t* reaches a position where the switching leading end 21*t* straddles the envelope entry passage 1107. As a result, as described above with reference to FIG. 19C, the switching leading end 21*t* overlaps the flap opening trailing end 181*r*. In this state, the envelope E is conveyed in the switchback manner to the envelope enclosing conveyance passage 1105 again. With this re-switchback conveyance, the envelope E is conveyed in a direction in which the envelope E passes the flap opening sensor 129 in a state where the flap opening trailing end 181*r* enters the clearance between the body and the flap ef of the envelope E and the flap ef is caught by the flap opening trailing end 181*r*.

Similar to the states illustrated in FIGS. 24A and 24B, the envelope E is conveyed in the switchback manner again in a state where the flap ef is caught by the flap opening trailing end 181*r*. Thus, the envelope E passes the flap opening sensor 129 in a state where the flap ef is open. Subsequently, when the envelope E passes the flap opening sensor 129 in order for switchback conveyance to the enclosing position again, the calculated second envelope length turns to be longer than the first envelope length. Then, the opening-and-closing determination unit 1513 determines that the flap ef is normally opened. After the opening-and-closing determination unit 1513 determines that the flap ef is normally opened, the envelope E is conveyed to the enclosing position and is performed with enclosing processing.

As described above, when the processing for opening the flap ef turns to be abnormal, the switchback conveyance of the envelope E is repeatedly performed at a position adjacent to the joining position of the envelope enclosing conveyance passage 1105 and the envelope entry passage 1107, so that the flap ef can be normally opened.

The recovery processing described as the first embodiment and the second embodiment can be repeatedly executed until the flap ef normally opens. In this case, an upper limit on the number of times of execution of the recovery processing (retry upper limit) is set in advance, and when the opening-and-closing determination unit 1513 determines that the flap ef has been normally opened even if the number of times exceeds the retry upper limit, the envelope E may be ejected onto the envelope ejection tray 134.

Figure 26:
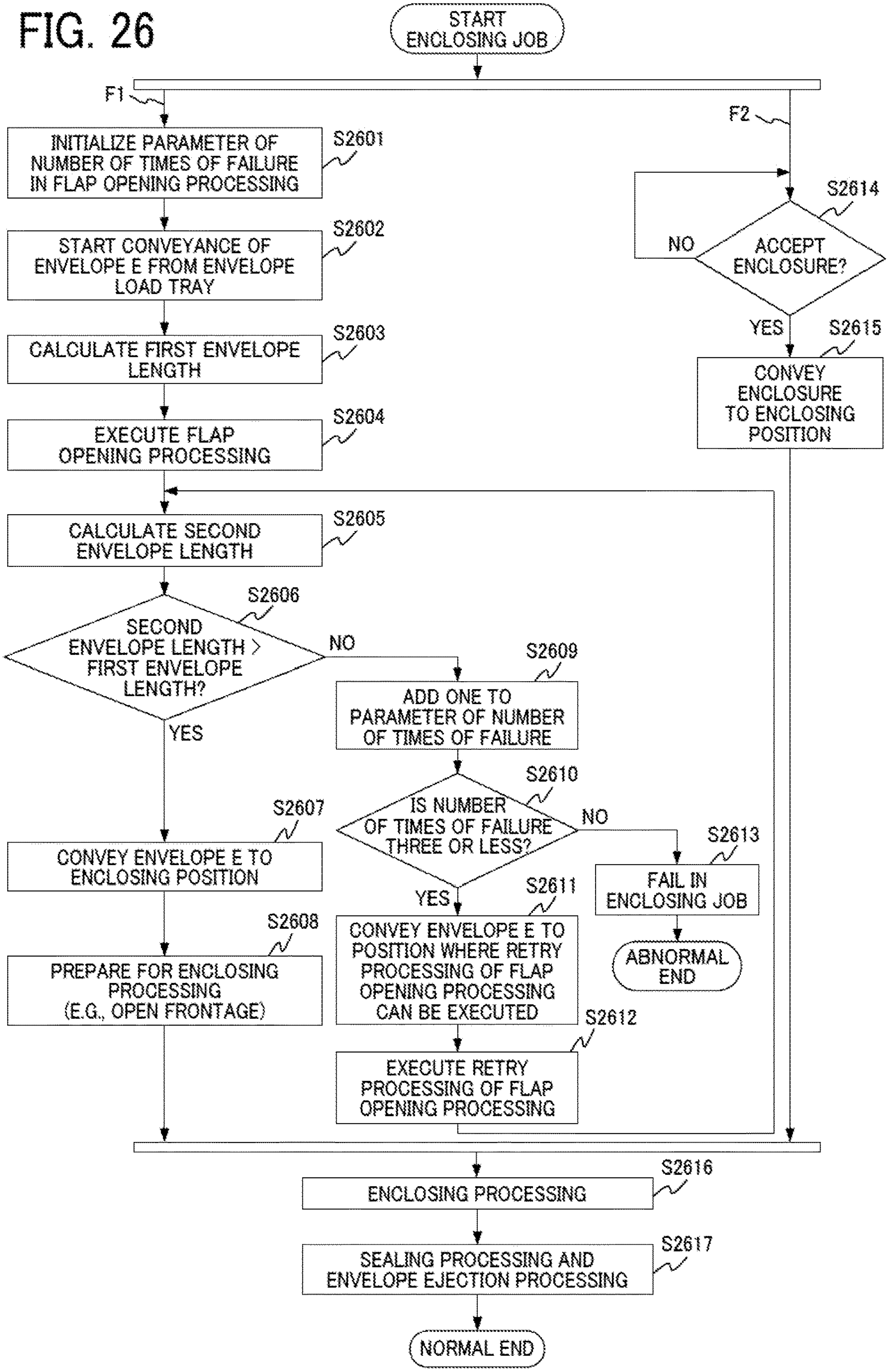
FIG. 26 is a flowchart of a procedure of envelope conveyance processing executed in the controller in FIG. 21.

Next, a description is given of a procedure of envelope conveyance processing, which is one of operations of the envelope processing apparatus 100 described so far, with reference to a flowchart of FIG. 26. The envelope conveyance processing illustrated in FIG. 26 is an example of the envelope enclosing processing including recovery processing when the flap ef of the envelope E is not normally open in the execution of the envelope enclosing processing.

In the enclosing processing, "envelope conveyance control (F1)" for conveying an envelope E used for enclosing to an enclosing position and "enclosure conveyance control (F2)" for conveying an enclosure to be enclosed in the envelope E to the enclosing position are executed in parallel.

After the enclosing job is started, in the envelope conveyance control (F1), first, a failure count parameter as a parameter for determining the number of times of failure in the flap opening processing is initialized (in step S2601 of FIG. 26). With this initialization processing, the failure count parameter is set to zero. The failure count parameter is used for comparison with an upper limit number for keeping the retry count of the flap opening processing within an allowable range. If the upper limit number is set to be, for example, "three", reprocessing (retry processing) of the flap opening processing can be performed up to three times.

Subsequently, the envelope E is picked up from the envelope load tray 127 and conveyed via the envelope entry passage 1107 (in step S2602 of FIG. 26). When the envelope E is conveyed through the envelope entry passage 1107, the separation sensor 128 detects the leading end and the trailing end of the envelope E in the conveyance direction. The envelope processing controller 150 calculates the first envelope length based on the detection results of the separation sensor 128 (in step S2603 of FIG. 26).

As described with reference to FIGS. 18A to 18F and 19A to 19F, the envelope processing controller 150 executes the flap opening processing for opening the flap ef of the envelope E (in step S2604 of FIG. 26). Subsequently, the flap opening sensor 129 detects the leading end and the trailing end of the envelope E in the conveyance direction subjected to the flap opening processing. Then, the envelope processing controller 150 calculates the second envelope length based on the detection results of the flap opening sensor 129 (in step S2605 of FIG. 26).

The envelope processing controller 150 calculates a difference between the second envelope length and the first envelope length and determines whether the flap ef has been normally opened. Specifically, the envelope processing controller 150 executes processing for determining whether the second envelope length is longer than the first envelope length (in step S2606 of FIG. 26). When the second envelope length is longer than the first envelope length (YES in step S2606 of FIG. 26), more specifically, when the second envelope length is longer than the first envelope length by a specified margin or more, the envelope processing controller 150 determines that the flap ef is normally opened. Accordingly, the envelope processing controller 150 conveys the envelope E in the switchback manner to the enclosing position where the enclosing support 160 is disposed (in step S2607 of FIG. 26).

Subsequently, as described above (see FIG. 8), the envelope processing controller 150 conveys the envelope E to the enclosing position, holds the flap ef open, and prepares the envelope E in a state where the enclosure is inserted into the envelope E (in step S2608 of FIG. 26).

On the other hand, first, as described with reference to FIG. 9, after the enclosing job is started, the envelope processing controller 150 receives the enclosure in the first conveyance passage 1101 in the conveyance control (F2). The envelope processing controller 150 loops the processing until the enclosure is received in the first conveyance passage 1101 (NO in step S2614 of FIG. 26). When the enclosure is received via the first conveyance passage 1101 (YES in step S2614 of FIG. 26), as described above with reference to FIG. 10, the enclosure is conveyed toward the enclosing conveyance passage 1104 (in step S2615 of FIG. 26).

As described with reference to FIG. 11, the envelope processing controller 150 executes the enclosing processing of inserting the enclosure into the envelope E (in step S2616 of FIG. 26), and subsequently, executes the sealing processing described with reference to FIGS. 12 to 16, and ejects the envelope E to the envelope ejection tray 134 (in step S2617 of FIG. 26).

In step S2606 of FIG. 26, when the second envelope length is not longer than the first envelope length by a specified margin or more (NO in step S2606 of FIG. 26), the envelope processing controller 150 determines that the flap ef is not in a normally open state. Thus, the envelope processing controller 150 determines that the flap opening processing has failed. Then, the envelope processing controller 150 adds one to the value of the failure count parameter (in step S2609 of FIG. 26).

Subsequently, the envelope processing controller 150 determines whether the value of the failure count parameter exceeds the retry upper limit value (in step S2610 of FIG. 26). When the value of the failure count parameter exceeds the retry upper limit (NO in step S2610 of FIG. 26), the flap ef does not normally open even if the envelope processing controller 150 executes retry processing of the flap opening processing by multiple times. Then, the envelope processing controller 150 determines that the enclosing ob has failed, and executes processing for ejecting the envelope E (in step S2613 of FIG. 26).

When the value of the failure count parameter does not exceed the retry upper limit (YES in step S2610 of FIG. 26), as described with reference to FIGS. 23A to 23F and 25A to 25F, the envelope processing controller 150 conveys the envelope E to the position where the flap ef can be opened again (in step S2611 of FIG. 26) and executes retry processing of flap opening processing (in step S2612 of FIG. 26). Then, the processing is returned to step S2605. The envelope processing controller 150 causes the flap opening sensor 129 to detect the leading end and the trailing end of the envelope E after the retry processing in the conveyance direction. Thus, the envelope processing controller 150 calculates the second envelope length again. The envelope processing controller 150 executes retry processing for the flap opening processing until the second envelope length that is longer than the first envelope length is calculated and until the value of the failure count parameter exceeds the retry upper limit (in steps S2606 to S2612 of FIG. 26).

As described above, according to the enclosing device 120 of the present embodiment, in a case where opening of the flap ef of the envelope E has failed, the opening operation of the flap ef is re-executed to enhance the reliability of the enclosing processing.

Aspects of the present disclosure are, for example, as follows.

First Aspect

An envelope processing apparatus (e.g., the envelope processing apparatus 100) that conveys an envelope (e.g., the envelope E) to an enclosing position and encloses an enclosure into the envelope (e.g., the envelope E) includes a flap opener (e.g., the flap opening mechanism 180), a first envelope detector (e.g., the separation sensor 128), a second envelope detector (e.g., the flap opening sensor 129), and a controller (e.g., the envelope processing controller 150). The flap opener (e.g., the flap opening mechanism 180) opens a flap (e.g., the flap ef) of the envelope (e.g., the envelope E) during conveyance of the envelope (e.g., the envelope E) in an envelope conveyance passage (e.g., the envelope enclosing conveyance passage 1105 and the envelope entry passage 1107) in which the envelope (e.g., the envelope E) is conveyed to an enclosing position. The first envelope detector (e.g., the separation sensor 128) detects the envelope (e.g., the envelope E) at a position upstream from the flap opener (e.g., the flap opening mechanism 180) in a conveyance direction of the envelope (e.g., the envelope E). The second envelope detector (e.g., the flap opening sensor 129) detects the envelope (e.g., the envelope E) at a position downstream from the flap opener (e.g., the flap opening mechanism 180) in the conveyance direction of the envelope (e.g., the envelope E). The controller (e.g., the envelope processing controller 150) controls the flap opener (e.g., the flap opening mechanism 180) to execute an opening operation of the flap (e.g., the flap ef) of the envelope (e.g., the envelope E) conveyed to the enclosing position. When an opening-and-closing state of the flap (e.g., the flap ef) of the envelope (e.g., the envelope E) determined based on detection results of the envelope (e.g., the envelope E) by the first envelope detector (e.g., the separation sensor 128) and the second envelope detector (e.g., the flap opening sensor 129) is abnormal, the controller (e.g., the envelope processing controller 150) controls the flap opener (e.g., the flap opening mechanism 180) to execute the opening operation of the flap (e.g., the flap ef) of the envelope (e.g., the envelope E) again.

Second Aspect

In a second aspect, in the envelope processing apparatus (e.g., the envelope processing apparatus 100) according to the first aspect, the flap opener (e.g., the flap opening mechanism 180) includes a flap opening member (e.g., the flap opening member 181) that is inserted into a clearance between a body of the envelope (e.g., the envelope E) and a leading end of a flap (e.g., the flap ef) of the envelope (e.g., the envelope E) in the conveyance direction to scoop the flap (e.g., the flap ef) of the envelope (e.g., the envelope E) and a conveyance passage protruding portion (e.g., the conveyance passage protruding portion 184) that narrows a conveyance gap in a thickness direction of the enclosure on a side opposite the flap opener (e.g., the flap opening mechanism 180) in the envelope conveyance passage (e.g., the envelope enclosing conveyance passage 1105 and the envelope entry passage 1107). The conveyance passage protruding portion (e.g., the conveyance passage protruding portion 184) is disposed adjacent to a trailing end of the flap opening member (e.g., the flap opening member 181) in the conveyance direction.

Third Aspect

In a third aspect, in the envelope processing apparatus (e.g., the envelope processing apparatus 100) according to the second aspect, when the controller (e.g., the envelope processing controller 150) repeatedly executes the opening operation of the flap (e.g., the flap ef) of the envelope (e.g., the envelope E) until the controller (e.g., the envelope processing controller 150) determines that the opening-and-closing state of the flap (e.g., the flap ef) of the envelope (e.g., the envelope E) is normal, the controller (e.g., the envelope processing controller 150) controls conveyance of the envelope (e.g., the envelope E) such that the envelope (e.g., the envelope E) moves back and forth between a position where the leading end of the flap (e.g., the flap ef) of the envelope (e.g., the envelope E) exceeds the conveyance passage protruding portion (e.g., the conveyance passage protruding portion 184) and a position where the second envelope detector (e.g., the flap opening sensor 129) detects the envelope (e.g., the envelope E).

Fourth Aspect

In a fourth aspect, in the envelope processing apparatus (e.g., the envelope processing apparatus 100) according to any one of the first to third aspects, the flap opener (e.g., the flap opening mechanism 180) includes an envelope switchback switching member (e.g., the envelope switchback switching member 21) that rotates such that the conveyance direction of the envelope (e.g., the envelope E) is switched in the envelope conveyance passage (e.g., the envelope enclosing conveyance passage 1105 and the envelope entry passage 1107). When the opening-and-closing state of the flap (e.g., the flap ef) of the envelope (e.g., the envelope E) is abnormal, the controller (e.g., the envelope processing controller 150) rotates the envelope switchback switching member (e.g., the envelope switchback switching member 21) to lead the envelope (e.g., the envelope E) to the first envelope detector (e.g., the separation sensor 128).

Fifth Aspect

In a fifth aspect, in the envelope processing apparatus (e.g., the envelope processing apparatus 100) according to any one of the first to fourth aspects, the controller (e.g., the envelope processing controller 150) repeatedly performs the opening operation of the flap (e.g., the flap ef) of the envelope (e.g., the envelope E) until the controller (e.g., the envelope processing controller 150) determines that the opening-and-closing state of the flap (e.g., the flap ef) of the envelope (e.g., the envelope E) is normal.

Sixth Aspect

In a sixth aspect, in the envelope processing apparatus (e.g., the envelope processing apparatus 100) according to the fifth aspect, the controller (e.g., the envelope processing controller 150) repeatedly performs the opening operation of the flap (e.g., the flap ef) of the envelope (e.g., the envelope E) until a number of times that the controller (e.g., the envelope processing controller 150) determines that the opening-and-closing state of the flap (e.g., the flap ef) of the envelope (e.g., the envelope E) is abnormal exceeds a specified number of times. When the number of times that the controller (e.g., the envelope processing controller 150) determines that the opening-and-closing state of the flap (e.g., the flap ef) of the envelope (e.g., the envelope E) is abnormal exceeds the specified number of times, the controller (e.g., the envelope processing controller 150) executes a control that the envelope (e.g., the envelope E) is conveyed to an ejection position different from the enclosing position.

Seventh Aspect

In a seventh aspect, in the envelope processing apparatus (e.g., the envelope processing apparatus 100) according to any one of the first to sixth aspects, the controller (e.g., the envelope processing controller 150) determines the opening-and-closing state of the flap (e.g., the flap ef) of the envelope (e.g., the envelope E), based on a first envelope length that is a length calculated based on a detection result of the first envelope detector (e.g., the separation sensor 128) in the conveyance direction of the envelope and a second envelope length that is a length calculated based on a detection result of the second envelope detector (e.g., the flap opening sensor 129) in the conveyance direction of the envelope.

Eighth Aspect

In an eighth aspect, in the envelope processing apparatus (e.g., the envelope processing apparatus 100) according to the seventh aspect, the controller (e.g., the envelope processing controller 150) determines the opening-and-closing state of the flap (e.g., the flap ef) of the envelope (e.g., the envelope E), based on a flap length that is a length calculated based on the first envelope length and the second envelope length.

Ninth Aspect

In a ninth aspect, the envelope processing apparatus (e.g., the envelope processing apparatus 100) according to any one of the first to eighth aspects further includes a sealer (e.g., the sealer 130) that seals the envelope (e.g., the envelope E) in which the enclosure is inserted.

Tenth Aspect

In a tenth aspect, an image forming system (e.g., the printer system 1) includes an image forming apparatus (e.g., the image forming apparatus 200) that forms an image on a sheet medium and the envelope processing apparatus (e.g., the envelope processing apparatus 100) according to any one of the first to eighth aspects that inserts the sheet medium on which the image is formed as the enclosure into the envelope (e.g., the envelope E).

Eleventh Aspect

In an eleventh aspect, an image forming system (e.g., the printer system 1) includes an image forming apparatus (e.g., the image forming apparatus 200) that forms an image on a sheet medium and the envelope processing apparatus (e.g., the envelope processing apparatus 100) according to the ninth aspect that inserts the sheet medium on which the image is formed as the enclosure into the envelope (e.g., the envelope E) and seals the envelope (e.g., the envelope E).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An envelope processing apparatus to convey an envelope to an enclosing position and enclose an enclosure into the envelope, the envelope processing apparatus comprising:

a flap opener to open a flap of the envelope during conveyance of the envelope in an envelope conveyance passage in which the envelope is conveyed to the enclosing position;

a first envelope detector to detect the envelope at a position upstream from the flap opener in a conveyance direction of the envelope;

a second envelope detector to detect the envelope at a position downstream from the flap opener in the conveyance direction of the envelope; and circuitry configured to:

cause the flap opener to execute an opening operation of the flap of the envelope conveyed to the enclosing position; and cause the flap opener to execute the opening operation of the flap of the envelope again when an opening-and-closing state of the flap of the envelope determined based on detection results of the envelope by the first envelope detector and the second envelope detector is abnormal.

2. The envelope processing apparatus according to claim 1, wherein the flap opener includes:

a flap opening member to insert into a clearance between a body of the envelope and a leading end of the flap of the envelope in the conveyance direction to scoop the flap of the envelope; and a conveyance passage protruding portion that narrows a conveyance gap in a thickness direction of the enclosure on a side opposite the flap opener in the envelope conveyance passage, and wherein the conveyance passage protruding portion is disposed adjacent to a trailing end of the flap opening member in the conveyance direction of the envelope.

3. The envelope processing apparatus according to claim 2, wherein the circuitry is configured to control conveyance of the envelope such that the envelope moves back and forth between a position at which the leading end of the flap of the envelope exceeds the conveyance passage protruding portion and a position at which the second envelope detector detects the envelope, when the circuitry repeatedly executes the opening operation of the flap of the envelope until the circuitry determines that the opening-and-closing state of the flap of the envelope is normal.

4. The envelope processing apparatus according to claim 1, wherein the flap opener includes an envelope switchback switching member to rotate to switch the conveyance direction of the envelope in the envelope conveyance passage, and wherein the circuitry is configured to rotate the envelope switchback switching member to lead the envelope to the first envelope detector when the circuitry determines that the opening-and-closing state of the flap of the envelope is abnormal.

5. The envelope processing apparatus according to claim 1, wherein the circuitry is configured to repeatedly perform the opening operation of the flap of the envelope until the circuitry determines that the opening-and-closing state of the flap of the envelope is normal.

6. The envelope processing apparatus according to claim 5, wherein the circuitry is configured to:

repeatedly perform the opening operation of the flap of the envelope until a number of times that the circuitry determines that the opening-and-closing state of the flap of the envelope is abnormal exceeds a specified number of times; and execute conveyance control such that the envelope is conveyed to an ejection position different from the enclosing position when the number of times that the circuitry determines that the opening-and-closing state of the flap of the envelope is abnormal exceeds the specified number of times.

7. The envelope processing apparatus according to claim 1, wherein the circuitry is configured to determine the opening-and-closing state of the flap of the envelope based on a first envelope length that is a length of the envelope in the conveyance direction calculated based on a detection result of the first envelope detector and a second envelope length that is a length of the envelope in the conveyance direction calculated based on a detection result of the second envelope detector.

8. The envelope processing apparatus according to claim 7, wherein the circuitry is configured to determine the opening-and-closing state of the flap of the envelope based on a flap length that is a length of the flap calculated based on the first envelope length and the second envelope length.

9. The envelope processing apparatus according to claim 1, further comprising a sealer to seal the envelope in which the enclosure is inserted.

10. An image forming system comprising:

an image forming apparatus to form an image on a sheet medium; and the envelope processing apparatus according to claim 1 to insert the sheet medium, on which the image is formed, as the enclosure into the envelope.

11. An image forming system comprising:

an image forming apparatus to form an image on a sheet medium; and the envelope processing apparatus according to claim 9 to insert the sheet medium, on which the image is formed, as the enclosure into the envelope and seal the envelope.

* * * * *